United States Patent
Prettejohn et al.

(10) Patent No.: US 12,306,974 B2
(45) Date of Patent: May 20, 2025

(54) CONTROLLING ACCESS TO ELECTRONIC DATA ASSETS

(71) Applicant: Palantir Technologies Inc., Denver, CO (US)

(72) Inventors: Nicolas Prettejohn, Bath (GB); Basil Jennings, London (GB); Mihai Condur, London (GB); Renee Leatherman, Amherst, MA (US); Louis Mosley, London (GB); Simon Slowik, London (GB); Craig Massie, London (GB)

(73) Assignee: Palantir Technologies Inc., Denver, CO (US)

( * ) Notice: Subject to any disclaimer, the term of this patent is extended or adjusted under 35 U.S.C. 154(b) by 486 days.

(21) Appl. No.: 17/456,098

(22) Filed: Nov. 22, 2021

(65) Prior Publication Data

US 2022/0164465 A1    May 26, 2022

Related U.S. Application Data

(60) Provisional application No. 63/117,101, filed on Nov. 23, 2020.

(51) Int. Cl.
G06F 21/62    (2013.01)

(52) U.S. Cl.
CPC .. *G06F 21/6218* (2013.01); *G06F 2221/2101* (2013.01)

(58) Field of Classification Search
None
See application file for complete search history.

(56) References Cited

U.S. PATENT DOCUMENTS

| 8,516,050 B1 | 8/2013 | Chapweske et al. |
| 8,683,557 B1 | 3/2014 | Desikan et al. |

(Continued)

FOREIGN PATENT DOCUMENTS

| EP | 4 254 244 | 10/2023 |
| EP | 4372592 | 5/2024 |

(Continued)

OTHER PUBLICATIONS

Kabir et al., "A role-involved purpose-based access control model", May 3, 2011 (Year: 2011).*

(Continued)

*Primary Examiner* — Ario Etienne
*Assistant Examiner* — Mohammad Yousuf A. Mian
(74) *Attorney, Agent, or Firm* — Knobbe, Martens, Olson & Bear, LLP

(57) ABSTRACT

A computer system is disclosed that provides purpose-based access to electronic data assets. For example, the computer system may perform operations including: receiving, from a first user, a request to access data assets associated with a purpose object; in response to receiving the request from the first user: generating a purpose access request object including at least an identification of the first user and an identification of the purpose object; and providing an indication of the purpose access request object to a second user associated with the purpose object; receiving, from the second user, an approval of the request; and in response to receiving the approval of the request from the second user: updating the purpose access request object to include at least an indication of the approval of the request; and granting the first user access to data assets associated with the purpose object.

23 Claims, 49 Drawing Sheets

(56) References Cited

U.S. PATENT DOCUMENTS

| | | | |
|---|---|---|---|
| 8,789,094 | B1 | 7/2014 | Singh et al. |
| 8,918,866 | B2 | 12/2014 | Luo et al. |
| 9,083,728 | B1 | 7/2015 | Lavian et al. |
| 9,641,334 | B2 * | 5/2017 | Faitelson ............. G06F 9/468 |
| 10,484,452 | B2 | 11/2019 | Reyes |
| 11,108,828 | B1 * | 8/2021 | Curtis ................. H04L 63/20 |
| 11,157,572 | B1 | 10/2021 | Anima et al. |
| 11,210,278 | B1 * | 12/2021 | Dean ................ G06F 16/2453 |
| 11,212,362 | B2 | 12/2021 | Dhara et al. |
| 11,457,079 | B1 | 9/2022 | Mehta et al. |
| 11,539,783 | B1 | 12/2022 | Gupta et al. |
| 11,616,791 | B2 | 3/2023 | Mahadevia et al. |
| 11,748,456 | B2 | 9/2023 | Haydon et al. |
| 11,832,100 | B2 | 11/2023 | Sanciangco et al. |
| 12,066,982 | B2 | 8/2024 | Greehy et al. |
| 2001/0034617 | A1 | 10/2001 | Kimata |
| 2004/0015723 | A1 | 1/2004 | Pham et al. |
| 2006/0059154 | A1 | 3/2006 | Raab |
| 2006/0080546 | A1 | 4/2006 | Brannon et al. |
| 2007/0094145 | A1 | 4/2007 | Ta et al. |
| 2008/0120620 | A1 | 5/2008 | Lett et al. |
| 2009/0099921 | A1 | 4/2009 | Klein et al. |
| 2009/0182610 | A1 | 7/2009 | Palanisamy et al. |
| 2009/0276463 | A1 | 11/2009 | Miller |
| 2010/0004944 | A1 | 1/2010 | Palaniappan |
| 2011/0030045 | A1 | 2/2011 | Beauregard et al. |
| 2012/0278425 | A1 | 11/2012 | Maxted |
| 2012/0296832 | A1 | 11/2012 | Beringer et al. |
| 2013/0145284 | A1 | 6/2013 | Anantharaman et al. |
| 2014/0047330 | A1 | 2/2014 | Yan |
| 2014/0067929 | A1 | 3/2014 | Kirigin et al. |
| 2014/0149505 | A1 | 5/2014 | Christiansen |
| 2014/0173755 | A1 | 6/2014 | Wahl |
| 2014/0215004 | A1 | 7/2014 | Daly, Jr. et al. |
| 2014/0245185 | A1 | 8/2014 | Knodt et al. |
| 2015/0066556 | A1 | 3/2015 | Dominick et al. |
| 2015/0095352 | A1 | 4/2015 | Lacey |
| 2015/0163788 | A1 | 6/2015 | Karunakaran |
| 2015/0169069 | A1 | 6/2015 | Lo et al. |
| 2015/0347971 | A1 | 12/2015 | D'Amore et al. |
| 2016/0021093 | A1 | 1/2016 | Vinckier |
| 2016/0048486 | A1 | 2/2016 | Lopategui |
| 2016/0065571 | A1 | 3/2016 | Hoyos et al. |
| 2016/0070812 | A1 | 3/2016 | Murphy et al. |
| 2016/0096110 | A1 | 4/2016 | Decoufle |
| 2016/0306965 | A1 | 10/2016 | Iyer et al. |
| 2016/0308855 | A1 | 10/2016 | Lacey et al. |
| 2017/0041690 | A1 | 2/2017 | Agarwal et al. |
| 2017/0078392 | A1 | 3/2017 | Gray et al. |
| 2017/0093786 | A1 | 3/2017 | Baca et al. |
| 2017/0093867 | A1 | 3/2017 | Burns et al. |
| 2017/0141983 | A1 | 5/2017 | Childress et al. |
| 2017/0171214 | A1 * | 6/2017 | Anderson ............. G06F 16/27 |
| 2017/0199657 | A1 | 7/2017 | Mullins et al. |
| 2017/0329498 | A1 | 11/2017 | Schikora et al. |
| 2017/0351875 | A1 | 12/2017 | Rotem et al. |
| 2018/0052994 | A1 | 2/2018 | Iyer et al. |
| 2018/0174104 | A1 | 6/2018 | Schikora et al. |
| 2018/0189509 | A1 | 7/2018 | Goldsteen et al. |
| 2018/0210936 | A1 | 7/2018 | Reynolds et al. |
| 2018/0315042 | A1 | 11/2018 | Rungta et al. |
| 2018/0349406 | A1 | 12/2018 | Shortlidge et al. |
| 2018/0356961 | A1 | 12/2018 | Lewis et al. |
| 2018/0365439 | A1 * | 12/2018 | Milman .................. H04L 51/42 |
| 2019/0034936 | A1 | 1/2019 | Nolan et al. |
| 2019/0141488 | A1 | 5/2019 | Yedvab |
| 2019/0319932 | A1 | 10/2019 | Kandregula |
| 2020/0053090 | A1 | 2/2020 | Kliger et al. |
| 2020/0074107 | A1 | 3/2020 | Barbas et al. |
| 2020/0076813 | A1 | 3/2020 | Felice-Steele et al. |
| 2020/0153887 | A1 | 5/2020 | Choi et al. |
| 2020/0169465 | A1 | 5/2020 | Stelmar Netto et al. |
| 2020/0229258 | A1 * | 7/2020 | Wang .................... H04W 76/27 |
| 2020/0285768 | A1 | 9/2020 | Hodges, Sr. |
| 2020/0286089 | A1 | 9/2020 | Cleaver et al. |
| 2020/0334377 | A1 | 10/2020 | Turgeman et al. |
| 2020/0380007 | A1 | 12/2020 | Langseth et al. |
| 2020/0380008 | A1 | 12/2020 | Chu et al. |
| 2020/0401714 | A1 | 12/2020 | Klein et al. |
| 2021/0064769 | A1 | 3/2021 | Yu et al. |
| 2021/0165898 | A1 | 6/2021 | Weiss et al. |
| 2021/0266323 | A1 * | 8/2021 | Jani ........................ G06N 20/00 |
| 2021/0279355 | A1 * | 9/2021 | Otte .................... G06F 21/6218 |
| 2021/0318980 | A1 | 10/2021 | Pal et al. |
| 2021/0409413 | A1 | 12/2021 | Mariappan et al. |
| 2022/0108029 | A1 | 4/2022 | Macandrew et al. |
| 2022/0114246 | A1 | 4/2022 | El Guindi et al. |
| 2022/0129896 | A1 | 4/2022 | Ehrlich et al. |
| 2022/0201049 | A1 | 6/2022 | Jamison |
| 2022/0255914 | A1 | 8/2022 | Fan et al. |
| 2022/0261144 | A1 * | 8/2022 | Dennis .................. G06T 11/206 |
| 2022/0335106 | A1 | 10/2022 | Marmanis et al. |
| 2022/0374535 | A1 | 11/2022 | Jagasia et al. |
| 2023/0029402 | A1 | 1/2023 | Henkens et al. |
| 2023/0079267 | A1 | 3/2023 | Brindley et al. |
| 2023/0140819 | A1 | 5/2023 | Hile et al. |
| 2023/0145127 | A1 | 5/2023 | Barnum et al. |
| 2023/0169204 | A1 | 6/2023 | Blunt et al. |
| 2023/0199052 | A1 | 6/2023 | Springer |
| 2023/0214508 | A1 | 7/2023 | Munisamy et al. |
| 2023/0230152 | A1 | 7/2023 | Debreczeni et al. |
| 2023/0244802 | A1 | 8/2023 | Paul et al. |
| 2023/0274277 | A1 | 8/2023 | Kurani et al. |
| 2023/0306000 | A1 | 9/2023 | Greehy et al. |
| 2024/0169082 | A1 | 5/2024 | Bond et al. |

FOREIGN PATENT DOCUMENTS

| | | |
|---|---|---|
| WO | WO 2022/109618 | 5/2022 |
| WO | WO 2022/245989 | 11/2022 |

OTHER PUBLICATIONS

A role-involved purpose-based access control model (Year: 2011).*

U.S. Appl. No. 17/820,729, Data Asset Sharing, filed Aug. 18, 2022.

International Preliminary Report on Patentability and Written Opinion for International Application No. PCT/US2021/072557 dated Jun. 1, 2023, 10 pages.

Official Communication for European Patent Application No. 22198782.9 dated May 23, 2023, 7 pages.

International Search Report and Written Opinion for International Application No. PCT/US2022/029896 dated Sep. 7, 2022, 12 pages.

Yang et al., "A Purpose-Based Access Control Model", Third International Symposium on Information Assurance and Security, IEEE, Aug. 1, 2007, pp. 143-148.

International Search Report and Written Opinion for International Application No. PCT/US2021/072557 dated Mar. 22, 2022, 13 pages.

International Preliminary Report on Patentability and Written Opinion for International Application No. PCT/US2022/029896 dated Nov. 30, 2023, 9 pages.

Official Communication for European Patent Application No. 23191744.4 dated Feb. 12, 2024, 8 pages.

U.S. Appl. No. 18/769,800, Data Asset Sharting, filed Jul. 11, 2024.

U.S. Appl. No. 17/663,996, Controlling User Actions and Access to Electronic Data Assets, filed May 18, 2022.

U.S. Appl. No. 18/158,395, Exploration and Access to Electronic Data Assets, filed Jan. 23, 2023.

Official Communication for European Patent Application No. 23191744.4 dated Jun. 13, 2024, 59 pages.

* cited by examiner

| TITLE | Description | Sponsor | Expiry Timestamp | |
|---|---|---|---|---|
| ☆ PPE Distribution-West Region | For monitoring and analysing PPE stock across the West region | xxxxxxxx | Jan 1, 2020 1:01 AM | Purpose_1 |
| ☆ Supply Chain-Distribution DR | ICU Construction supply chain data at regional level | xxxxxxxx | Jan 1, 2020 12:00 AM | Purpose_10 |
| ☆ Supply Chain-Distribution DR | ICU Construction supply chain data at regional level | xxxxxxxx | Jan 1, 2020 12:05 AM | Purpose_12 |
| ☆ Supply Chain-Distribution DR | ICU Construction supply chain data at regional level | xxxxxxxx | Jan 1, 2020 12:03 AM | Purpose_13 |
| ☆ PPE Distribution-Capital Region | For monitoring and analysing PPE stock across the capital region | xxxxxxxx | Jan 1, 2020 12:03 AM | Purpose_15 |
| | | | | Purpose_2 |

PBAC-Request Purpose Access

Purpose*
[✦] PPE Distribution- Capital Region | Edited |

Access Type*
◉ User
○ Developer

Request Justification* | Edited |

| Why I need access to this I |

↻ | Submit |

| My Purpose | ACCESS TYPE | Request Justification | Status | Decision Maker | Decision Purpose | Decision Timestamp | Purpose id | Request Timestamp | Requester |
|---|---|---|---|---|---|---|---|---|---|
| ⊞ PPE Distribution Search... | DEVELOPER | Permanent Staff Member at South | Approved | Laura Jones | Confirmed through Corporate | Sep 15, 2020 9:40 AM | Purpose-1 | Sep 15, 2020 9:40AM | John Smith |
| ⊞ PPE Distribution Capital... | DEVELOPER | Seconded to PPE Analyst team for | Approved | Laura Jones | Ok Now | Oct 5, 2020 4:36 PM | Purpose-2 | Oct 5, 2020 4:36PM | Michal xxxx |
| ⊞ PPE Distribution Capital... | USER | Why I need access to this | Pending Action | No xxxxx | | | Purpose-2 | Nov 11, 2020 6:22PM | John Smith |

Filters
Keyword
STATUS (2)
☐ Approved 2
☐ Pending Action 1
ACCESS TYPE (2)
☐ DEVELOPER 2
☐ USER 1

Purpose Management ☆ All Purposes ☆ My Purposes ⇨ Access Requests For My Purposes

PBAC-Deny Purpose Approval

Approvals*

🔑 APPROVAL_3c35daec-9a7d-4283-89of-87cb32c0151

Edited

Decision Reason *

Decision Reason|

↺ Cancel    Submit

✓ Approve

APPROVAL_3c35daee-9a7d-4283-89..☆
PBAC-Purpose Approval
Overview Comments ⟲ Request history

Laura Jones changed 5 properties
Nov 11.2020, 18:36

| Decision Reason | Decision Reason |
| Status | Denied |
| Historically Denied | Yes |
| Decision Timestamp | New 11.2020, 6:35PM |
| Decision Maker | Laura Jones |

John Smith Created the Object with the following 7 Properties:
Nov 11.2020, 18:22

Requester            John Smith
Access Type          USER
Status               Pending Action
Historically Derived No
Purpose Id           PURPOSE_2
Request Justification Why I need access to this.
Request Timestamp    Nov 11,2020, 6:22 PM

| Purpose Management | | | | | | | | | |
|---|---|---|---|---|---|---|---|---|---|
| ☆ All Purposes | ☆ My Purposes | 🔒 Access Requests For My Purposes | | | | | | | |
| Draft ↓= | Title | Description | Expiry Timestamp | Purpose id | Sponsor | Purpose Leads | Purpose Created Timestamp | Creator | Deleted |
| Yes | ☆ Vaccine Distribution Optimisation | Develop Optimal allocation id | Sep 21, 2021, 12:00 AM | PURPOSE_21 | Laura Jones | | Sep 10, 2020, 2:43 PM | Laura Jones | False |
| No | ☆ PPE Distribution-West Region | For monitoring and analysing PPE | Jan 1, 2021, 1:00 AM | PURPOSE_10 | Laura Jones | | Aug 11, 2020, 3:16 PM | James Dickinson | False |
| No | ☆ PPE Distribution-Capital Region | For monitoring and analysing PPE | Jan 1, 2021, 12:00 AM | PURPOSE_2 | Laura Jones | | Sep 1, 2020, 3:16 PM | James Dickinson | False |
| No | ☆ Supply Chain -Medicine | For collecting and analysing data | Jan 1, 2021, 12:00 AM | PURPOSE_3 | Laura Jones | | Aug 4, 2020, 3:16 PM | James Dickinson | False |

FIG. 12A

| Purpose Administration | | ⚲ Add Purpose Lead | ⏲ Update Expiry | | | Manage Scope Options | | 📁 Archive |

Description
For monitoring and analysing PPE stock across the capital region
Expiry Timestamp
Jan 1, 2021, 12:00 AM
Sponsor
Laura Jones
Creator
James Dickinson
Submitted Timestamp
Sep 1, 2020 3:16 PM

Purpose id
PURPOSE_2
Purpose Leads
Created Times Stamps
Sep 1, 2020, 3:16 PM
Draft
No

Data Asset Requests

⊕ Submit Draft Purpose  ⊕ Add Data Assets

| | Data Asset | Request Justification | Status | Decision Maker | Decision Justification | Decision Timestamp | Requester Timestamp | Reqester | Data Asset id | Legacy | Purpose id | Purpose is Draft |
|---|---|---|---|---|---|---|---|---|---|---|---|---|
| ○ | PPE_Capital_North | Access to PPE data needed for | Approved | Mike Cole | Request is accepted -PPE | Sep 4, 2020, 4:44PM | Aug 14, 2020, 4:42PM | Mike Cole | DATAASSE_5 | | PURPOSE_2 | false |
| ○ | PPE_Capital_West | Access to PPE data needed for | Approved | Mike Cole | Request is accepted -PPE | Sep 1, 2020, 4:44PM | Aug 11, 2020, 4:42PM | Mike Cole | DATAASSET_2 | | PURPOSE_2 | false |
| ○ | PPE_Capital_East | Access to PPE data needed for | Approved | Mike Cole | Request is accepted -PPE | Sep 2, 2020, 4:44PM | Aug 12, 2020, 4:42PM | Mike Cole | DATAASSET_3 | | PURPOSE_2 | false |
| ○ | PPE_Capital_South | Access to PPE data needed for | Denied | Milke Cole | Revoke | Sep 3, 2020, 4:44PM | Aug 13, 2020, 4:42PM | Mike Cole | DATAASSET_4 | | PURPOSE_2 | false |

FIG. 12B

| Tittle | Description | Collecting and Sharing Governance | Contains PII | Information Asset Owner | Contains PHI | Contains DPIA Inclusion | Data Assets id | Data Controller | Data Controller |
|---|---|---|---|---|---|---|---|---|---|
| PPE_Capital_South | PPE Inventory for Capital South-includes orders and deliveries from distribution centers | Aggregate collection | null | David Williams | null | null | DATA ASSET_4 | Mike Lewis | Mike Lewis |
| PPE_Capital_North | PPE Inventory for Capital South-includes orders and deliveries from distribution centers | Aggregate collection | null | David Williams | null | null | DATA ASSET_5 | Tim Leng | Tim Leng |
| PPE_Capital_West | PPE Inventory for Capital South-includes orders and deliveries from distribution centers | Aggregate collection | null | David Williams | null | null | DATA ASSET_2 | Anne Jones | Anne Jones |
| PPE_Capital_East | PPE Inventory for Capital South-includes orders and deliveries from distribution centers | Aggregate collection | null | David Williams | null | null | DATA ASSET_3 | Tom Smith | Tom Smith |

FIG. 12C

PBAC-Create Data Approval

Data Assets*

○ PPE_Capital_South    ✕

Purpose*

☆ PPE Distribution-Capital Region    ✕

Justification*

This is my Justification,    Edited

Submit

↻ Cancel

[PBAC] Create New Purpose

Purpose Name*

Screening Inequalities [Edited]

Purpose Description*

Analysis of the uptake of the vaccinations program across different cohor [Edited]

Expiry Timestamp*

May 26, 2022, 12:00 AM [Edited]

Sponsor*

Basil Jennings [Edited] ✕

↻ Cancel    Submit

FIG. 12E

[PBAC] Set Purpose Scope Options

Purpose*

Screening Inequalities ▷

New Available Options

East | National | North | South | West ▷

New Default Access Option

National

Set visibility to Private ▷

Cancel

| Section | Tittle | Collecting and Sharing Governance | Data Asset id | Data Protection Considerations | Data Request | Date of Approval | Descrience | Frequency of Refresh | Granularity of Data | Id Number | Information Administration |
|---|---|---|---|---|---|---|---|---|---|---|---|
| | PPE_Capital_South | Aggrigate collection | DATAASSET_4 | N/A | 2020-05-2411:49:24,4922 | May 29, 2020 | PPE Inventory for Capital South- | One off | Aggregate | 4 | null |
| | PPE_Capital_North | Aggrigate collection | DATAASSET_5 | N/A | 2020-05-24115:49:24,4922 | May 30, 2020 | PPE Inventory for Capital North- | One off | Aggregate | 5 | null |
| | PPE_Capital_West | Aggrigate collection | DATAASSET_2 | N/A | 2020-05-24115:49:24,4922 | May 27, 2020 | PPE Inventory for Capital West- | One off | Aggregate | 2 | null |
| | PPE_Capital_East | Aggrigate collection | DATAASSET_3 | N/A | 2020-05-24115:49:24,4922 | May 28, 2020 | PPE Inventory for Capital East- | One off | Aggregate | 3 | null |
| | National_Health_Site | Aggrigate collection | DATAASSET_14 | N/A | 2020-05-24115:49:24,4922 | June 8, 2020 | Site list for all hospitals and | One off | Aggregate | 14 | null |

FIG. 13A

| Purpose | Data Asset | Requester | Request Justification | Status Z↕ | Decision Justification | Decision Maker | Decision Timestamp | Request Time Setup ↓↑ | Data Asset id |
|---|---|---|---|---|---|---|---|---|---|
| PPE Distribution Capital Region | PPE_Capital_South | Lara Jones | This is my Justification | Pending Action | | No value | | Nov 11, 2020 6:47PM | DATAASSET_4 |
| PPE Distribution Capital Region | PPE_Capital_south | Mihal Condur | Access to PPE data needed for | Denied | Report | Mihal Condur | Sep 4, 2020 9:00AM | Aug 12, 2020 4:42PM | DATAASSET_4 |
| Text Purpose 1 | PPE_Capital_North | Mihal Condur | Test Justification | Approved | it's appropriate | Mihal Condur | Aug 10, 2020 4:44PM | Aug 10, 2020 4:42PM | DATAASSET_1 |
| PPE Distribution Capital Region | PPE_Capital_West | Mihal Condur | Access to PPE data needed for | Approved | Request is accepted -PPE | Mihal Condur | Sep 1, 2020 4:44PM | Aug 10, 2020 4:42PM | DATAASSET_2 |

[✓ Approve] [✗ Reject]

PURPOSE_2_DATAASSET_4_7fca5af... ☆
FBAC-Data Asset For Purpose Approval
Overview  Comments — 1324

🕐 Edits history

Laura Jones Created the object with the following 8 properties: — 1326
Nov 11,2020,11:47
Data Asset Id          DATAASSET_4
Requester              Laura Jones
Purpose Id             PURPOSE_2
Status                 [Pending Actions]
Historically Denied    No
Request Timestamp      Nov 11,2020,6:47 PM
Request Justification  This is my justification
Purpose in Draft       No 🔗 Links — 1328

Purpose   1334
  ☆ 🔲 PPE Distribution-Capital Region

Requstor:
  > 👤 Laura Jones

Data Asset
  > 🔲 PPE_Capital_South

☰ Properties — 1330

Decision Justification   No Value
Decision Maker           No Value
Decision Timestamp       No Value
Request Justification    This is my Justification
Request Timestamp        Nov 11,2020,6:47 PM
Requestor                Laura Jones

FIG. 13D

✓ Approve  ✗ Deny

Vehicle_Border_Crossings_EU_requested_for_Fruit_Fly_Control_Planning
PBAC - Data Asset Request

- Vehicle Border Crossings EU
  Data Asset Name
- Fruit Fly Control Planning
  Purpose Name
- Helena Kertesz
  Requester
- Pending Action
  Status
- *No value*
  Decision Justification
- Request Justification
  This data is needed to conduct an analysis of French fruit being exported in June and July 2020, since a fruit fly issue was detected at that time and further extermination may be needed ▽ Data Minimisation

Suggested Column Filtering
☐ Vehicle Registration
☐ Driver Passport Number
☑ Vehicle Type
☐ Vehicle Make
☐ Vehicle Colour
☑ Border Point
☑ Date and Time of Passing
☑ Purpose of Passage
☑ Goods Imported
☑ Country of Origin
☑ Destination Country

Suggested Row Filtering
Vehicle Registration
Driver Passport Number
Vehicle Type  [Truck ✗]
Vehicle Make
Vehicle Colour
Border Point  [Point A ✗] [Point B ✗] [Point C ✗]
Date and Time of Passing  [June 2020 ✗] [July 2020 ✗]
Purpose of Passage
Goods Imported  [Fruit ✗]
Country of Origin  [France ✗]
Destination Country  [UK ✗] [Germany ✗] [France ✗]

[Save Data Minimisation Changes]

1432 — PPE Assignment - High rejection rate for user access requests (PBAC) Alert Overview    Contents ⓘ Information 1434 — Governance Efficiency Suggestion

User requests is PPE Assignment have 42% rejection rate 74% of the decisions are suggest with Net xxxxx / Progressions xxxxx Suggested recommendation:
○ Consider adding scopes to the purpose
○ Consider xxxxx 1436 — Record Denied Requests

| TITLE | STATUS | | REQUEST JUSTIFICATION | DECISION REASON | REQUESTER |
|---|---|---|---|---|---|
| 🔑 PURPOSE APPROVAL XXX | Deleted | | Access needed as model manager | Not Necessary / Proportional (Overly Broad) | Person 1 |
| 🔑 PURPOSE APPROVAL XXX | Deleted | Pending Action | Require developer access in order to enhance model and upgrade code pipelines to latest standard libraries | No value | Person 2 |
| 🔑 PURPOSE APPROVAL XXX | Deleted | | Access needed as model manager | Confirmed identity, approving as necessary and proportional | Person 3 |
| 🔑 PURPOSE APPROVAL XXX | Approval | | Data scientist requiring access for phase 2 of model development | Confirmed identity, approving as necessary and proportional | Person 4 |
| 🔑 PURPOSE APPROVAL XXX | Approval | | Access needed as model manager | Confirmed identity, approving as necessary and proportional | Person 5 |

Global Audit ⊙ Data Access Exploration ⋂ User Access Exploration

| Select data asset to explore | Inpatient Admissions ▾ | Contains PS | True | Granularity of Data | No value |

1454 — Purposes with access 3

1456

| Purpose | Request Justification | Decision Justification | Decision Timestamp |
|---|---|---|---|
| Health ServiceFinancial Planning | Inpatient Admissions required for calculation and prediction of hospital finances | Approved as required data for purpose | Mar 26, 2021, 1:49 PM |
| Easy Warning Modeling | Changes in hospitalization events are needed as an input to the early warning model as these can indicates emerging risk hotspots | Data use is appropriate and proportional | Mar 18, 2021, 1:49 PM |
| Bed Occupancy Tracking | Inpatient admissions are needed for bed occupancy tracking | Data use is appropriate and proportional | Mar 14, 2021, 1:49 PM |

1457 — User approvals for purposes with access 126

| Register | Purpose of Access | Request Justification | Decision Justification | Decision Timestamp |
|---|---|---|---|---|
| Person 1 | Bed Occupancy Tracking | Hospital admins requiring info on bed occupancy Levels | Approved for Purpose since verified as developer | Apr 30, 2021, 10:36 PM |
| Person 2 | Bed Occupancy Tracking | Inpatient planning team, require this info for weekly reports | Confirmed Identify as hospital staff, approved since request is | Apr 27, 2021, 10:36 AM |
| Person 3 | Bed Occupancy Tracking | Conducting analysis on bed fullness | Verified approved user, and confirmed that request is necessary | Apr 26, 2021, 8:12 AM |
| Person 4 | Bed Occupancy Tracking | I needs access as a satistician working on the analysis | Confirmed as admin , approved for purpose | Apr 24, 2021, 3:26 AM |
| Person 5 | Bed Occupancy Tracking | Developer on purpose, will be maintaing and adding to this analysis | Approved for pupose since verified as developer | Apr 22, 2021, 1:00 PM |
| Person 6 | Bed Occupancy Tracking | Developer on purpose, will be maintaing and adding to this analysis | Confirmed as hired developer | Apr 21, 2021, 5:48 PM |

FIG. 14F

| | Q ⊙Global Audit ⊘Data Access Exploration ⌂User Access Exploration | | | |
|---|---|---|---|---|
| 1462 | SELECT USER | | | |
| 1464 | Q ana ✕ Loading... | | | |
| 1466 | ⊞ Approved Purpose 556 | | | ⊖Revoke All Access |
| | Purpose | Request Justification | Decision Justification | Decision Timestamp |
| | ⊞ Early Warning Detection Dashboard | Performing QA on early warning model. | Identify confirmed and approved as necessary access | Apr 6, 2021, 10:01 AM |
| | ⊞ ICU Consumable Supply Chain | Joining as developer on model | I have verified that this user's request is necessary and compliant | Jan 10, 2021, 9:01 PM |
| | ⊞ Bed Occupancy Tracking | Conducting analysis on bed fullness | Verified approved user, and confirmed that request is necessary and compliant | Feb 27, 2021, 9:36 PM |
| | ⊞ Cancer Services Demand Modelling | Require developer access for model enhancement | I have verified that this user's request is necessary and compliant | Apr 9, 2021, 2:49 AM |
| | ⊞ Bed Occupancy Tracking | I would like access to this since I am hospital staff and will be using this to inform patient care needs | Confirmed identity, approving as necessary and proportional | Apr 4, 2021, 8:12 AM |
| | ⊞ PPE Assignment | Data scientist requiring access for phase 2 of model development | | Jan 25, 2021, 7:12 AM |
| 1468 | ⊞ All Data Assets available to user 25 | | | |
| | Data Asset | Purpose Granting Access | Request Justification | Decision Justification | Decision Timestamp |
| | ⊙ Early Warning Model Predictions | ⊞ Early Warning Modeling | derived data asset produced by this purpose. | Derived data produced by purpose. | Apr 3, 2021, 2:49 PM |
| | ⊙ Hospitalization Events | ⊞ Governance Archiving | Needed as core data for purpose | Data use is appropriate and proportional | Mar 25, 2021, 1:49 PM |
| | ⊙ High Risk Screening | ⊞ Health Inequalities | Moved to archiving since retention period is close to expiry | Data use is appropriate and proportional | Mar 17, 2021, 1:49 PM |
| | ⊙ Hospitalization Events | ⊞ Governance Archiving | Changed in hospitalization events are needed as an input to the early warning model, as these can | Data use is appropriate and proportional | Mar 25, 2021, 1:49 PM |
| | ⊙ Inpatient Admissions | ⊞ Early Warning Modeling | Location mapping is required for mapping bed occupancy to region | Data use is appropriate and proportional | Mar 18, 2021, 1:49 PM |
| | ⊙ Location Data | ⊞ Bed Occupancy Tracking | Location mapping is required for effective | Data use is appropriate and proportional | Mar 21, 2021, 1:49 PM |

FIG. 14G

| Title | Purpose Tags | Purpose Description | Sponsor |
|---|---|---|---|
| Screening Inequalities | Health | Analysis of the update of the vaccinations program across different cohorts for the purpose of ensuring that groups do not get left behind. | Basil Jennings |
| Regional Mutual Aid Operations | Health | Coordination of mutual aid programmes as well as automated analysis of where regions may benefit from these programs and the efficiency of collaboration. | Laura Jones |
| Early Warning Modelling | Modeling | Forecast areas of high risk of overload under covid, given various input risk factors and considering multiple overload/shortage risks | Laura Jones |
| Early Warning Detection Dashboard | Health, Dashboard | Provide users with early warning indicators of "risks" (e.g. COVID-19 cases, admissions, bed capacity as well as hot spot detection. | Laura Jones |
| PPE Assignment | Health, Supply Chain | Manage PPE assignment workflow, using up to date reports and metrics coming in | Laura Jones |
| ICU Consumables Supply Chain | Health, Supply Chain | ICU Consumables Allocation for Suspended Consumables. ICU Stocktake for Mutual Aid | Laura Jones |
| Modeling Virus Spread | Modeling | Forecasting the potential progression of the coronavirus pandemic, including predictions for key metrics like infection events and hospitalizations. | Laura Jones |
| Diagnostic Consumables Supply Chain Operations | Health, Supply Chain | Allocations application and tracking of supply of consumables for diagnostic operations. | Laura Jones |
| Health Service Financial Planning | Health | Quarterly planning and on going tracking of financial operations, including the finances dashboard | Laura Jones |
| Governance Archiving | Governance | Archiving purpose for data governance, strictly controlled to only governance admins | Laura Jones |
| Workforce Archiving | Health | Efficiently assigning components of the workforce to various lines of effort and local centers, accounting for both current need and anticipated future demand. | Laura Jones |
| Bed Occupancy Tracking | Health | Contains dashboards for tracking current and historical bed occupancy trends, as well as statistical analysis | Laura Jones |

FIG. 14H

[PBAC] Add Tags to Purposes

Purposes*

- Isotype Manufacturing Health and Safety Procedures
- In-house Prosthetic Manufacture Health and Safety Analysis
- Public Amenities Infrastructure Reports
- Hospital Maintenance Records

Tags*

- High-Risk Use-Case
- 1 ✕   Edited

⊕ Add item

Submit

Cancel

| New Rule | | |
|---|---|---|
| | ↓ Import from Contour... ⊖ Cancel ⊗ Submit changes | |
| Rule name* ⓘ | Edited | Use of AI data asset in high-risk use-case |
| Rule description* ⓘ | Edited | Under the EU Artificial Intelligence Act, additional review is needed before using AI applications in high-risk use cases |
| Effective date* ⓘ | Edited | Jun 8, 2021 |
| Expiration date* ⓘ | Edited | Sep 30, 2021 |

⊕ [PBAC] Data Asset Request ▽

⊗ FILTER GROUP ▽      ⊛ To Filter Group    ∞ Unwrap Nodes     ⊙ Preview results
• All of the following is true          ── 1494

○ AND ─ VALUE OF ─ ⊡ Purpose Tags ─ contains ─ High-Risk Use-Case

○ AND ─ VALUE OF ─ ⊡ Data Asset Tags ─ contains ─ AI

⊕

➤ RULE ACTION
FOR EACH RESULT     [PBAC] Create Data Asset Request Alert ▽

Summary* ── 1496    AI data asset brought into high-risk use-case purpose    Use Static value ⊖⊙

Data Asset Request Id*    ⊡ Revoker    × ▽    Use Static value ⊖⊙

FIG. 14J

Purpose Access Comparision

Approvals unique to first user

| Purpose | Access Type | Scope |
|---|---|---|
| ⊙ | USER | |
| ⊙ | USER | |
| ⊙ | USER | |
| ⊙ | USER | |
| ⊙ | USER | |
| ⊙ | USER | |
| ⊙ | USER | |

Common Apporavals

| Purpose | Access Type | Scope |
|---|---|---|
| ⊙ | USER | |
| ⊙ | USER | |
| | DEVELOPER | |

Approvals unique to second user

| Purpose | Access Type | xxxx |
|---|---|---|
| ⊙ | USER | |
| ⊙ | USER | |
| ⊙ | USER | |
| ⊙ | DEVELOPER | |
| ⊙ | USER | |
| ⊙ | USER | |
| ⊙ | USER | |

CONTROLLING ACCESS TO ELECTRONIC DATA ASSETS

CROSS-REFERENCE TO RELATED APPLICATIONS

This application claims benefit of U.S. Provisional Patent Application No. 63/117,101, filed Nov. 23, 2020, and titled "CONTROLLING ACCESS TO ELECTRONIC DATA ASSETS."

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Embodiments of the present disclosure relate to systems and techniques for controlling access to electronic data assets. More specifically, the present disclosure includes controlling access, for example by managing and auditing access, to electronic data assets based on purpose-based access controls.

BACKGROUND

A background is provided for introductory purposes and to aid the reader in understanding the detailed description. The background should not be taken as an admission of any prior art to the claims.

Some computer systems limit access to electronic data assets by requiring authentication credentials, such as a username and password. Some computer systems also impose authorization restrictions that specify which user or groups of users can read, write, or modify an electronic data asset.

However, these computer systems can be insufficient for protecting and auditing access to electronic data assets. Furthermore, the use of authentication credentials and authorization restrictions, without more, can be inefficient and take large amounts of time, data, and memory to administer, especially when making large scale changes. Authentication credentials and authorization restrictions may also be insufficient for protecting private or confidential electronic data assets.

SUMMARY

The systems, methods, and devices described herein each have several aspects, no single one of which is solely responsible for its desirable attributes. Without limiting the scope of this disclosure, several non-limiting features will now be described briefly.

In general, access to data assets may be managed by assigning authentication credentials (e.g., usernames and passwords) to users. Computer administrators may further impose authorization restrictions specifying which users or groups of users can read, write, or modify a data asset. There may not be easy methods of propagating large scale changes to the restrictions—to change these, an administrator may have to manually change each permission of each data asset. It can be difficult to track or report why users are accessing authorized data assets. It can also be difficult to track or ensure that users are qualified to access authorized data assets.

Embodiments of the present disclosure include computer systems for purpose-based access to data assets, going beyond simple authentication of users, where the purpose-based access is configured such that data governance may be pushed to the forefront. The systems may provide structure to previously unstructured governance metadata using data objects (also referred to herein simply as "objects"). Advantageously, through the use of objects, governance may be integrated into an access control framework such that analyst users cannot access data without proceeding though a well-defined process that, e.g.: (1) improves data owners' visibility into how data is being used and how processing of the data may impact data subjects, (2) aids in accountability by providing well-defined roles and capturing metadata that is useful for audit, (3) enables revoking of permissions and time bounds on permissions, among other advantages. Unlike systems that implement only authentication and authorization, the systems described herein can log why authenticated and authorized users access data assets, and ensure that users are authorized to access the data assets for a selected purpose, among other advantages. This can be accomplished, for example, by capturing a contextual history of data access requests directly in objects associated with the requests.

A computer system or software framework is provided for purpose-based data permissioning within an organization. The system's data permissioning is based on a user's selected purpose, in addition to authentication and authorization. An organization may establish purposes associated with access to data assets (e.g., datasets, folders, etc.).

The system may include at least three roles for users interacting with the system: (1) purpose sponsor user, who may be the responsible risk owner, and who may approve purpose access requests and creates data access requests; (2) data asset owner user, who may be responsible for one or more data assets, and who may review data access requests for the data assets that they own; and (3) analyst user, who may create purpose access requests with clear justifications for the requests, and who may then access and analyze data. Purpose sponsor users and data asset owner users may each have the ability to assign delegates or administrators for acting on their behalf for various types of requests. Further, according to various embodiments, the system may include the additional role of a governance administrator user, who may be responsible for establishing organization-wide policies regarding data usage and monitoring that these policies are properly implemented by the organization. In some embodiments, the roles of governance administrator user and purpose sponsor user may overlap partially or fully, or a single one of these roles may fulfill the responsibilities of both.

The system may include an object model and generate objects associated with various user interacting with the system in various roles, e.g.: analyst user objects, purpose sponsor objects, and data asset owner objects. The system may further include generating objects associated with purposes and data assets: purpose objects and data asset objects. The system may further include generating objects associated with access requests: purpose access request objects that link an analyst user to a purpose, and data access request objects that link data assets to a purpose. The various objects can store metadata associated with various aspects of the purpose-based data access, which may advantageously enable investigation and auditing. By using the object model, various users can more easily make and propagate large scale changes to the system as compared to, for example, individual editing of user's permissions or tracking access in spreadsheets.

Further, according to various embodiments, various interactive graphical user interfaces are provided for allowing various types of users interact with the systems and methods described herein to, for example, generate, review, and/or modify purpose objects, purpose access request objects, data access request objects, and/or the like.

The interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed information via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Various combinations of the above and below recited features, embodiments, and aspects are also disclosed and contemplated by the present disclosure.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the systems and/or computer systems to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 9A-9C illustrate example interactive graphical user interfaces related to an analyst user, among others, according to one or more embodiments;

FIGS. 10A-10F illustrate example interactive graphical user interfaces related to a purpose sponsor user, among other users, according to one or more embodiments;

FIGS. 11A-11B illustrate example interactive graphical user interfaces related to a purpose sponsor user and/or a data asset owner user, among other users, according to one or more embodiments;

FIGS. 12A-12F illustrate example interactive graphical user interfaces related to a purpose sponsor, among others, according to one or more embodiments;

FIGS. 13A-13E illustrate example interactive graphical user interfaces related to a data asset owner user, among other users, according to one or more embodiments; and FIGS. 14A-14K illustrate example interactive graphical user interfaces related to a governance administrator user, among other users, according to one or more embodiments.

DETAILED DESCRIPTION

Figure 1:
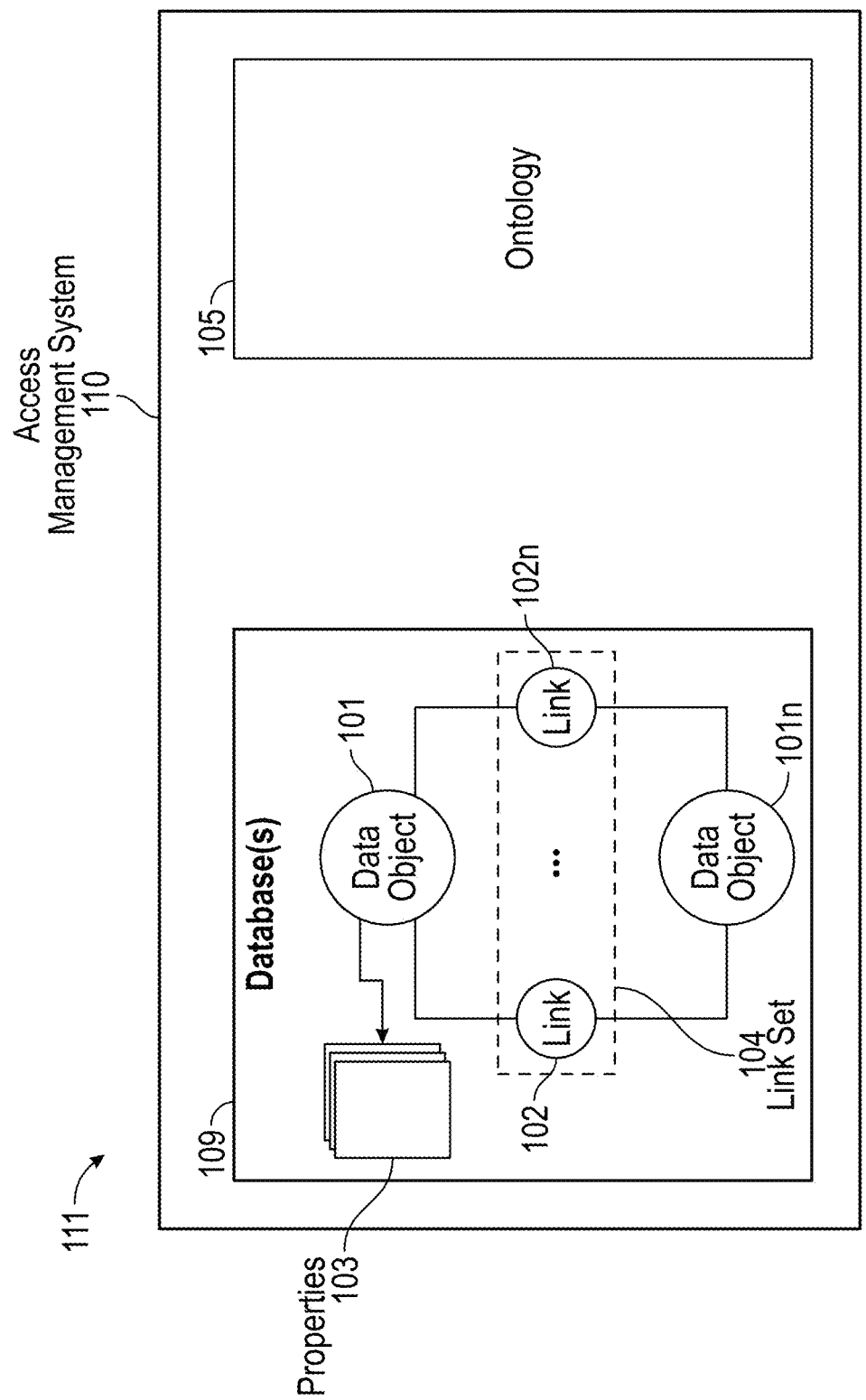
FIG. 1 shows a block diagram illustrating an example access management system, including an example object-centric conceptual data model, according to one or more embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

As noted above, in general, access to data assets may be managed by assigning authentication credentials (e.g., usernames and passwords) to users. Computer administrators may further impose authorization restrictions specifying which users or groups of users can read, write, or modify a data asset. There may not be easy methods of propagating large scale changes to the restrictions—to change these, an administrator may have to manually change each permission of each data asset. It may be difficult to track or report why users are accessing authorized data assets. It can also be difficult to track or ensure that users are qualified to access authorized data assets.

Embodiments of the present disclosure include computer systems for purpose-based access to data assets, going beyond simple authentication of users, where the purpose-based access is configured such that data governance may be pushed to the forefront. The systems may provide structure to previously unstructured governance metadata using data objects (also referred to herein simply as "objects"). Advantageously, through the use of objects, governance may be integrated into an access control framework such that analyst users cannot access data without proceeding though a well-defined process that, e.g.: (1) improves data owners' visibility into how data is being used and how processing of the data may impact data subjects, (2) aids in accountability by providing well-defined roles and capturing metadata that is useful for audit, (3) enables revoking of permissions and time bounds on permissions, among other advantages. Unlike systems that implement only authentication and authorization, the systems described herein can log why authenticated and authorized users access data assets, and ensure that users are authorized to access the data assets for a selected purpose, among other advantages. This can be accomplished, for example, by capturing a contextual history of data access requests directly in objects associated with the requests.

A computer system or software framework is provided for purpose-based data permissioning within an organization. The system's data permissioning is based on a user's selected purpose, in addition to authentication and authorization. An organization may establish purposes associated with access to data assets (e.g., datasets, folders, etc.).

The system may include at least three roles for user interacting with the system: (1) purpose sponsor user, who is the responsible risk owner, and who approves purpose access requests and creates data access requests; (2) data asset owner user, who is responsible for one or more data assets, and who reviews data access requests for the data assets that they own; and (3) analyst user, who creates purpose access requests with clear justifications for the requests, and who then accesses and analyzes data. Purpose sponsor users and data asset owner users each have the ability to assign delegates or administrators for acting on their behalf for various types of requests.

The system may include an object model and generate objects associated with various user interacting with the system in various roles, e.g.: analyst user objects, purpose sponsor objects, and data asset owner objects. The system may further include generating objects associated with purposes and data assets: purpose objects and data asset objects. The system may further include generating objects associated with access requests: purpose access request objects that link an analyst user to a purpose, and data access request objects that link data assets to a purpose. The various objects can store metadata associated with various aspects of the purpose-based data access, which may advantageously enable investigation and auditing. By using the object model, various users can more easily make and propagate large scale changes to the system as compared to, for example, individual editing of user's permissions or tracking access in spreadsheets.

Further, according to various embodiments, various interactive graphical user interfaces are provided for allowing various types of users interact with the systems and methods described herein to, for example, generate, review, and/or modify purpose objects, purpose access request objects, data access request objects, and/or the like.

The following is an example workflow of the system: Purpose sponsor user creates a new purpose (e.g., a purpose titled: Dashboard for Regional Decision Makers), causing the generation of a purpose object. Purpose sponsor user identifies data assets for inclusion within scope of the purpose. As part of the identification of data assets for inclusion, purpose sponsor user may determine any relevant granular access restrictions (e.g. geography or role-based restrictions). Purpose sponsor user requests use of data asset from data asset owner user, providing justification and legal basis, causing the generation of one or more data access request objects. Related metadata is recorded with the data access request objects. Following an assessment, the data asset owner user approves the use data asset under the purpose. The approval is recorded with the data access request object as metadata. Purpose sponsor user optionally nominates key roles for automatic approval for access to the purpose (e.g. regional directors have automatic access to purpose: "Dashboard for Regional Decision Makers"). Additionally or alternatively, individual users can request access to the purpose. In either case, the system generates corresponding purpose access request objects. Related metadata is recorded with the purpose access request objects. The purpose sponsor user (and/or their delegates) grants access to the purpose on a case-by-case basis (e.g., for other individuals within regions, as nominated by regional directors). The grant of access is recorded with the purpose access request object as metadata.

Additional data can be brought in to the scope of the purpose at the request of the purpose sponsor user and with the approval of the data asset owner user, following a similar flow to that described above. When additional data is brought into a purpose, all analyst users with access to the purpose are granted access to the additional data, when accessed within the purpose. Advantageously, in view of the flow described above and the object-based system, at any time it may be possible to answer questions such as: "what data can this analyst user see?", "why are they allowed to see it?", and the like.

II. Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Data Asset: Any data item or group of data items. May include data and items that can be accessed by a user through a computer system. Non-limiting examples include files, folders, computing machines, memory, processors, servers, hard drives, databases, laptops, RSA tokens, etc. Also referred to herein as "resources" or "computer resources".

Data Object or Object: A data container for information representing specific things that have a number of definable properties. For example, a data object can represent an entity such as a person or user, a place, a group, an organization, a resource, a data asset, a request, a purpose, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: A type of a data object (e.g., user, data asset, purpose, request, etc.). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

III. Example Object Centric Data Model

To provide a framework for the following discussion of specific systems and methods described herein, an example access management system 110 using an ontology 105 will now be described. The access management system 110 is described in the context of an example computing environment 111. This description is provided for the purpose of providing an example and is not intended to limit the techniques to the example data model, the example access management system, or the example access management system's use of an ontology to represent information.

In some embodiments, a body of data is conceptually structured according to an object-centric data model represented by ontology 105. The conceptual data model is independent of any particular database used for durably storing one or more database(s) 109 based on the ontology 105. For example, each object of the conceptual data model may correspond to one or more rows in a relational database or an entry in Lightweight Directory Access Protocol (LDAP) database, or any combination of one or more databases.

FIG. 1 shows a block diagram illustrating an example access management system, including an example object-centric conceptual data model, according to one or more embodiments of the present disclosure. An ontology 105, as noted above, may include stored information providing a data model for storage of data in the database 109. The ontology 105 may be defined by one or more object types, which may each be associated with one or more property types. At the highest level of description, data object 101 is a container for information representing things in the world. For example, data object 101 can represent an entity such as a person or user, a place, a group, an organization, a resource, a data asset, a request, a purpose, a link, or other noun. Data object 101 can represent an event that happens at a point in time or for a duration. Data object 101 can represent a document or other unstructured data source such as an e-mail message, a news report, or a written paper or article. Each data object 101 is associated with a unique identifier that uniquely identifies the data object within the access management system.

Different types of data objects may have different property types. For example, a "Person" data object might have an "Eye Color" property type and an "Event" data object might have a "Date" property type. Each property 103 as represented by data in the access management system 110 may have a property type defined by the ontology 105 used by the database 105.

Objects may be instantiated in the database 109 in accordance with the corresponding object definition for the particular object in the ontology 105. For example, a specific folder (e.g., an object of type "Data Asset") at "C:\Folder" (e.g., a property of type "directory") may be stored in the database 109 as a data asset object metadata as defined within the ontology 105.

The data objects defined in the ontology 105 may support property multiplicity. In particular, a data object 101 may be allowed to have more than one property 103 of the same property type. For example, a "Person" data object might have multiple "Address" properties or multiple "Name" properties.

Each link 102 represents a connection between two data objects 101. In some embodiments, the connection can be through a relationship, an event, a property, or through matching properties. A relationship connection may be asymmetrical or symmetrical. For example, "Person" data object A may be connected to "Person" data object B by a "Boss Of" relationship (where "Person" data object B has an asymmetric "Boss Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Office" data object representing a particular business office if they worked at the same place, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing accountants at a finance firm, may both have a "CPA Qualified" property that indicates that both of them have CPA licenses. If both people work at the same office, then their "Business Address" properties likely contain similar, if not identical property values. In some embodiments, a link between two data objects may be established based on similar or matching properties (e.g., property types and/or property values) of the data objects. These are just some examples of the types of connections that may be represented by a link, and other types of connections may be represented; embodiments are not limited to any particular types of connections between data objects. For example, a document might contain references to two different objects. For example, a document may contain a reference to an event (one object), and a person (a second object). A link between these two objects may represent a connection between these two entities through their co-occurrence within the same document.

Each data object 101 can have multiple links with another data object 101 to form a link set. Each link 102 as represented by data in a database may have a link type defined by the database ontology used by the database.

Figure 2A:
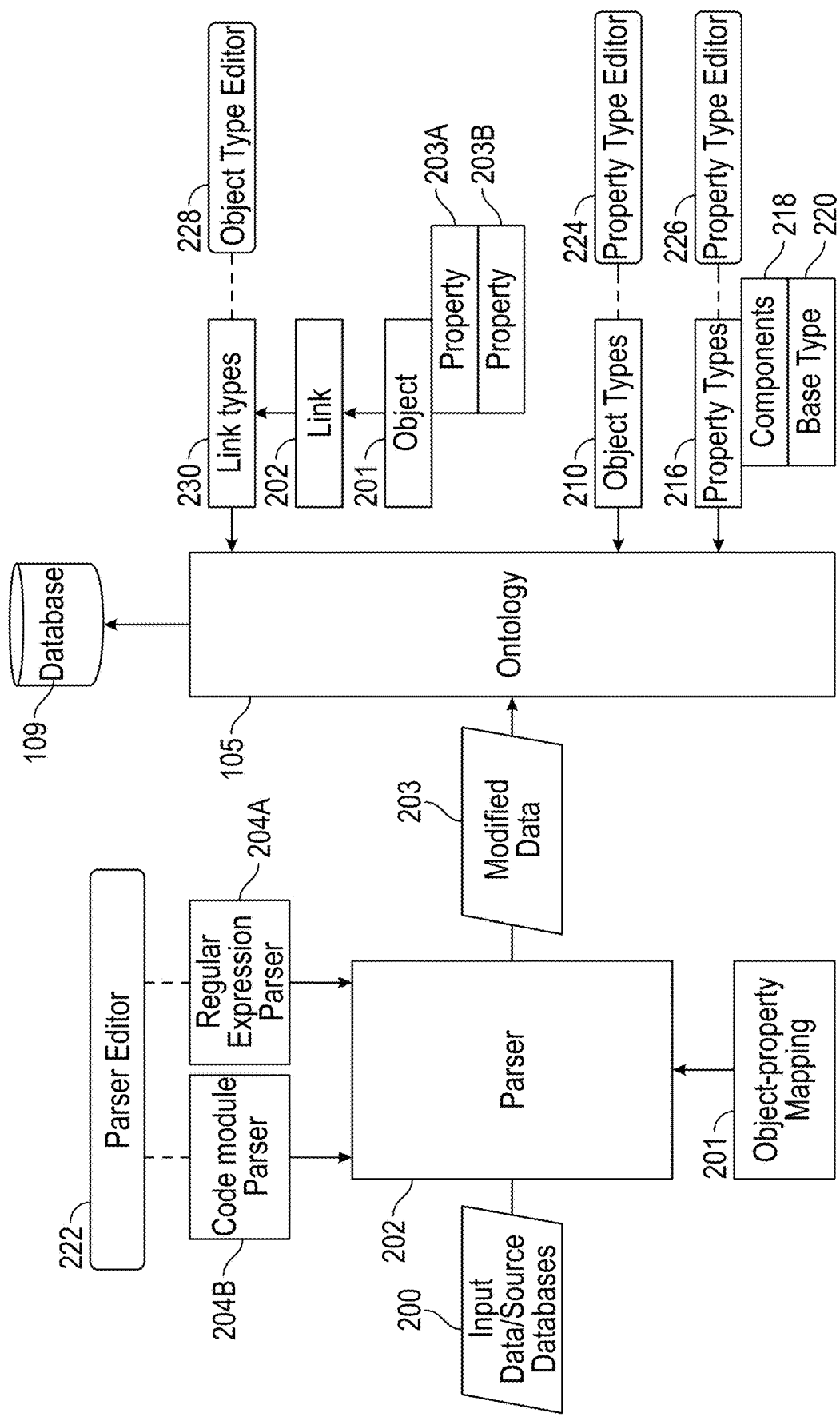
FIG. 2A shows a block diagram illustrating example components and data that may be used in identifying and storing data according to an ontology, according to one or more embodiments.

FIG. 2A shows a block diagram illustrating example components and data that may be used in identifying and storing data according to an ontology, according to one or more embodiments. In this example, the ontology may be configured, and data in the data model populated, by a system of parsers and ontology configuration tools. In the embodiment of FIG. 2A, input data 200 is provided to parser 202. The input data may comprise data from one or more sources. For example, a rental car institution may have one or more databases with information on calendar entries, rental cars, and people. The databases may contain a variety of related information and attributes about each type of data, such as a "date" for a calendar entries, an address for a person, and a date for when a rental car is rented. The parser 202 is able to read a variety of source input data types and determine which type of data it is reading.

In accordance with the discussion above, the example ontology 105 comprises stored information providing the data model of data stored in database 109, and the ontology is defined by one or more object types 210, one or more property types 216, and one or more link types 230. Based on information determined by the parser 202 or other mapping of source input information to object type, one or more data objects 101 may be instantiated in the database 109 based on respective determined object types 210, and each of the objects 101 has one or more properties 103 that are instantiated based on property types 216. Two data objects 101 may be connected by one or more links 102 that may be instantiated based on link types 230. The property types 216 each may comprise one or more data types 218, such as a string, number, etc. Property types 216 may be instantiated based on a base property type 220. For example, a base property type 220 may be "Locations" and a property type 216 may be "Home."

In some embodiments, an administrator of the system (e.g., a user with the proper role and/or permissions) uses an object type editor 224 to create and/or modify the object types 210 and define attributes of the object types. In some embodiments, an administrator of the system uses a property type editor 226 to create and/or modify the property types 216 and define attributes of the property types. In some embodiments, an administrator of the system uses link type editor 228 to create the link types 230. Alternatively, other programs, processes, or programmatic controls may be used to create link types and property types and define attributes, and using editors is not required.

In some embodiments, creating a property type 216 using the property type editor 226 involves defining at least one parser definition using a parser editor 222. A parser definition comprises metadata that informs parser 202 how to parse input data 200 to determine whether values in the input data can be assigned to the property type 216 that is associated with the parser definition. In an embodiment, each parser definition may comprise a regular expression parser 204A or a code module parser 204B. In other embodiments, other kinds of parser definitions may be provided using scripts or other programmatic elements. Once defined, both a regular expression parser 204A and a code module parser 204B can provide input to parser 202 to control parsing of input data 200.

Using the data types defined in the ontology, input data 200 may be parsed by the parser 202 determine which object type 210 should receive data from a record created from the input data, and which property types 216 should be assigned to data from individual field values in the input data. Based on the object-property mapping 201 (including properties 208A, 208B), the parser 202 selects one of the parser definitions that is associated with a property type in the input data. The parser parses an input data field using the selected parser definition, resulting in creating new or modified data 203. The new or modified data 203 is added to the database 109 according to ontology 105 by storing values of the new or modified data in a property of the specified property type. As a result, input data 200 having varying format or syntax can be created in database 109. The ontology 105 may be modified at any time using object type editor 224, property type editor 226, and link type editor 228, or under program control without human use of an editor. Parser editor 222 enables creating multiple parser definitions that can successfully parse input data 200 having varying format or syntax and determine which property types should be used to transform input data 200 into new or modified input data 203.

IV. Example Data Management System

Figure 2B:
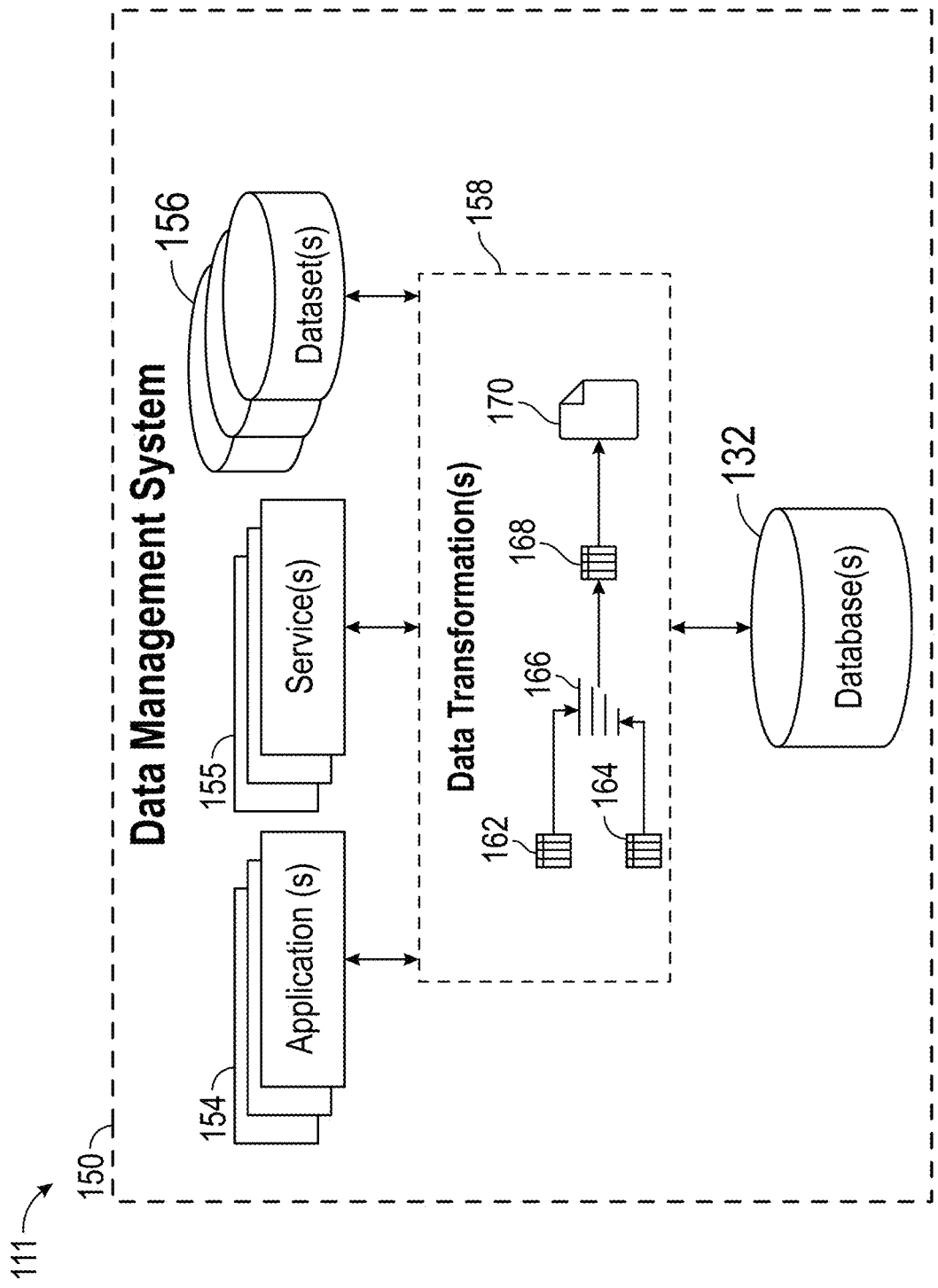
FIG. 2B shows a block diagram illustrating an example data management system, according to one or more embodiments.

FIG. 2B shows a block diagram illustrating an example data management system 150, according to one or more embodiments. In particular, the data management system 150 can be used in the context of computing environment 111 along with the access management system 110 described above with respect to FIG. 1. In the embodiments of FIG. 2B, computing environment 111 can be similar to, overlap with, and/or be used in conjunction with the computing environment 111 of FIG. 1. For example, the computing environment 111 can include a database 132, which may be similar to the database 109 in the computing environment 111 of FIG. 1. However, the computing environment 111 can also include the data management system 150.

The example data management system 150 includes one or more applications 154, one or more services 155, one or more initial datasets 156, and a data transformation process 158 (also referred to herein as a build process). The example data management system 150 can include a data pipeline system. The data management system 150 can transform data and record the data transformations. The one or more applications 154 can include applications that enable users to view datasets, interact with datasets, filter data sets, and/or configure dataset transformation processes or builds. The one or more services 155 can include services that can trigger the data transformation builds and application programming interface ("API") services for receiving and transmitting data. The one or more initial datasets 156 can be automatically retrieved from external sources and/or can be manually imported by a user. The one or more initial datasets 156 can be in many different formats such as a tabular data format (SQL, delimited, or a spreadsheet data format), a data log format (such as network logs), or time series data (such as sensor data).

The data management system 150, via the one or more services 155, can apply the data transformation process 158. An example data transformation process 158 is shown. The data management system 150 can receive one or more initial datasets 162, 164. The data management system 150 can apply a transformation to the dataset(s). For example, the data management system 150 can apply a first transformation 166 to the initial datasets 162, 164, which can include joining the initial datasets 162, 164 (such as or similar to a SQL JOIN), and/or a filtering of the initial datasets 162, 164. The output of the first transformation 166 can include a modified dataset 168. A second transformation of the modified dataset 168 can result in an output dataset 170, such as a report or a joined table in a tabular data format that can be stored in the database 132. Each of the steps in the example data transformation process 158 can be recorded by the data management system 150 and made available as a resource or data asset. For example, a data asset can include a dataset and/or a dataset item, a transformation, or any other step in a data transformation process. As mentioned above, the data transformation process or build 158 can be triggered by the data management system 150, where example triggers can include nightly build processes, detected events, or manual triggers by a user. Additional aspects of data transformations and the data management system 150 are described in further detail below.

The techniques for recording and transforming data in the data management system 150 may include maintaining an immutable history of data recording and transformation actions such as uploading a new dataset version to the data management system 150 and transforming one dataset version to another dataset version. The immutable history is referred to herein as "the catalog." The catalog may be stored in a database. Preferably, reads and writes from and to the catalog are performed in the context of ACID-compliant transactions supported by a database management system. For example, the catalog may be stored in a relational database managed by a relational database management system that supports atomic, consistent, isolated, and durable (ACID) transactions.

The catalog can include versioned immutable "datasets." More specifically, a dataset may encompass an ordered set of conceptual dataset items. The dataset items may be ordered according to their version identifiers recorded in the catalog. Thus, a dataset item may correspond to a particular version of the dataset. A dataset item may represent a snapshot of the dataset at a particular version of the dataset. As a simple example, a version identifier of '1' may be recorded in the catalog for an initial dataset item of a dataset. If data is later added to the dataset, a version identifier of '2' may be recorded in the catalog for a second dataset item that conceptually includes the data of the initial dataset item and the added data. In this example, dataset item '2' may represent the current dataset version and is ordered after dataset item '1'.

As well as being versioned, a dataset may be immutable. That is, when a new version of the dataset corresponding to a new dataset item is created for the dataset in the system, pre-existing dataset items of the dataset are not overwritten by the new dataset item. In this way, pre-existing dataset items (i.e., pre-existing versions of the dataset) are preserved when a new dataset item is added to the dataset (i.e., when a new version of the dataset is created). Note that supporting immutable datasets is not inconsistent with pruning or deleting dataset items corresponding to old dataset versions. For example, old dataset items may be deleted from the system to conserve data storage space.

A version of dataset may correspond to a successfully committed transaction against the dataset. In these embodiments, a sequence of successfully committed transactions against the dataset corresponds to a sequence of dataset versions of the dataset (i.e., a sequence of dataset items of the dataset).

A transaction against a dataset may add data to the dataset, edit existing data in the dataset, remove existing data from the dataset, or a combination of adding, editing, or removing data. A transaction against a dataset may create a new version of the dataset (i.e., a new dataset item of the dataset) without deleting, removing, or modifying pre-existing dataset items (i.e., without deleting, removing, or modifying pre-existing dataset versions). A successfully committed transaction may correspond to a set of one or more files that contain the data of the dataset item created by the successful transaction. The set of files may be stored in a file system.

In the catalog, a dataset item of a dataset may be identified by the name or identifier of the dataset and the dataset version corresponding to the dataset item. In a preferred embodiment, the dataset version corresponds an identifier assigned to the transaction that created the dataset version. The dataset item may be associated in the catalog with the set of files that contain the data of the dataset item. In a preferred embodiment, the catalog treats the set of files as opaque. That is, the catalog itself may store paths or other identifiers of the set of files but may not otherwise open, read, or write to the files.

In sum, the catalog may store information about datasets. The information may include information identifying different versions (i.e., different dataset items) of the datasets. In association with information identifying a particular version (i.e., a particular dataset item) of a dataset, there may be information identifying one or more files that contain the data of the particular dataset version (i.e., the particular dataset item).

The catalog may store information representing a non-linear history of a dataset. Specifically, the history of a dataset may have different dataset branches. Branching may be used to allow one set of changes to a dataset to be made independent and concurrently of another set of changes to the dataset. The catalog may store branch names in association with dataset version identifiers for identifying dataset items that belong to a particular dataset branch.

The catalog may provide dataset provenance at the transaction level of granularity. As an example, suppose a transformation is executed in the data management system 150 multiple times that reads data from dataset A, reads data from dataset B, transforms the data from dataset A and the data from dataset B in some way to produce dataset C. As mentioned, this transformation may be performed multiple times. Each transformation may be performed in the context of a transaction. For example, the transformation may be performed daily after datasets and B are updated daily in the context of transactions. The result being multiple versions of dataset A, multiple versions of dataset B, and multiple versions of dataset C as a result of multiple executions of the transformation. The catalog may contain sufficient information to trace the provenance of any version of dataset C to the versions of datasets A and B from which the version of dataset C is derived. In addition, the catalog may contain sufficient information the trace the provenance of those versions of datasets A and B to the earlier versions of datasets A and B from which those versions of datasets A and B were derived.

The provenance tracking ability is the result of recording in the catalog for a transaction that creates a new dataset version, the transaction or transactions that the given transaction depends on (e.g., is derived from). The information recorded in the catalog may include an identifier of each dependent transaction and a branch name of the dataset that the dependent transaction was committed against.

According to some embodiments, provenance tracking extends beyond transaction level granularity to column level granularity. For example, suppose a dataset version A is structured as a table of two columns and a dataset version B is structured as a table of five columns. Further assume, column three of dataset version B is computed from column one of dataset version A. In this case, the catalog may store information reflecting the dependency of column three of dataset version B on column one of dataset version A.

The catalog may also support the notion of permission transitivity. For example, suppose the catalog records information for two transactions executed against a dataset referred to in this example as "Transaction 1" and Transaction 2." Further suppose a third transaction is performed against the dataset which is referred to in this example as "Transaction 3." Transaction 3 may use data created by Transaction 1 and data created by Transaction 2 to create the dataset item of Transaction 3. After Transaction 3 is executed, it may be decided according to organizational policy that a particular user should not be allowed to access the data created by Transaction 2. In this case, as a result of the provenance tracking ability, and in particular because the catalog records the dependency of Transaction 3 on Transaction 2, if permission to access the data of Transaction 2 is revoked from the particular user, permission to access the data of Transaction 3 may be transitively revoked from the particular user.

The transitive effect of permission revocation (or permission grant) can apply to an arbitrary number of levels in the provenance tracking. For example, returning to the above example, permission may be transitively revoked for any transaction that depends directly or indirectly on the Transaction 3.

According to some embodiments, where provenance tracking in the catalog has column level granularity. Then permission transitivity may apply at the more fine-grained column level. In this case, permission may be revoked (or granted) on a particular column of a dataset and based on the column-level provenance tracking in the catalog, permission may be transitively revoked on all direct or indirect descendent columns of that column.

A build service can manage transformations which are executed in the system to transform data. The build service may leverage a directed acyclic graph data (DAG) structure to ensure that transformations are executed in proper dependency order. The graph can include a node representing an output dataset to be computed based on one or more input datasets each represented by a node in the graph with a directed edge between node(s) representing the input dataset(s) and the node representing the output dataset. The build service traverses the DAG in dataset dependency order so that the most upstream dependent datasets are computed first. The build service traverses the DAG from the most upstream dependent datasets toward the node representing the output dataset rebuilding datasets as necessary so that they are up-to-date. Finally, the target output dataset is built once all of the dependent datasets are up-to-date.

The data management system 150 can support branching for both data and code. Build branches allow the same transformation code to be executed on multiple branches. For example, transformation code on the master branch can be executed to produce a dataset on the master branch or on another branch (e.g., the develop branch). Build branches also allow transformation code on a branch to be executed to produce datasets on that branch. For example, transformation code on a development branch can be executed to produce a dataset that is available only on the development branch. Build branches provide isolation of re-computation of graph data across different users and across different execution schedules of a data pipeline. To support branching, the catalog may store information represents a graph of dependencies as opposed to a linear dependency sequence.

The data management system 150 may enable other data transformation systems to perform transformations. For example, suppose the system stores two "raw" datasets R1 and R2 that are both updated daily (e.g., with daily web log data for two web services). Each update creates a new version of the dataset and corresponds to a different transaction. The datasets are deemed raw in the sense that transformation code may not be executed by the data management system 150 to produce the datasets. Further suppose there is a transformation A that computes a join between datasets R1 and R2. The join may be performed in a data transformation system such a SQL database system, for example. More generally, the techniques described herein are agnostic to the particular data transformation engine that is used. The data to be transformed and the transformation code to transform the data can be provided to the engine based on information stored in the catalog including where to store the output data.

According to some embodiments, the build service supports a push build. In a push build, rebuilds of all datasets that depend on an upstream dataset or an upstream transformation that has been updated are automatically determined based on information in the catalog and rebuilt. In this case, the build service may accept a target dataset or a target transformation as an input parameter to a push build command. The build service than determines all downstream datasets that need to be rebuilt, if any.

As an example, if the build service receives a push build command with dataset R1 as the target, then the build service would determine all downstream datasets that are not up-to-date with respect to dataset R1 and rebuild them. For example, if dataset D1 is out-of-date with respect to dataset R1, then dataset D1 is rebuilt based on the current versions of datasets R1 and R2 and the current version of transformation A. If dataset D1 is rebuilt because it is out-of-date, then dataset D2 will be rebuilt based on the up-to-date version of dataset D1 and the current version of transformation B and so on until all downstream dataset of the target dataset are rebuilt. The build service may perform similar rebuilding if the target of the push build command is a transformation.

The build service may also support triggers. In this case, a push build may be considered a special case of a trigger. A trigger, generally, is a rebuild action that is performed by the build service that is triggered by the creation of a new version of a dataset or a new version of a transformation in the system.

A schema metadata service can store schema information about files that correspond to transactions reflected in the catalog. An identifier of a given file identified in the catalog may be passed to the schema metadata service and the schema metadata service may return schema information for the file. The schema information may encompass data schema related information such as whether the data in the file is structured as a table, the names of the columns of the table, the data types of the columns, user descriptions of the columns, etc.

The schema information can be accessible via the schema metadata service may versioned separately from the data itself in the catalog. This allows the schemas to be updated separately from datasets and those updates to be tracked separately. For example, suppose a comma separated file is uploaded to the system as particular dataset version. The catalog may store in association with the particular dataset version identifiers of one or more files in which the CSV data is stored. The catalog may also store in association with each of those one or more file identifiers, schema information describing the format and type of data stored in the corresponding file. The schema information for a file may be retrievable via the scheme metadata service given an identifier of the file as input. Note that this versioning scheme in the catalog allows new schema information for a file to be associated with the file and accessible via the schema metadata service. For example, suppose after storing initial schema information for a file in which the CSV data is stored, updated the schema information is stored that reflects a new or better understanding of the CSV data stored in the file. The updated schema information may be retrieved from the schema metadata service for the file without having to create a new version of the CSV data or the file in which the CSV data is stored.

When a transformation is executed, the build service may encapsulate the complexities of the separate versioning of datasets and schema information. For example, suppose transformation A described above in a previous example that accepts the dataset R1 and dataset R2 as input is the target of a build command issued to the build service. In response to this build command, the build service may determine from the catalog the file or files in which the data of the current versions of datasets R1 and R2 is stored. The build service may then access the schema metadata service to obtain the current versions of the schema information for the file or files. The build service may then provide all of identifiers or paths to the file or files and the obtained schema information to the data transformation engine to execute the transformation A. The underlying data transformation engine interprets the schema information and applies it to the data in the file or files when executing the transformation A.

The various data assets (e.g., files, data items, datasets, portions of datasets, transformations, and/or the like) of the data management system 150 may also be stored in the databases 132.

The data management system 150 can include various permissioning functionalities. For example, the data management system 150 can implements access control lists and/or other permissioning functionality that can enable highly granular permissioning of data assets (e.g., files, data items, datasets, portions of datasets, transformations, and/or the like). The permissioning may include, for example, specific permissions for read/write/modify, and/or the like, which may be applicable to specific users, groups of users, roles, and/or the like.

In an implementation, the data management system 150 includes "projects", which comprise groups of data assets. Users granted access to a given project are also thereby granted access to all data assets within that project, subject to further permissioning such as read/write/modify, as mentioned above. As further described herein, in an implementation the access management system 110 expands the permissioning functionality of the data management system 150 by associating "purposes" (e.g., as defined by purpose objects) of the access management system 110 with "projects" of the data management system 150. Thus, for example, a user may be granted access to the data assets of a project if they are approved to a particular purpose. Further details regarding granting access to purposes are provided herein.

V. Example Access Management System and Related Computing Environment

Figure 3:
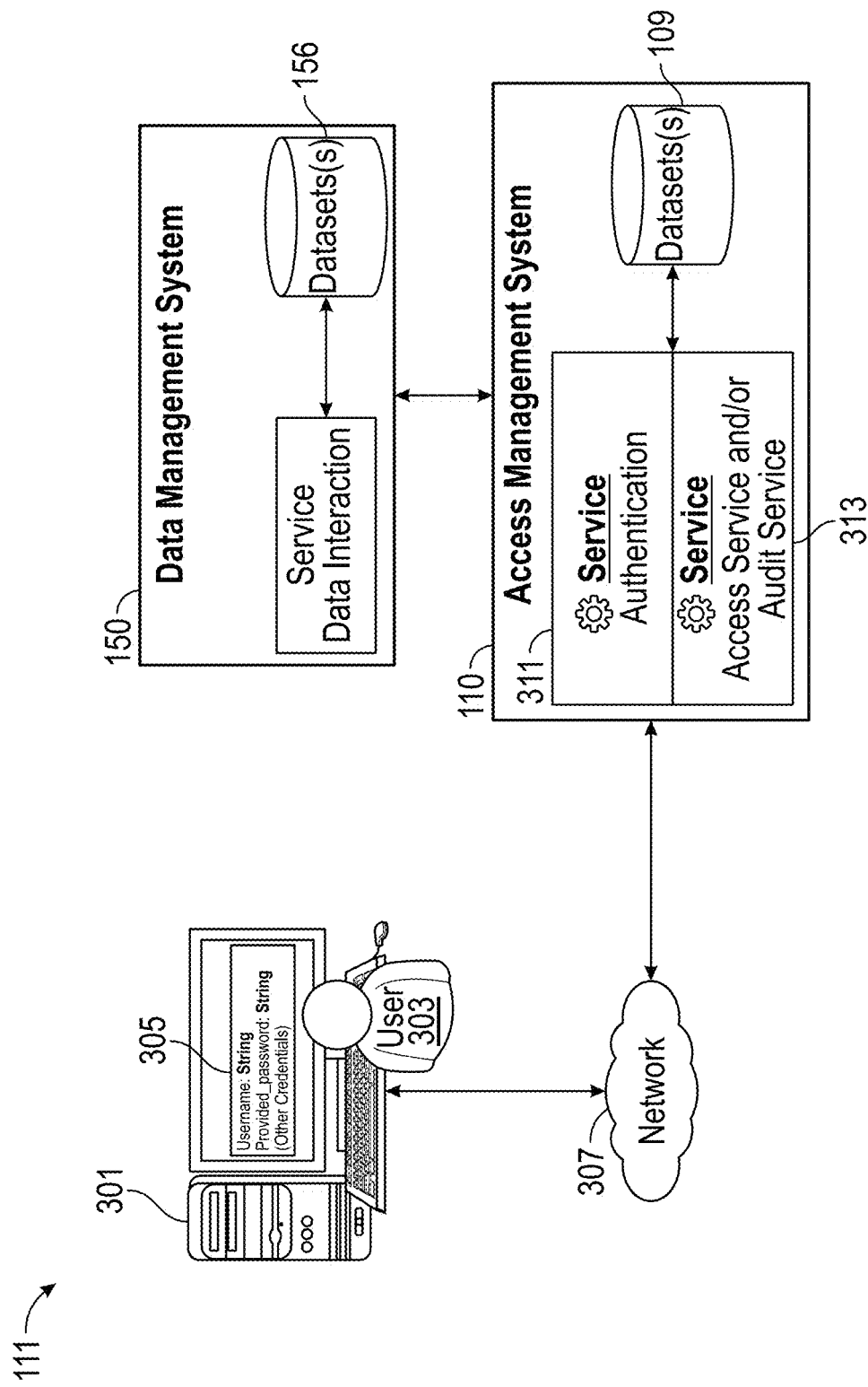
FIG. 3 shows an example block diagram including a computing environment for controlling access to electronic data assets, according to one or more embodiments.

FIG. 3 shows an example block diagram including a computing environment 111 for controlling access to electronic data assets, according to one or more embodiments. The computing environment 111 includes the access management system 110 and the data management system 150, examples of which are described above in reference to FIGS. 1 and 2A-2B. FIG. 3 further shows an example computer system 301 being used by a user 303, and a network 307 enabling communication between the computer system 301 and the access management system 110. As shown, the access management system 110 and the data management system 150 may also be in communication with each other via direct connection, or one of more computer networks. As shown, the access management system 110 may include an authentication service 311 and an access service and/or audit service 313 (generally referred to herein simply as access service 313), and the data management system 150 may include a data interaction service 315.

In various embodiments, the various aspects of the access management system 110 and the data management system 150 may be implemented in various ways. For example, the access management system 110 and the data management system 150 may be implemented as a single computing system, and/or various functions or services of the two may be split up and/or arranged differently from that shown in the example computing environment 111 of FIG. 3. Thus, for example, while in FIG. 3 dataset(s) 156 and database(s) 109 are shown as being implemented in the respective data management system 150 and access management system 110, in other implementations the datasets/databases may be combined, separated into additional datasets/databases, and/ or the like. Similarly, the ontology 105, and the database(s) 132 may be combined and/or separated, and/or combined with one or more of the dataset(s) and database(s) 109. As another example, the various services of the data management system 150 and access management system 110 may be combined and/or separated in additional services, and/or may be implemented in different ones of the various systems of the present disclosure. However, for the purpose of providing a concise description in the present disclosure, the various functionalities are described in reference to the example implementation shown in the computing environment 111 of FIG. 3.

As used herein, the term "system" generally refers to the access management system 110, but may also include various aspects of the data management system 150 and/or other computer systems of the present disclosure.

In general, and as further described herein, the authentication service 311 may authenticate users who access the system, e.g., via a username and password, and/or other appropriate authentication mechanisms. Also, in general and as further described herein, the access service 313 may provide, to various users, purpose-based access to data assets (e.g., data items, datasets, and/or the like, which may be stored in the dataset(s) 156 and/or another data store or database of the system), and may also provide various functionalities for permissioning, generating and/or modifying objects (e.g., purpose objects, data asset objects, purpose access request objects, data access request object, various user objects, and/or the like), providing interactive user interfaces, and/or the like. Also, in general and as further described herein, the data interaction service 315 may provide various users with interactive user interfaces for interacting with data assets, e.g., data assets associated with a purpose/"project".

The example computer system 301, with which a user 303 may interact, communicates with the system via the network 307 (e.g., a local or extended network, which may include the Internet, and which may include multiple networks that may variously be wired or wireless) to, for example, transmit authentication credentials 305, receive and/or send data and/or commands, provide various interactive user interface functionality to the user. The example computer system 301 is representative of multiple computer systems that may communicate with the access management system 110 and/or data management system 150, and which may be used by various types of users for the various functionality as described herein.

VI. Authentication

A user can be authenticated using authentication credentials, e.g., based on a username and password provided by the user. The user 303 may use a variety of different types of computer systems 301 to access various resources. The computer system 301 can include a desktop, laptop, terminal, smartphone, smartTV, etc. The user 303 may desire to access a variety of resources, such as files, folders, computing machines, memory, processors, servers, hard drives, databases, laptops, RSA tokens, client badges, etc., including time or job slots for using any of the aforementioned resources/data assets. Access to the resources can be restricted and audited as discussed herein.

The authentication credentials 305 provided by a user can include a username and password. In various embodiments, the authentication credentials 305 can include additional information, such as answers to challenge questions, hardware identifiers, passwords received through a second communication channel via N-factor authentication, time-based authentication data, etc. The authentication credentials 305 can be transmitted through a network 307 to the access management system 110 to authenticate the user 303.

The access management system 110 can use the authentication service 311 to compare the authentication credentials 305 against the authentication credentials of known user objects (e.g., analyst user objects, purpose sponsor objects, data asset objects, and/or the like) in, e.g., database 109 and/or another database. An example flowchart for the authentication service 311 is discussed in reference to FIG. 4.

The access management system 110 can use an access and/or audit system to manage user access to various computer resources/data assets. Example flowcharts and functionality for access and/or audit services are described, e.g., in reference to FIGS. 5A-5B, 6A-6B, and 7A-7D, and the various Figures with example interactive graphical user interfaces of the present disclosure.

The database 109 can include a plurality of objects representing known users. The database 109 can additionally include a plurality of other objects, such as shown and described in reference to FIG. 5A.

The known user object is represented with an object model, and can have a plurality of properties. For example, the known user object can include a property such as "Authen_Info" to indicate information used for authentication credentials. The authentication credentials can include a username, an encrypted password, encryption scheme, etc. The authentication credentials can include string values, other object types, and/or references to other resources such as an encrypted database.

The known user object can also include properties such as "Author_Info" to indicate various permissions that the known user has any type of authorization for. In some embodiments, the authorizations can specify permissions such as objects and/or types of objects the user has authorization to read from, write to, modify, and/or otherwise access. In some embodiments, the property indicating authorizations of the known user object can be omitted, and authorizations can be handled at an operating system level or other level. Other properties can indicate linked objects that represent purposes for accessing purposes, as described herein. Although the object model includes example types/objects associated with each property, it will be understood that various embodiments can use different data types and/or types of objects for the properties. For example, the Authen_Info can be an object indicating authentication credentials, a String, a double, etc. As further explained with respect to FIG. 5A, any of the properties of the various objects can additionally or alternatively be indicated using links.

Figure 4:
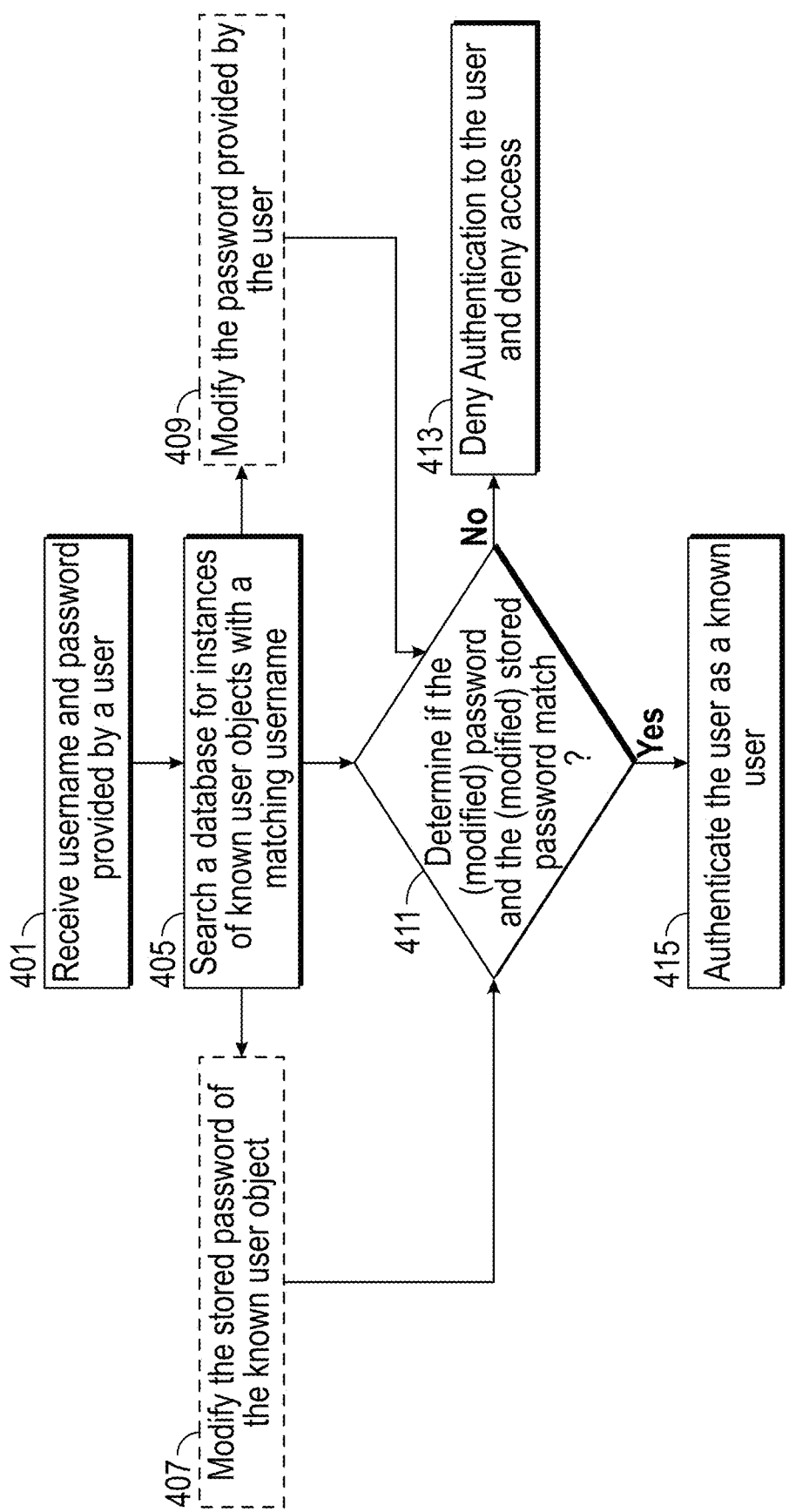
FIG. 4 shows a block diagram illustrating an example authentication service, according to one or more embodiments.

FIG. 4 shows a block diagram illustrating an example authentication service (e.g., which may be implemented by authentication service 311), according to one or more embodiments. At block 401, a username and password provided by a user can be received. In some embodiments, other authentication credentials can be received as well.

At block 405, a database (such as database 109 of FIG. 3) can be searched for instances of known user objects that match the username provided by the user. In some embodiments, the search can be performed by referencing an index. A matching known user object can be found. In some embodiments, the searching for a matching user can be performed at the operating system level with or without the use of objects.

At block 411, it can be determined if the password provided by the user and the stored password for the matching known user match. In various embodiments, either one or both of the stored password or the password provided by the user may be modified, at block 407 and at block 409 respectively, before the comparison is performed at block 411 to determine a match. Modifications to passwords can include encryption, decryption, salting, hashing, etc.

If at block 411, the password provided by the user and the stored password of the known user does not match, then at block 413, the user is denied authentication and denied access. If at block 411, the password provided by the user and the stored password of the known user do match, at block 415, the user can be authenticated as a known user. Further access to resources/data assets can be restricted as discussed in reference to, e.g., FIGS. 5A-5B, 6A-6B, and 7A-7D, and the various Figures with example interactive graphical user interfaces of the present disclosure.

Figure 5A:
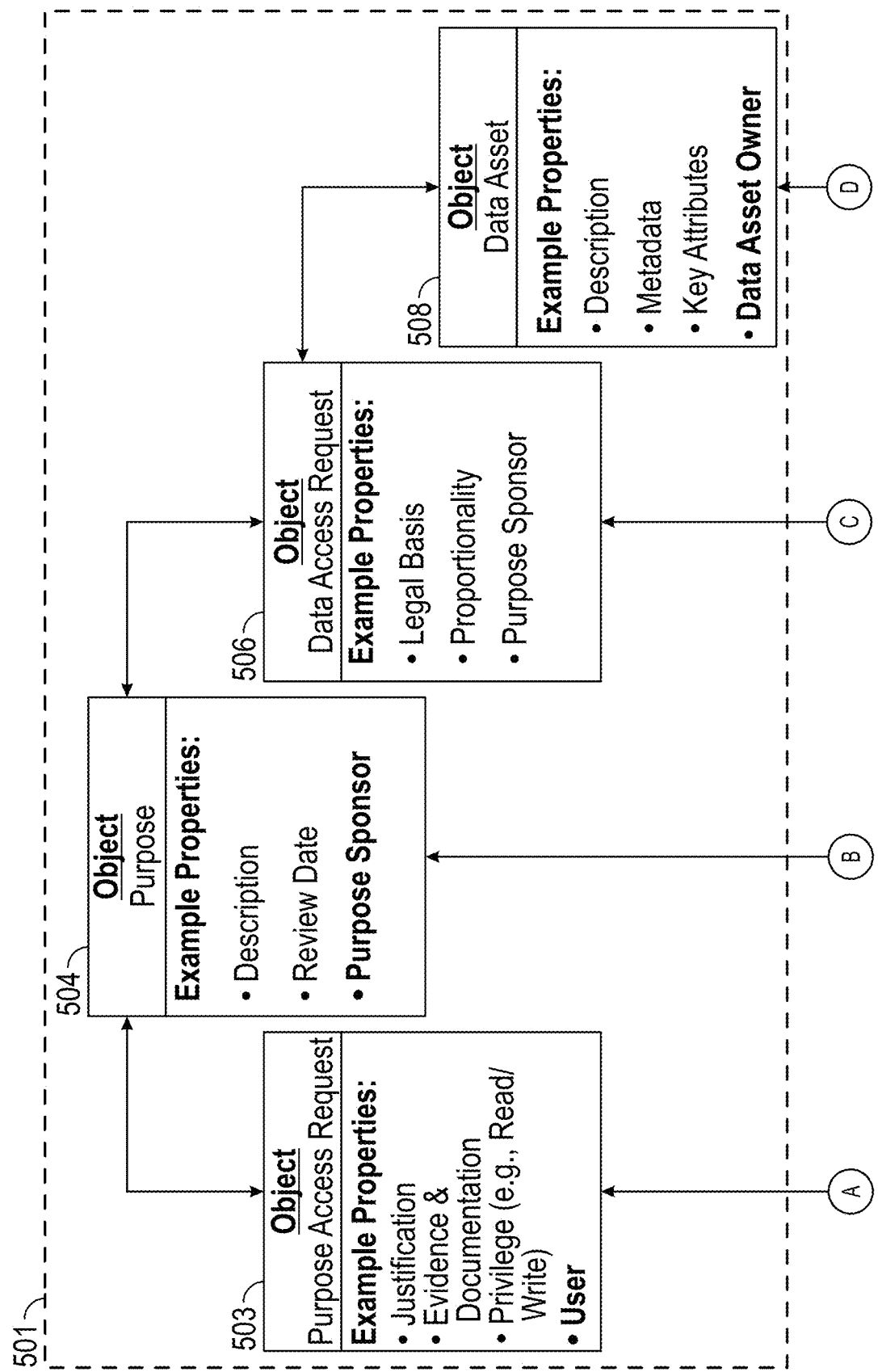
FIGS. 5A-5B show example block diagrams including object models for managing or controlling access to electronic data assets based on purposes, according to one or more embodiments.
Figure 5A:
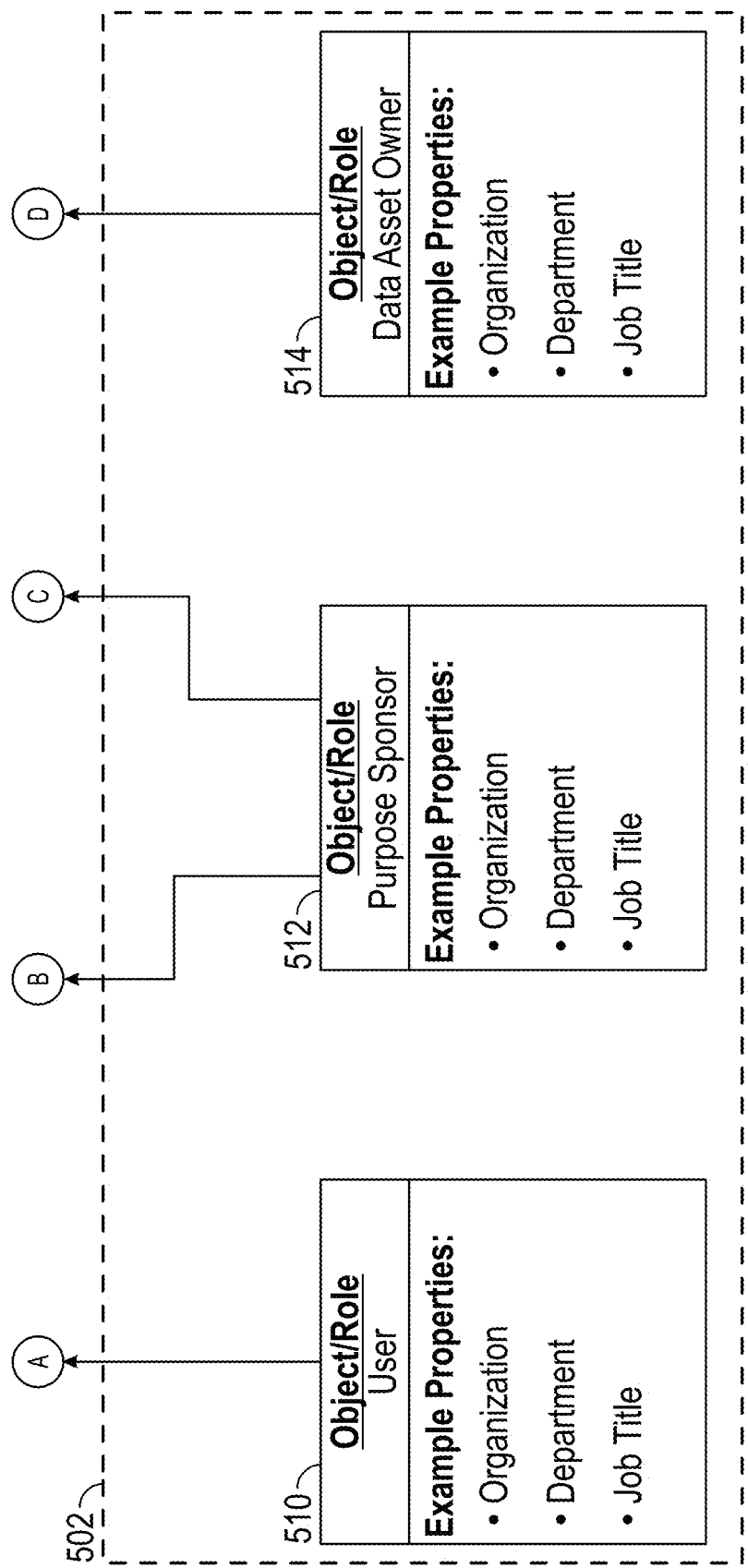

VII. Example Purpose-Based Access to Data Assets and Associated Example Object Model After authenticating the identity of a user, the system can then determine which data assets the user is authorized to access, and permissions of the user as related to those data assets. Data asset access in the system of the present disclosure is based on purposes. The system uses an object model (e.g., based on an ontology as described above in reference to FIG. 1) for managing or controlling access to electronic data assets based on purposes, an example of which is illustrated in FIG. 5A. As shown in FIG. 5A, data object types of the object model include access-related objects 501, and user objects 502. The access-related objects include purpose access request objects 503, purpose objects 504, data access request objects 506, and data asset objects 508. The user objects 502 include analyst user objects 510, purpose sponsor objects 512, and data asset owner objects 514. Further details regarding these various types of objects are described herein.

Various users of the system can act in various roles for enabling the purpose-based access. These user roles include, for example, (1) purpose sponsor user, who is the responsible risk owner, and who approves purpose access requests and creates data access requests; (2) data asset owner user, who is responsible for one or more data assets, and who reviews data access requests for the data assets that they own; and (3) analyst user, who creates purpose access requests with clear justifications for the requests, and who then accesses and analyzes data. Purpose sponsor users and data asset owner users each have the ability to assign delegates or administrators for acting on their behalf for various types of requests.

The system may generate objects associated with various user interacting with the system in various roles according the object model, e.g.: analyst user objects 510, purpose sponsor objects 512, and data asset owner objects 514. As illustrated in FIG. 5A, each instantiation of the various user objects may include various properties, including for example, organization, department, job title, and/or the like. Additional example properties that may be associated with user objects are illustrated in reference to the various Figures with example interactive graphical user interfaces of the present disclosure.

The system may further generate objects associated with purposes and data assets according the object model, e.g.: purpose objects 504 and data asset objects 508. As illustrated in FIG. 5A, each instantiation of a purpose object may include various properties, including for example, description, review data, and/or the like. Further, each instantiation of a purpose object may be associated with, and/or linked to, a purpose sponsor user that may be responsible for managing the purpose, including for example, creating the purpose object, approving purpose access requests, creating data access requests, and/or the like. Further, in various implementations, each instantiation of a purpose object may be associated with, linked to, and/or include a "tag," indicating a particular characteristic of the purpose or a purpose type, enabling an organization to maintain and/or classify different categories of purposes. As also illustrated in FIG. 5A, each instantiation of a data asset object may include various properties, including for example, description, various metadata, various key attributes, and/or the like. Further, each instantiation of a data asset object may be associated with, and/or linked to, a data asset owner user that may be responsible for managing the data asset, including for example, reviewing data access requests, and/or the like. Further, in various implementations, each instantiation of a data asset object may be associated with, linked to, and/or include resources other than just pure data that may be used by a purpose. Additional example properties that may be associated with purpose objects and data asset objects are illustrated in reference to the various Figures with example interactive graphical user interfaces of the present disclosure.

The system may further generate objects associated with access requests according the object model, e.g.: purpose access request objects 503 that link an analyst user to a purpose, and data access request objects 506 that link data assets to a purpose. As illustrated in FIG. 5A, each instantiation of a purpose access request object may include various properties, including for example, justification or legal basis, evidence, documentation, privilege or permissions, and/or the like. Further, each instantiation of a purpose access request object may be associated with, and/or linked to, an analyst user that may have generated the request, and a purpose associated with the request. As also illustrated in FIG. 5A, each instantiation of a data access request object may include various properties, including for example, legal basis or justification, proportionality, and/or the like. Further, each instantiation of a data asset request object may be associated with, and/or linked to, a purpose user that may have generated the request, and a data asset associated with the request.

Figure 5B:
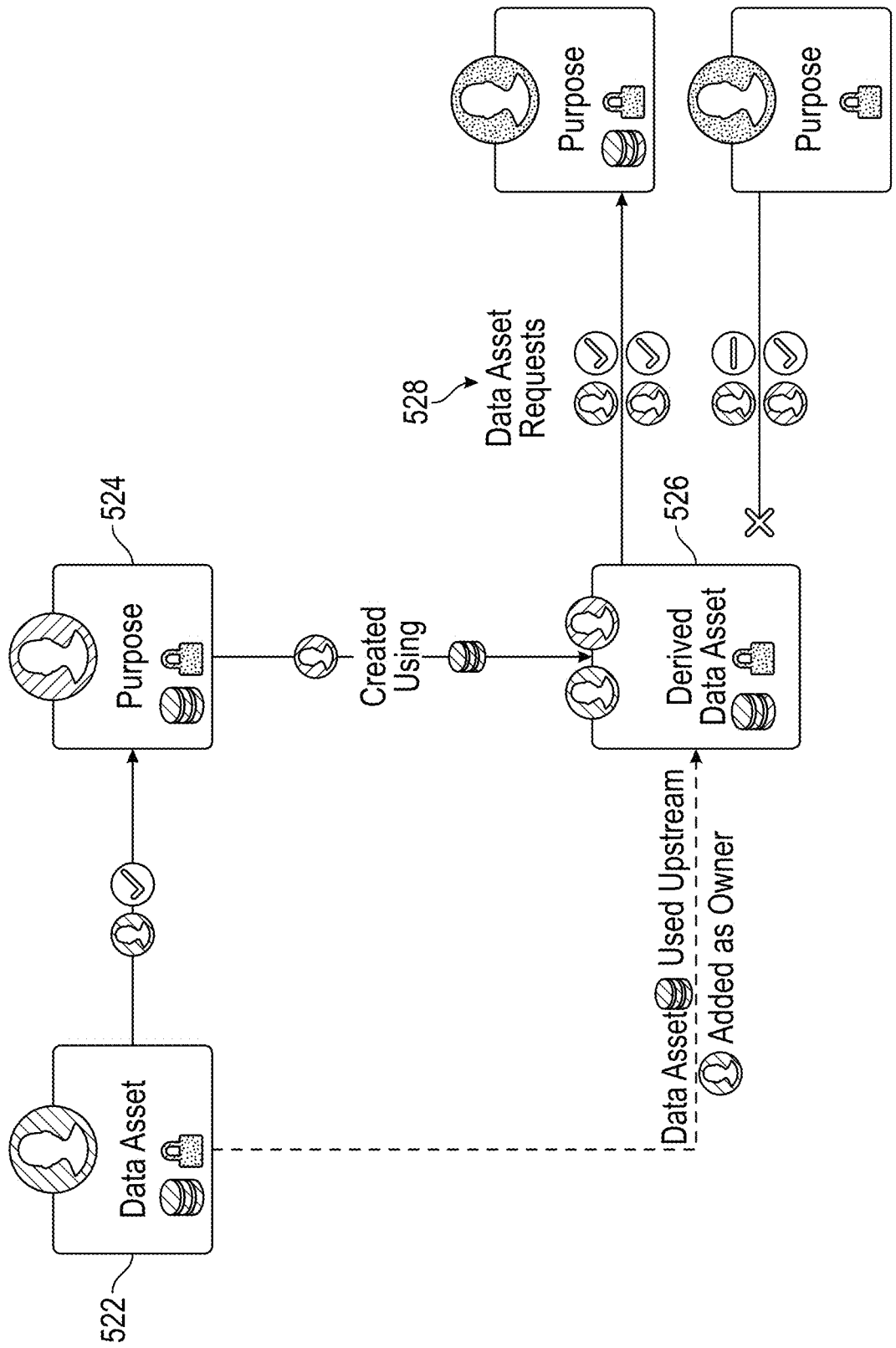

Further, as illustrated in FIG. 5B, the system may generate objects associated with "derived data assets" according the object model, e.g.: derived data asset object 526. A derived data asset object may be similar to a data asset object, but may be associated with, linked to, and/or include additional information related to a derivation, provenance, and/or lineage of the associated data asset, among other information. In various implementations, a derived data asset object may represent a derived data asset that may be based on or result from one or more source data assets and/or one or more transformations processes (e.g., as described above in reference to FIG. 2B), among other aspects. Each instantiation of a derived data asset object may include various properties, including for example, description, various metadata, various key attributes, and/or the like. In an example, a derived data asset may be generated in a purpose (e.g., as represented by purpose data object 524), and/or separately from a purpose. A purpose may include permissions and/or approval for a user to create a derived data asset from one or more data assets included with the purpose. A data asset and/or derived data asset may be a shared resource between different purposes. Further, each instantiation of a derived data asset object may be associated with, and/or linked to, one or more purposes that have access to the derived data asset, and to various data access request objects 528. In some implementations, a derived data asset object may be a sub-type of a data asset object; in other implementations, a derived data asset object may be a separate object type from a data asset object. In various implementations, a derived data asset object may serve the same function as a data asset object and be used interchangeably with a data asset object in various workflows.

In general, the object model of the present disclosure provides a framework for purpose-based access to data assets. For example, and as noted above, a given purpose is represented by a purpose object, and is associated with a "project" of the system. Particular data assets, as represented by respective data asset objects, are associated with the purpose/"project" via one or more data access requests, as represented by data access request objects. Particular analyst users, as represented by respective analyst user objects, are associated with the purpose/"project" via one or more purpose access requests, as represented by purpose access request objects. When an analyst user is granted access to a purpose by a purpose sponsor user (e.g., an approval is provided in a purpose access request object associated with or linked to the analyst user object and the purpose object), the analyst user is then able to access all data assets associated with the purpose (e.g., where data access request objects have been approved that associate or link data access request objects to the purpose object). Additionally, purpose sponsor users, as represented by respective purpose sponsor objects, are associated with purpose objects such that the purpose sponsor user can (1) generate data access request objects that, if approved by appropriate data asset owner users associated with the data asset objects, can associated or link data assets to the purpose, and (2) review and approve or not approve purpose access request objects. Yet further, data asset owner users, as represented by respective data asset owner objects, are associated with data asset objects such that the data asset object can review and approve or not approve data access requests.

In addition to associating or linking an analyst user object with a purpose object via approval of a purpose access request object, each given purpose access request can be associated with privileges/permissions/authorizations, which may include the extent to which the given analyst user may interact (e.g., read/write/modify/execute/etc.) with the data that they are given access to in the purpose. The privileges/permissions/authorizations may be determined based on an "access type", which may be provided by the analyst user and/or the purpose sponsor user for the purpose access request.

A given analyst user object may be associated with or linked to multiple purpose access request objects and/or purpose objects. A given purpose sponsor object may be associated with or linked to multiple purpose access request objects, purpose objects, and/or data access request objects. A given data asset owner object may be associated with or linked to multiple data access request objects and/or data asset objects. A given purpose object may be associated with or linked to multiple purpose access request objects, data access request objects, data asset objects, and/or analyst user objects. A given data asset object may be associated with or linked to multiple data access request objects, and/or purpose objects. In some implementations, portions of data assets may be associated with or linked to data access request objects and/or purpose objects. As noted above, purpose sponsor users and data asset owner user may assign delegates or administrators to act on their behalf. Such delegates or administrators, in various implementations, may or may not be represented by objects in the system.

Thus, in some implementations, multiple purpose sponsor objects (and/or purpose sponsor delegate user objects) may be associated with or linked to a given purpose object, purpose access request object, and/or data access request object. Similarly, in some implementations, multiple data asset owner objects (and/or data asset owner delegate user objects) may be associated with or linked to a given data asset object and/or data access request object.

The various objects of the object model can store metadata associated with various aspects of the purpose-based data access, which may advantageously enable investigation and auditing. For example, each purpose access request object may include a justification or legal basis, evidence or documentation, and/or the like, as metadata/properties of the purpose access request object. As another example, each data access request object may include a legal basis or justification, proportionality information (e.g., ensuring that the scope of the data assets is proportional to the purpose for which it is requested), and/or the like, as metadata/properties of the data access request object. The system may further advantageously use the metadata to generate and/or export various reports, which may be reviewed and edited by users. For example, metadata from a purpose access request object or a data access request object may enable the generation of a report assessing the risk of the purpose access request or data asset access request. As another example, according to various implementations, the system may use metadata from a data asset object and related purpose objects to generate a report informing a data asset owner, or a data subject outside of the organization with an interest in a specific data asset, what purposes the specific data asset is being used for. To enable the generation and/or exportation of reports, the system may provide an API for allowing a data subject to query the system as to how the data subject's data is being used. In various implementations, the API may perform a search of all data asset objects and, for any relevant data asset object found, the API may perform a search around on all relevant purpose objects. Furthermore, reports may advantageously be generated and/or exported according to any appropriate format or template, and as any appropriate filetype (e.g., as a PDF). In various implementations, the system may enable an organization to control and/or limit what purposes are included in various types of reports.

According to various implementations, the object model of the present disclosure provides a number of advantages associated with providing purpose-based access to data assets. For example, the object model can ensure that no analyst user is granted access to data assets except through a purpose, because analyst user objects are not directly linked to any data asset object. As another example, purpose sponsor users can provide oversight regarding all analyst users that can access a given purpose, because analyst users are only associated with a given purpose object via purpose sponsor user approval of particular purpose access request objects. As yet another example, purpose sponsor users can modify data assets that are available in a given purpose/"project" via removal of associations or links with data access request objects and/or data asset objects, and/or requesting additional data asset objects to be associated with or linked to a purpose object via data access request objects. As another example, data asset owner users can provide oversight regarding what purposes have access to which data assets, and whether it is appropriate to provide access to multiple data assets in a given purpose, by approving or not approving data access request objects that can associate or link data assets to particular purposes. As yet another example, and as mentioned above, auditing and review of various data accesses is facilitated by capturing relationships among the various objects, and the metadata/properties captured with the various objects. Further, by using the object model, various users can more easily make and propagate large scale changes to the system as compared to, for example, individual editing of user's permissions or tracking access in spreadsheets. For example, data assets can easily be added to or removed from a given purpose, enabling rapid re-scoping of the data available for a given purpose.

Figure 6A:
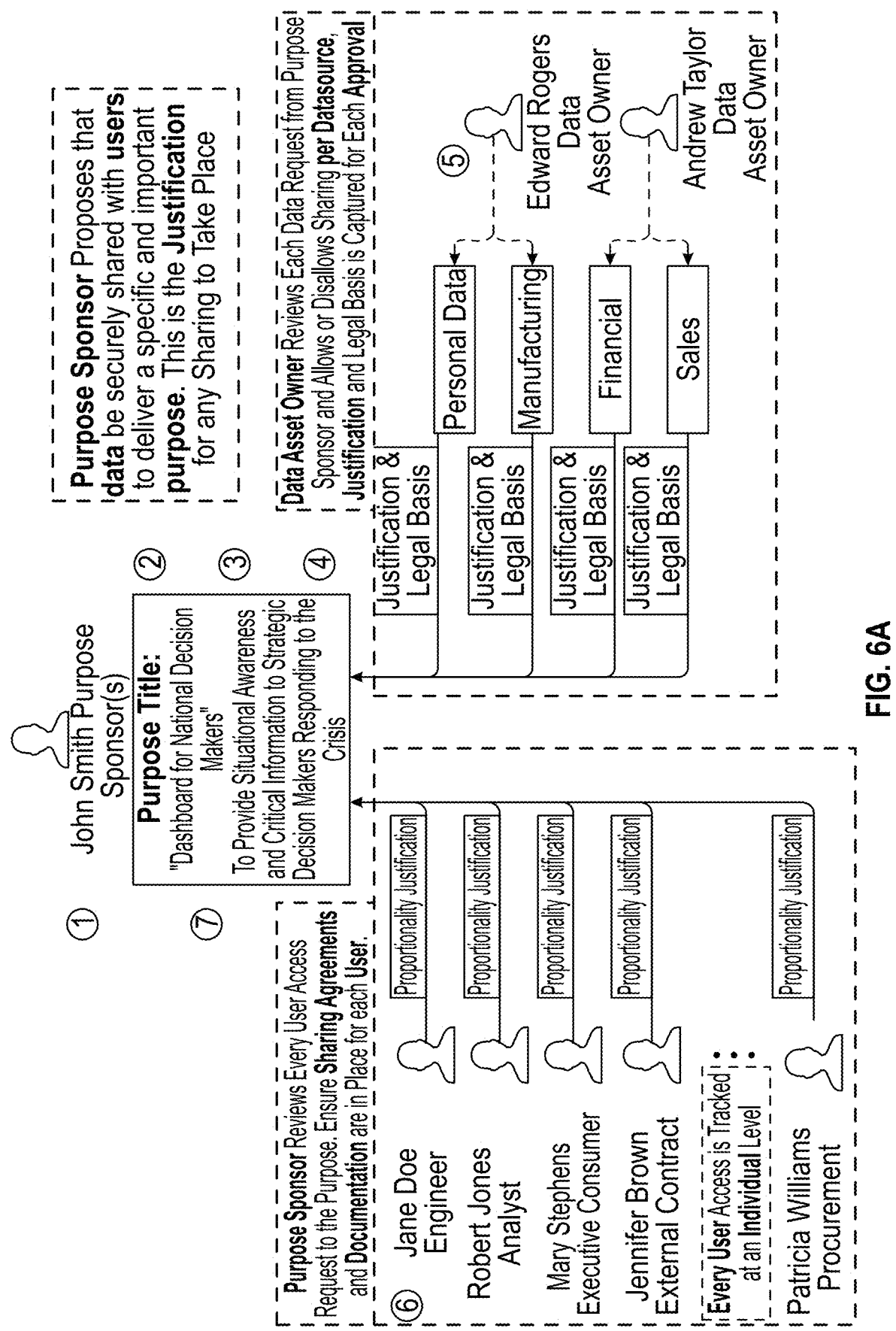
FIGS. 6A-6C show block diagrams illustrating example data flows and interactions related to managing or controlling access to electronic data assets based on purposes, according to one or more embodiments.

FIG. 6A shows a block diagram illustrating an example data flow or workflow of the system, including example interactions related to managing or controlling access to electronic data assets based on purposes, according to one or more embodiments. FIG. 6A only illustrates one example data flow of the system, and other data flows and functionality are contemplated and described herein. In various implementations various aspects of the example data flow of FIG. 6A may be ordered differently, may be optional, and/or may be removed, and/or additional aspects may be added.

At action 1 a purpose sponsor user creates a new purpose (e.g., a purpose titled: Dashboard for Regional Decision Makers), causing the generation of a purpose object. At action 2, purpose sponsor user identifies data assets for inclusion within scope of the purpose. At action 3, as part of the identification of data assets for inclusion, purpose sponsor user may determine any relevant granular access restrictions (e.g. geography or role-based restrictions). At action 4, purpose sponsor user requests use of data asset from data asset owner user, providing justification and/or legal basis, causing the generation of one or more data access request objects. Related metadata is recorded with the data access request objects. At action 5, following an assessment, the data asset owner user (and/or their delegates) approves the use data asset under the purpose. The approval is recorded with the data access request object as metadata. At action 6, purpose sponsor user optionally nominates key roles for automatic approval for access to the purpose (e.g. regional directors have automatic access to purpose: "Dashboard for Regional Decision Makers"). Additionally or alternatively, individual users can request access to the purpose. In either case, the system generates corresponding purpose access request objects. Related metadata is recorded with the purpose access request objects. At action 7, purpose sponsor user (and/or their delegates) grants access to the purpose on a case-by-case basis (e.g., for other individuals within regions, as nominated by regional directors). The grant of access is recorded with the purpose access request object as metadata.

Additional data can be brought in to the scope of the purpose at the request of the purpose sponsor user and with the approval of the data asset owner user, following a similar flow to that described above. When additional data is brought into a purpose, all analyst users with access to the purpose are granted access to the additional data, when accessed within the purpose. When an analyst user wants to access data assets, they first select a purpose, after which they may subsequently be granted access to the data assets associated with that purpose. The analyst user may access different data assets associated with different purposes by switching from one approved purpose to another, but, according to an implementation, mat not access data assets associated with multiple purposes simultaneously. Thus, according to various implementations, analyst users may not directly access data assets in the system without going through/initially identifying a purpose and getting approval for that purpose. Advantageously, in view of the flow described above and the object model of the system, at any time it may be possible to answer questions such as: "what data can this analyst user see?", "why are they allowed to see it?", and the like.

Figure 6B:
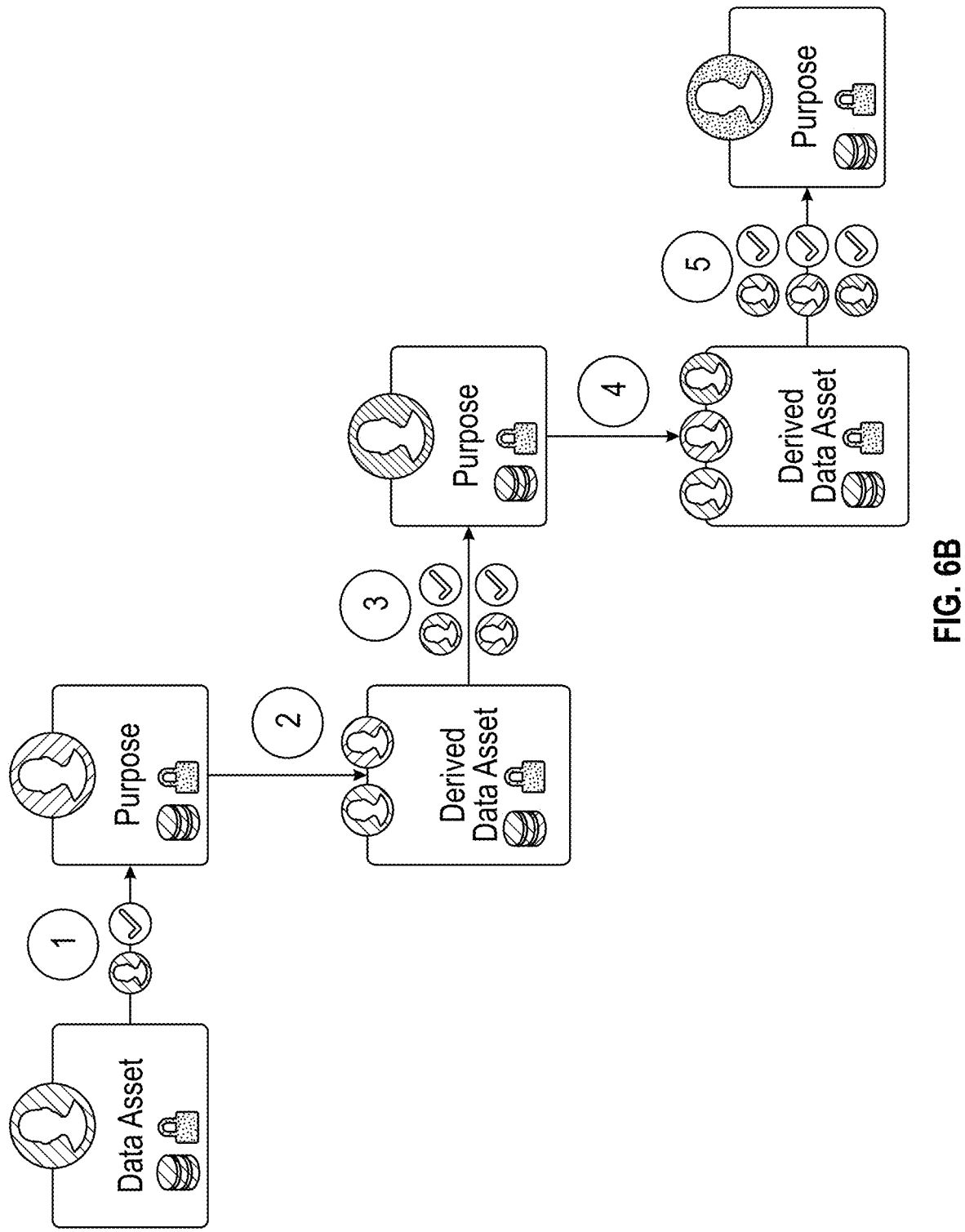

FIG. 6B is a block diagram illustrating an example data flow or workflow of the system involving derived data assets. FIG. 6B only illustrates one example data flow of the system, and other data flows and functionality are contemplated and described herein. In various implementations various aspects of the example data flow of FIG. 6B may be ordered differently, may be optional, and/or may be removed, and/or additional aspects may be added.

At action 1, a data asset owner approves a request to associate a data asset with a specific purpose, and the purpose is granted access to the data asset. At action 2, a derived data asset is created within the purpose (or, in some implementations, the derived data asset may be created separate from a purpose). The derived data asset may include some or all of the original data asset and may also include certain data not previously in the original data asset. For example, the derived data asset may be a filtered version of the original data asset, combined with another data asset (in whole or in part), transformed in some other way, and/or any combination of these or other transformation processes. Initially, a derived data asset may only be accessible to the original approved purpose. At action 3, the original data asset owner and the purpose sponsor approve a request to associate the derived data asset with a second purpose, and the second purpose is granted access to the derived data asset. In this example, the data asset access request for the derived data asset must be approved by all upstream data asset owners and the original purpose sponsor, so both the original data asset owner and the original purpose sponsor must approve the request. Alternatively, if the derived data asset is a combination of two or more data assets, approval may be required from the data asset owners of each of the two or more data assets, and/or the original purpose sponsor. At action 4, a second derived data asset is created within the second purpose (or, in some implementations, the second derived data asset may be created separate from a purpose). At action 5, the original data asset owner, the first purpose sponsor, and the second purpose sponsor all approve a request to associate the second derived data asset with a third purpose, and the third purpose is granted access to the second derived data asset. Alternatively, if the second derived data asset is a combination of two or more data assets, approval may be required from the data asset owners of each of the two or more data assets, and/or one or more of the first and second purpose sponsors.

Figure 6C:
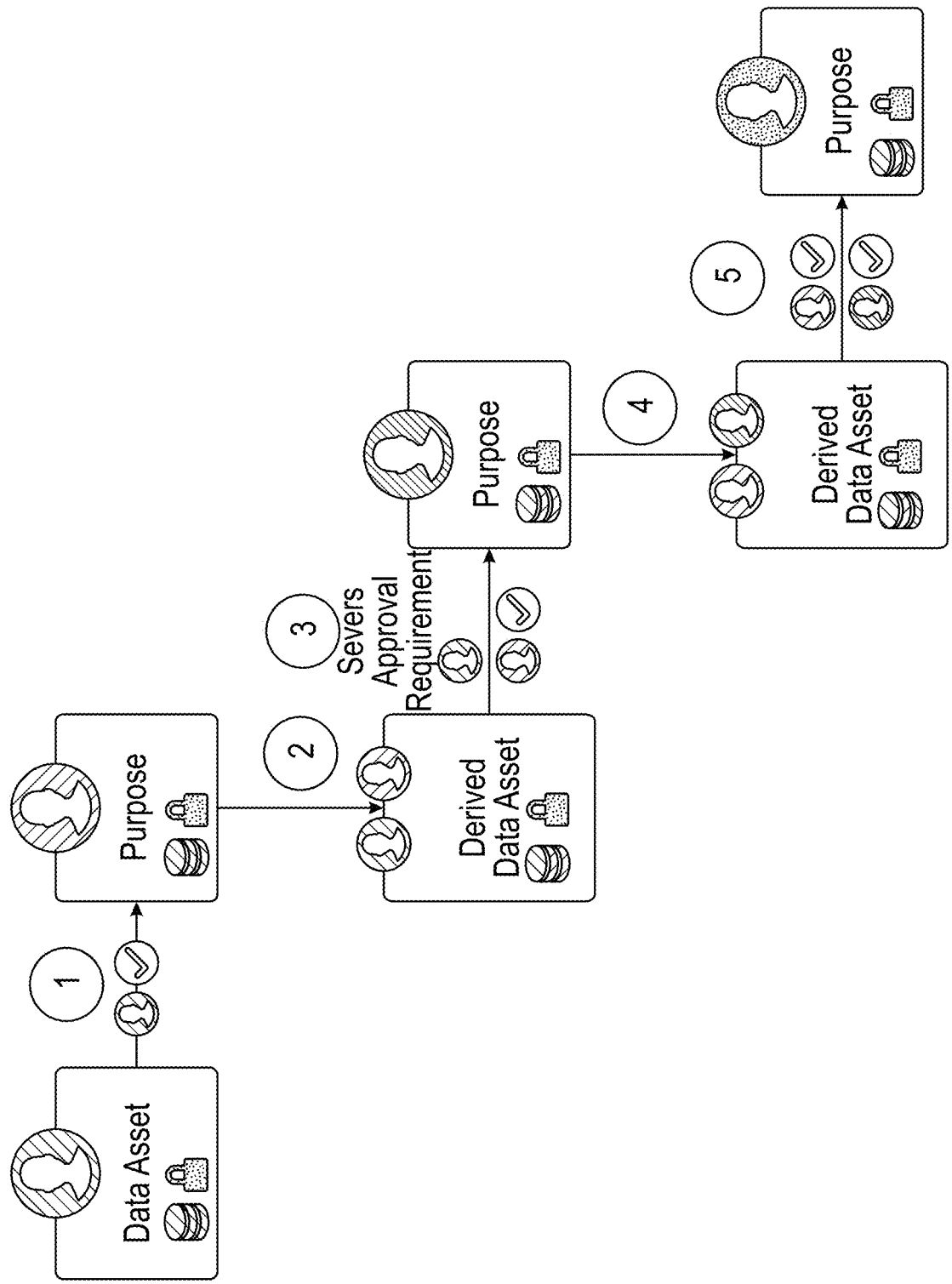

FIG. 6C shows a block diagram illustrating another example data flow or workflow of the system involving derived data assets. The flow illustrated in FIG. 6C is similar to the flow illustrated in FIG. 6B. However, in action 3, the original data asset owner severs the original data asset approval requirement, meaning that additional downstream derived data assets do not require the original data asset owner's approval to be used by a purpose. A data asset owner may choose to do this when the data has been aggregated or transformed in some way such that case-by-case approvals around the use of such data are no longer necessary. At action 5, as a result of this severance, the original data asset owner does not need to approve the data access request for the third purpose to use the second derived data asset. Such severances of data asset approval requirements may also similarly be applied to purpose sponsors.

In some implementations, the system and/or users of the system (e.g., governance users) may restrict sharing or associating of derived data assets from one purpose to another, or among purposes with certain characteristics.

As mentioned above, in various implementations, while specified in the purpose access requests, the data management system 150, an operating system, a file management system, and/or other service (such as an access control list ("ACL") service) can manage permissions/privileges/authorizations of analyst users with respect to the data assets that the analyst users can access in a given purpose. Thus, according various implementations, for example, an access management system 110 with an access service and object model as described herein can be built on top of an existing data management system 150, enabling purpose-based access to the data assets of the data management system 150. For example, in various implementations, the system described herein may be implemented on top of existing access control systems (e.g., geography or role-based restrictions). For example, in various implementations, the system may enable one or more purposes to be associated with an existing role, such that all users with the role would have access to data assets associated with the one or more purposes.

Further details and examples of functionality of the system that provides for purpose-based access to data assets based on an object model are provided herein in reference to, for example, the flowcharts of FIGS. 7A-7D. Further, according to various embodiments, various interactive graphical user interfaces are provided for allowing various types of users interact with the systems and methods described herein to, for example, generate, review, and/or modify purpose objects, purpose access request objects, data access request objects, and/or the like. Examples are described in reference to the various Figures with example interactive graphical user interfaces of the present disclosure (e.g., FIGS. 9A-9C, 10A-10F, 11A-11B, 12A-12F, 13A-13E, and 14A-14K).

For example, as described herein, various interactive graphical user interfaces may be provided such that (1) an analyst user may request access to purposes and/or access data assets associated with purposes for which they have been approved, (2) a purpose sponsor user may review and approve (or deny) purpose access requests, generate data access requests, investigate relationships among various objects, and/or the like, (3) a data asset owner user may review and approve (or deny) data access requests, investigate relationships among various objects, and/or the like, and (4) a governance administrator user and/or a purpose sponsor user may review, analyze, and change, and otherwise interact with various policies, data assets, purposes, requests, approvals, denials, alerts, and/or the like. In some embodiments, the roles of governance administrator user and purpose sponsor user may overlap partially or fully, or a single one of these roles may fulfill the responsibilities of both.

In various implementations, links between objects can be achieved in different ways. For example, FIG. 5A shows symmetrical links between various objects. Some implementations may implement one directional links in various circumstances and between various objects. In various implementations, links may be implemented through properties of objects, or may additionally or alternatively be implemented using links which may be separate from the objects (and as described herein in reference to FIG. 1. Such links can include a description regarding the type of link, and a first linked object and a second linked object that are linked to each other. Thus, in various implementations, one, some, or all objects discussed herein can be linked by a link instead of (or in addition to) being linked through matching properties. In some implementations, a link can include additional (e.g., third, fourth, . . . , Nth) linked objects and indicate more complex multi-object relationships.

VIII. Additional Example Operations of the System

FIGS. 7A-7D show flowcharts illustrating example operations of the system, according to one or more embodiments. The blocks of the flowcharts illustrate example implementations, and in various other implementations various blocks may be rearranged, optional, and/or omitted, and/or additional block may be added. The example operations of the system illustrated in FIGS. 7A-7D may be implemented, for example, by the access service 313 of the access management system 110 and/or various aspects of the data management system 150, and such operations may follow authentication of a user (such as described with reference to FIG. 4). As mentioned above, in various implementations, an operating system, file management system, and/or other service (e.g., authentication service 311 and/or aspects of the data management system 150) can manage authentication and authorizations/permissions/privileges of a user.

Figure 7A:
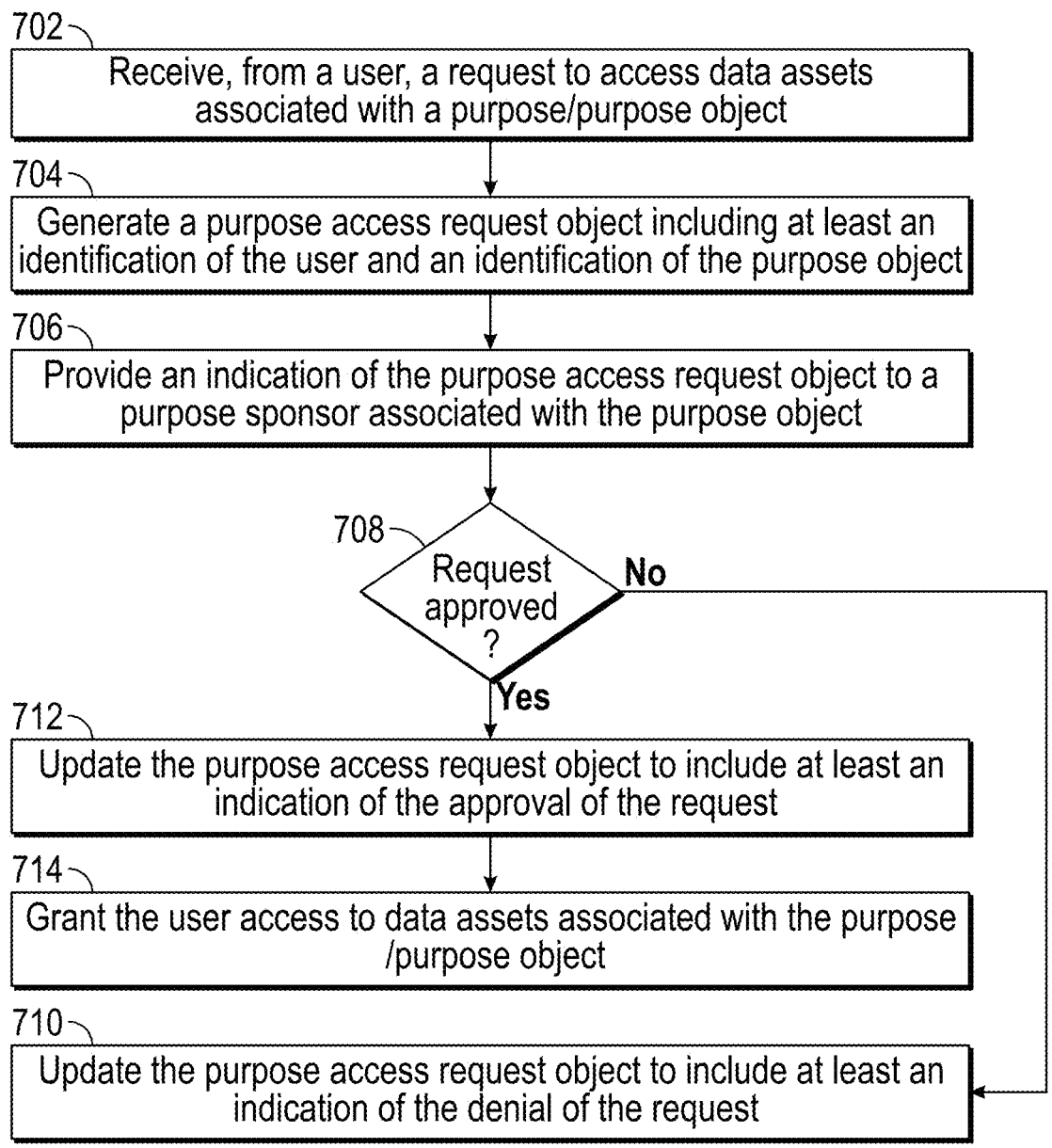
FIGS. 7A-7D shows flowcharts illustrating example operations of an access management system, according to one or more embodiments.

Referring to FIG. 7A, at block 702 the system receives, from an analyst user, a request to access data assets associated with a purpose (e.g., as represented by a purpose object). At block 704, in response to receiving the request from the analyst user, the system generates a purpose access request object including at least an identification of the analyst user and an identification of the purpose object. Further, at block 704 the system provides an indication of the purpose access request object to a purpose sponsor user associated with the purpose/purpose object. At block 708, the purpose sponsor user may then review the request, and either approve or deny the request. If the request is denied, at block 710 that system updates the purpose access request object to include an indication of the denial. If the request is approved, at block 712 the system updates the purpose access request object to include an indication of the approval. Further, at block 714 the system grants the analyst user access to data assets associated with the purpose/purpose object.

Figure 7B:
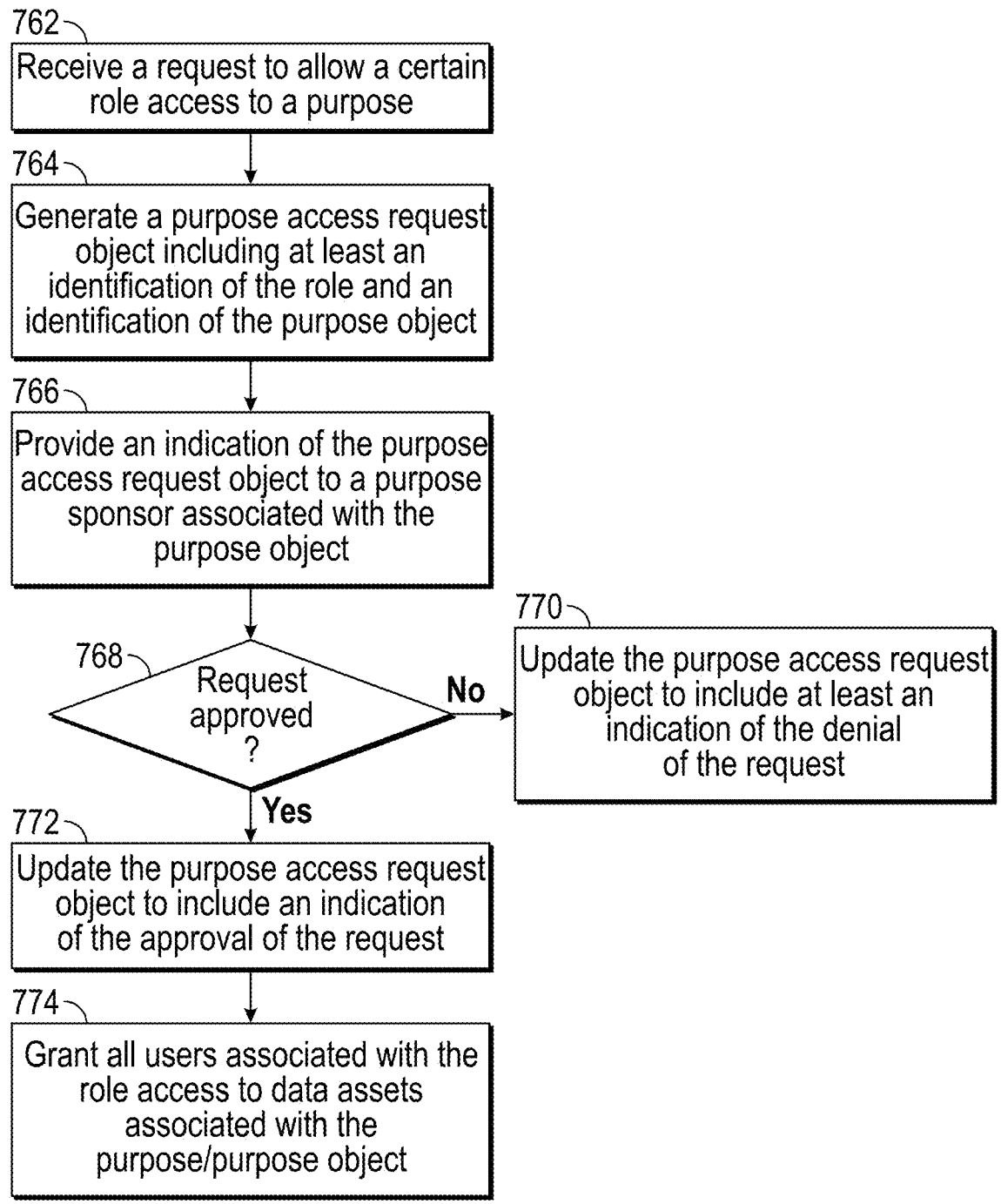

As described above, in various implementations, access to data assets associated with a purpose may be granted using a role-based system. Referring to FIG. 7B, at block 762 the system receives a request to allow all analyst users of a certain role to access a purpose (e.g., as represented by a purpose object). At block 764, in response to receiving the request, the system generates a purpose access request object including at least an identification of the role and an identification of the purpose object. Further, at block 766 the system provides an indication of the purpose access request object to a purpose sponsor user associated with the purpose/purpose object. At block 768, the purpose sponsor user may then review the request, and either approve or deny the request. If the request is approved, at block 772 the system updates the purpose access request object to include an indication of the approval. Further, at block 774 the system grants all analyst users associated with the role access to data assets associated with the purpose/purpose object. In various implementations, user roles may be associated with user role objects, which may be associated purpose access request objects, to grant users associated with those roles access to the approved purposes. Alternatively, or in addition, upon approval of a role to access a purpose, relevant user objects may be associated with such purpose access request objects.

Figure 7C:
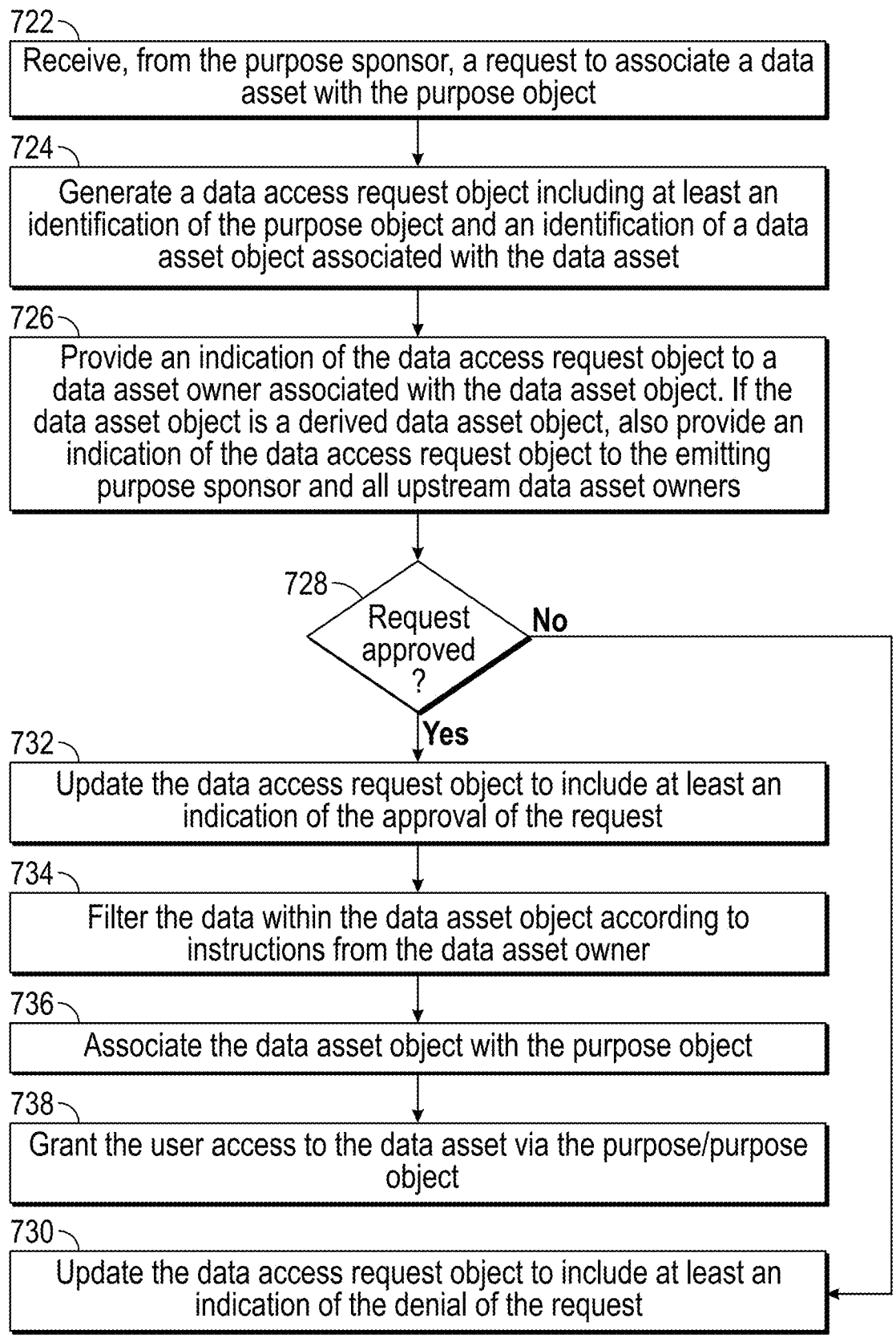

Referring to FIG. 7C, at block 722 the system receives, from the purpose sponsor user, a request to associate a data asset (as represented by a data asset object) with the purpose object. At block 724, in response to receiving the request from the purpose sponsor user, the system generates a data access request object including at least an identification of the purpose object and an identification of a data asset object associated with the data asset. Further, at block 726 the system provides an indication of the data access request object to a data asset owner user associated with the data asset/data asset object. As previously mentioned, if the data asset object associated with the data asset access request object is a derived data asset object, the system also provides an indication of the request to the original purpose sponsor and/or data asset owner, and/or all upstream purpose sponsors and/or data asset owners, as applicable. At block 728, the data asset owner user may then review the request, and either approve or deny the request. If the request is denied, at block 730 the updates the data access request object to include at least an indication of the denial. If the request is approved, at block 732 the system updates the data access request object to include at least an indication of the approval of the request. At block 734, the system filters the data within the data asset object according to instructions received from the data asset owner who approved the request. In some embodiments, the system may filter the data according to a pre-determined filtration rule without intervention by the data asset owner. Further, at block 736 the system associates the data asset object with the purpose object, and at block 738 the system grants the analyst user access to the data asset via the purpose/purpose object.

In an example, the purpose request object may be linked to an analyst user object associated with the analyst user, the purpose object may be linked to the purpose request object, the data access request object may be linked to the purpose object, and the data asset object may be linked to the data access request object. In a further example, the data asset may be associated with the purpose object by way of the purpose object being linked to the data access request object, and the data access request object being linked to the data asset object. In yet a further example, the analyst user may be associated with the purpose object by way of the purpose object being linked to the purpose access request object, and the purpose access request object being linked to the analyst user object.

In various implementations, the system may perform additional operations including: receiving an input from the purpose sponsor user requesting to view a graph view of objects associated with the analyst user, and in response to receiving the input, generating a graph view of objects associated with the analyst user. The graph view may include graphical nodes indicative of objects and graphical connectors indicative of links between the objects, wherein the objects associated with the analyst user include: an analyst user object associated with the analyst user, any purpose access request objects associated with the analyst user object, any purpose objects associated with any of the purpose access request objects, any data access request objects associated with any of the purpose objects, and any data asset objects associated with any of the data access request objects. In an example, in the graph view the purpose request object may be linked to the analyst user object, the purpose object may be linked to the purpose request object, the data access request object may be linked to the purpose object, and the data asset object may be linked to the data access request object.

In various implementations, the system may require that the purpose sponsor user provide a justification with the request to associate the data asset with the purpose/purpose object, and the justification may be included in the data access request object as metadata.

In various implementations, the system may require that that the analyst user provide a justification with the request to access data assets associated with the purpose/purpose object, and the justification may be included in the purpose access request object as metadata. The purpose access request object may further be associated with an access type provided by the analyst user, and the access type may affect permissions of the analyst user with respect to the data assets associated with the purpose object.

In various implementations, the system may filter a data asset according to a default minimization rule before associating the data asset object with a purpose object. Further, the system may allow the data asset owner user to filter a data asset before associating the data asset object with a purpose object. In various implementations, the filtered data asset may constitute a derived data asset generated in the purpose. Filtering may be applied on rows, columns, and/or the like. Such filtering may be automatic and may be based on a "scope" associated with the data asset, the purpose, and/or the like (and as further described herein).

As noted above, in various implementations the system may store an ontology or object model defining a plurality of object types and associated properties, and further defining relationships among the object types. The object types may include at least: an analyst user object type, a purpose access request object type, a purpose object type, a data access request object type, and a data asset object type. In the object model, the analyst user object type may not be related to the data asset object type. In various implementations, the ontology may define a plurality of different categories of purpose objects. A purpose object may be categorized based on various properties of the purpose object, including a purpose tag and/or purpose type.

Figure 7D:
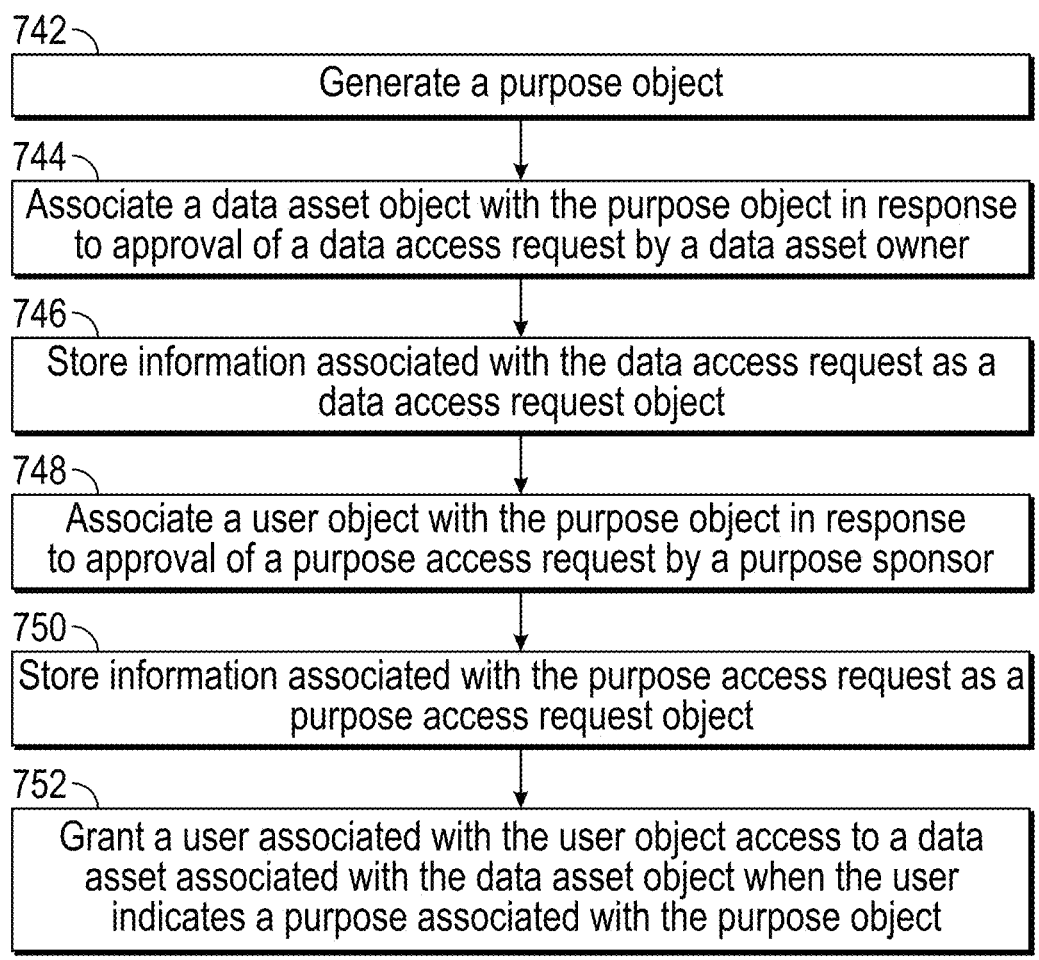

Referring to FIG. 7D, at block 742 the system generates a purpose object (e.g., in response to a purpose sponsor user requesting to generate a new purpose). At block 744, the system associates a data asset object with the purpose object in response to approval of a data access request (which data access request may be generated in response to a request from the purpose sponsor user, and may be approved by a data asset owner user associated with the data asset associated with the data asset object). At block 746, the system stores information associated with the data access request as a data access request object. At block 748, the system associates an analyst user object with the purpose object in response to approval of a purpose access request (which purpose access request may be generated in response to a request from an analyst user associated with the analyst user object, and may be approved by the purpose sponsor user associated with the purpose object). At block 750, the system stores information associated with the purpose access request as a purpose access request object. At block 752, the system grants the analyst user associated with the user object access to the data asset associated with the data asset object when the analyst user indicates a purpose associated with the purpose object.

According to various implementations, the granting of access may be based on: (1) the association between the data asset object and the purpose object, and (2) the association between the user object and the purpose object. According to various implementations, a basis of the analyst user's access to the data asset may be auditable via at least the purpose access request, including metadata associated with the purpose access request. Further, according to various implementations, the data access request may be approved by a data asset owner user associated with the data asset object, the purpose access request may be approved by a purpose sponsor user associated with the purpose object, and the analyst user, the data asset owner user, and the purpose sponsor user are different persons. Further, according to various implementations, the system may enable users to configure various access requests to be automatically approved.

Advantageously, via the system purpose sponsor users may activate, modify, and deactivate purposes, thereby efficiently managing access of data from a purpose-based perspective.

IX. Example Interactive Graphical User Interfaces

FIGS. 9A-9C, 10A-10F, 11A-11B, 12A-12F, 13A-13E, and 14A-14K illustrate example interactive graphical user interfaces of the system, according to various embodiments. The examples user interfaces are provided for illustrative purposes to show various functionalities of the system. In other implementations, the interactive graphical user interfaces may include more or fewer elements, may be arranged differently, and/or may be combined or divided. As mentioned above, the various example interactive graphical user interfaces may be generated/provided by the access service 313 of the access management system 110, and/or another service or module of the system.

Figure 9B:
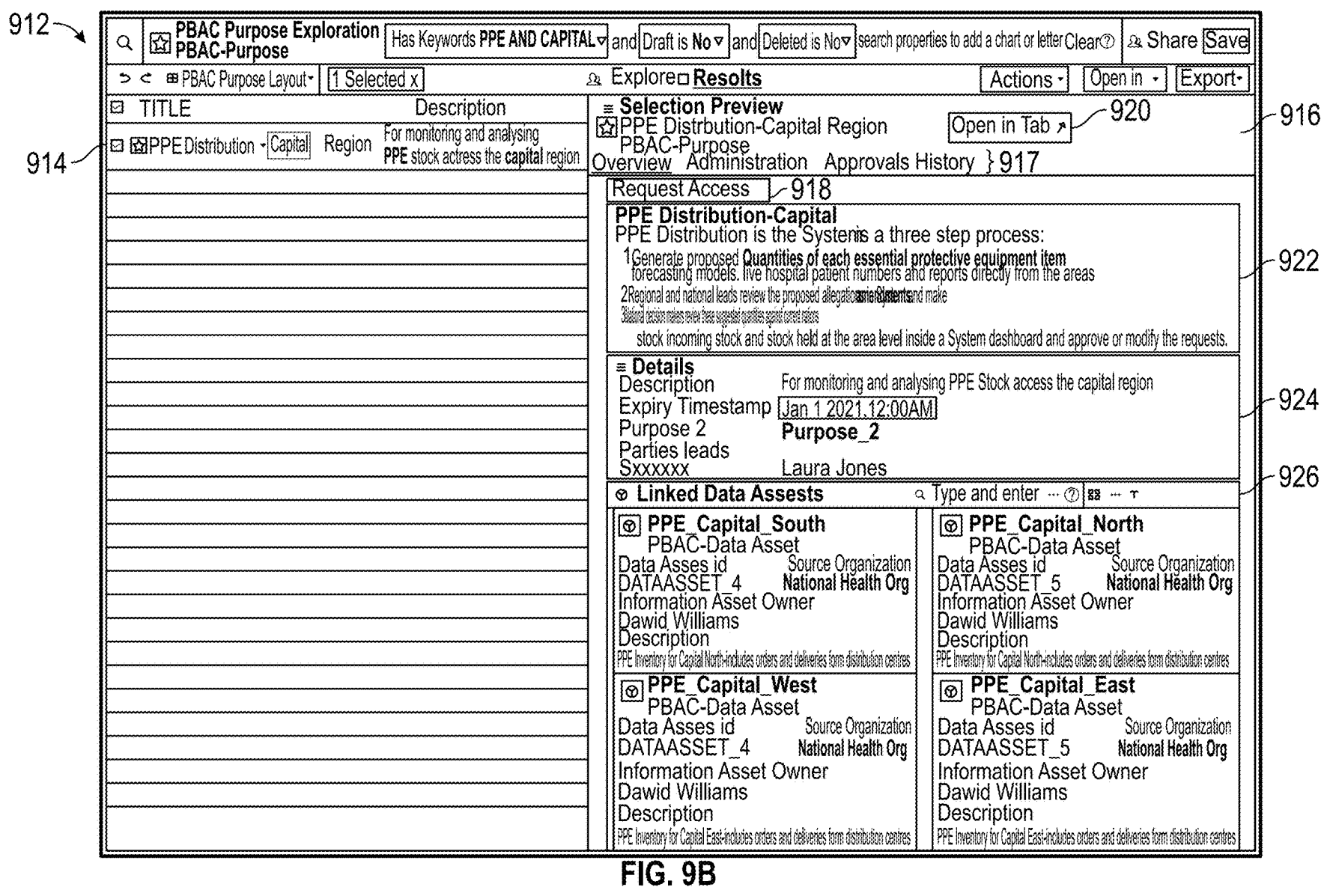

FIGS. 9A-9C illustrate example interactive graphical user interfaces related to an analyst user, among others, according to one or more embodiments. Referring to FIG. 9A, a user interface 902 includes a listing of purposes 904. The user interface shows, for each of the listed purposes, various metadata details (e.g., as may be included in properties of the associated purpose objects) including title, description, sponsor (e.g., associated purpose sponsor user), expiry timestamp, and purpose identifier ("Purpose ID"). Via the user interface 902, the analyst user may search for and/or filter the various purposes via filter/search tools 906. The listed purposes 904 may include purposes for which the analyst user has been approved, and/or any other purposes available for the analyst user to request access. In an implementation the system may indicate statuses of any purpose access requests submitted by the analyst user for any of the listed purposes.

Referring to FIG. 9B, a user interface 912 follows the user interface 902. In user interface 912, the analyst user has selected one of the listed purposes 914. Details related to the selected purpose are then displayed in the user interface in response to the analyst user's selection. The details (which may be found from the metadata of the related purpose object) include, in section 916, the title of the purpose, in section 922 a detailed description of the purpose, in section 924 other details, and in section 926, any data assets associated with or linked to the purpose. In the example user interface 912, four data assets are shown as linked to the purpose. Using button 920, the analyst user may select to review details related to the purpose in a different tab, in additional detail. Using button 918, the analyst user may request access to the purpose (e.g., causing the system to generate a purpose access request (and associated purpose access request object). Using buttons 917, the analyst user may view additional information related to administration of the purpose, and approval history related to the purpose.

Referring to FIG. 9C, a purpose access request user interface 930 is shown in response to the analyst user selecting button 918 from user interface 912. In the purpose access request user interface 930, the analyst user can select an access type, and provide a justification. The provided information can be added, as metadata, to a purpose access request object that may be generated when the analyst user selects the submit button. The selection of an access type can be used by the system to determine privileges/permissions/authorizations of the analyst user with respect to the data assets available in the purpose, if the user is granted access to the purpose.

Figure 10B:
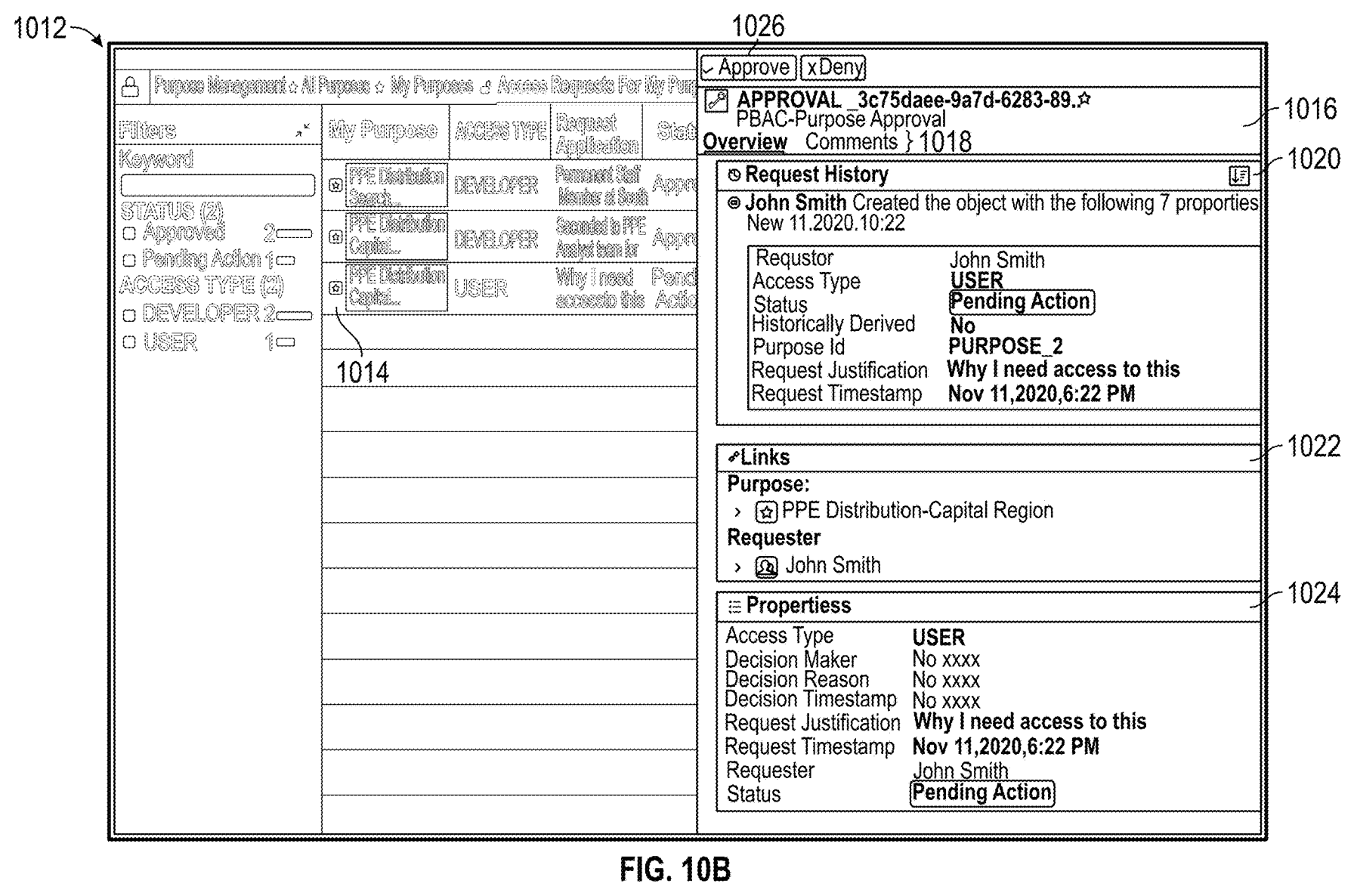
Figure 10C:
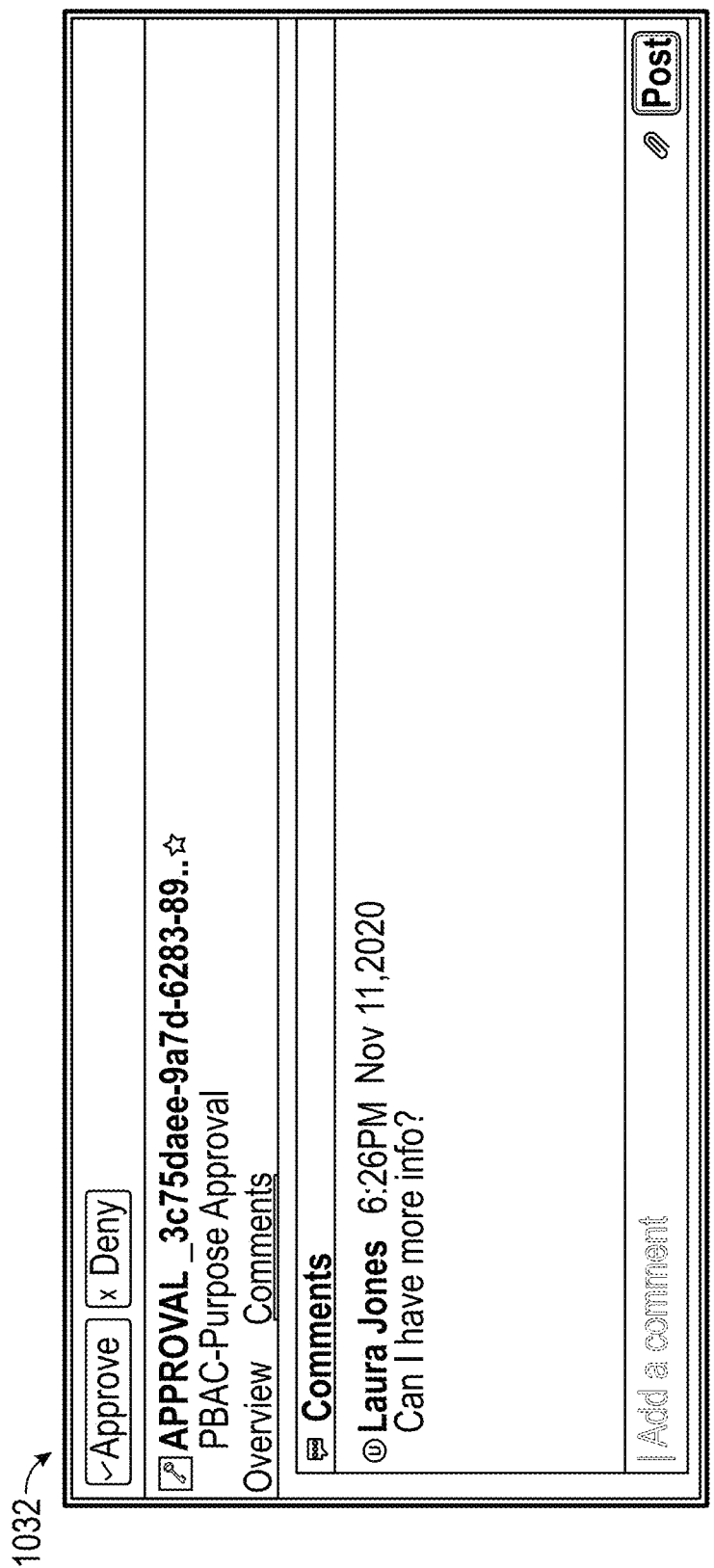

FIGS. 10A-10F illustrate example interactive graphical user interfaces related to a purpose sponsor user, among other users, according to one or more embodiments. Referring to FIG. 10A, a user interface 1002 includes a listing of purpose access requests 1004. The listed purpose access requests 1004 include requests that have been directed to the logged in purpose sponsor user due to the purpose sponsor user being responsible for the purpose associated with the requests. The user interface shows, for each of the listed requests, various metadata details (e.g., as may be included in properties of the associated purpose access request objects) including access type, request justification, status, decision purpose, etc. Via the sidebar, the purpose sponsor user may filter and search the various requests.

Referring to FIG. 10B, a user interface 1012 follows the user interface 1002. In user interface 1012, the purpose sponsor user has selected one of the listed purpose access requests 1014. Details related to the selected request are then displayed in the user interface in response to the purpose sponsor user's selection. The details (which may be found from the metadata of the related purpose access request object) include, in section 1016, the title of the request (including an indication of the associated purpose), in section 1020 a listing of an event history of the request (e.g., for each event, a user associated with the event and a listing of properties of the request object at the time), in section 1022 an indication of other objects linked to the request (e.g., the associated purpose object, and the associated analyst user object), and in section 1024, a listing of current properties of the request (e.g., including a decision maker, a justification, a status, etc.). Using buttons 1018, the purpose sponsor user may view comments related to the request. Using button 1026, the purpose sponsor user may approve the request (e.g., after reviewing the details of the request), or may deny the request. Referring the FIG. 10C, a user interface 1032 is shown in response to the purpose sponsor user selecting the comments button 1018. Via the user interface 1032, the purpose sponsor user can add comments to the request, which are stored with the purpose access request object. Additionally, the purpose sponsor user can attach files (e.g., emails or other documents) to provide additional context associated with the request, which are also stored with the purpose access request object. Thus, a contextual history of the request can be captured with the request object.

Referring to FIG. 10D, in an example the purpose sponsor user selects to deny the request, and the user interface 1042 is shown in response. The purpose sponsor user may provide a reason for the decision, and may select the submit button. Referring the FIG. 10E, after the request is denied, user interface 1052 shows that the history 1054 of the request is updated to reflect the denial event, and metadata of the purpose access request object changed as a result. Advantageously, the history 1054 of the request indicates whether or not the request was historically denied, meaning whether this request or any similar request (e.g., by the same analyst user and for the same or a similar purpose) was previously denied. Such information may be helpful to the purpose sponsor user for determining whether or not to grant the analyst user access to the purpose.

Figure 10F:
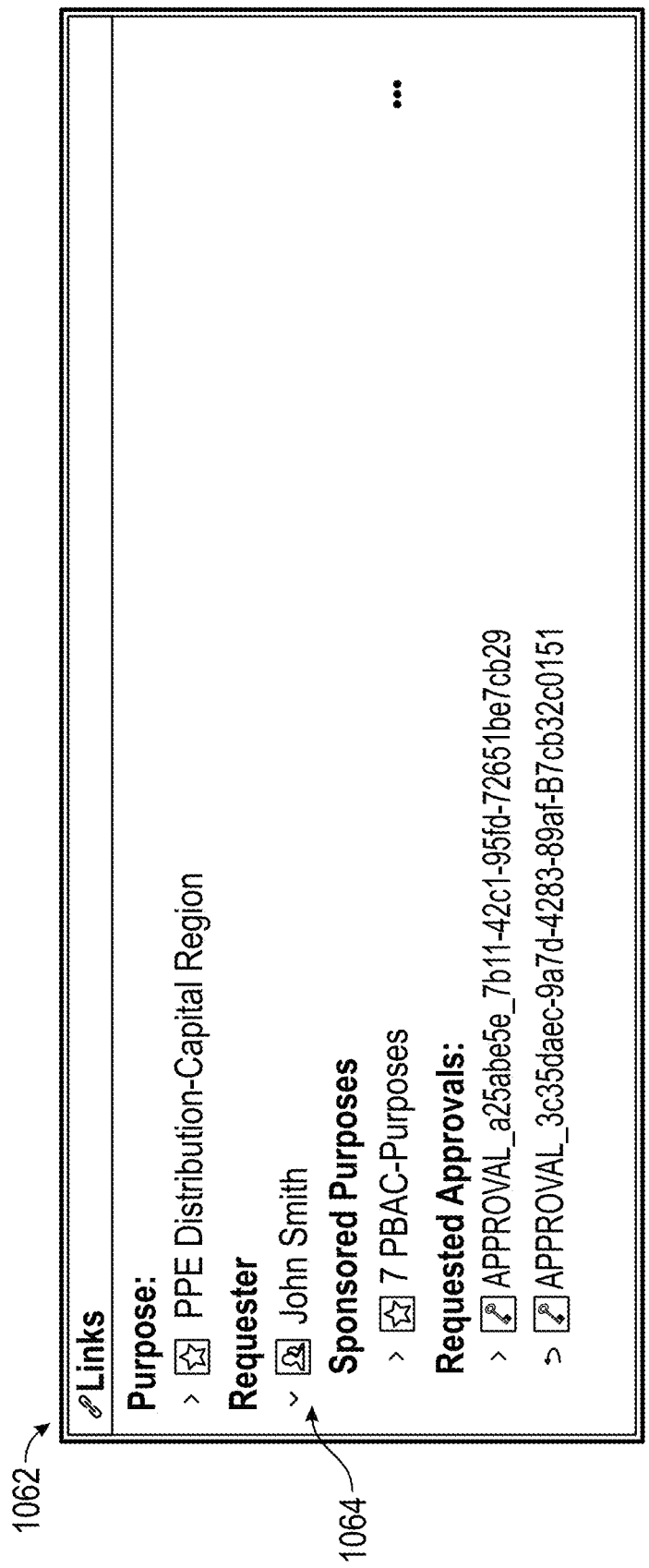
Figure 13D:
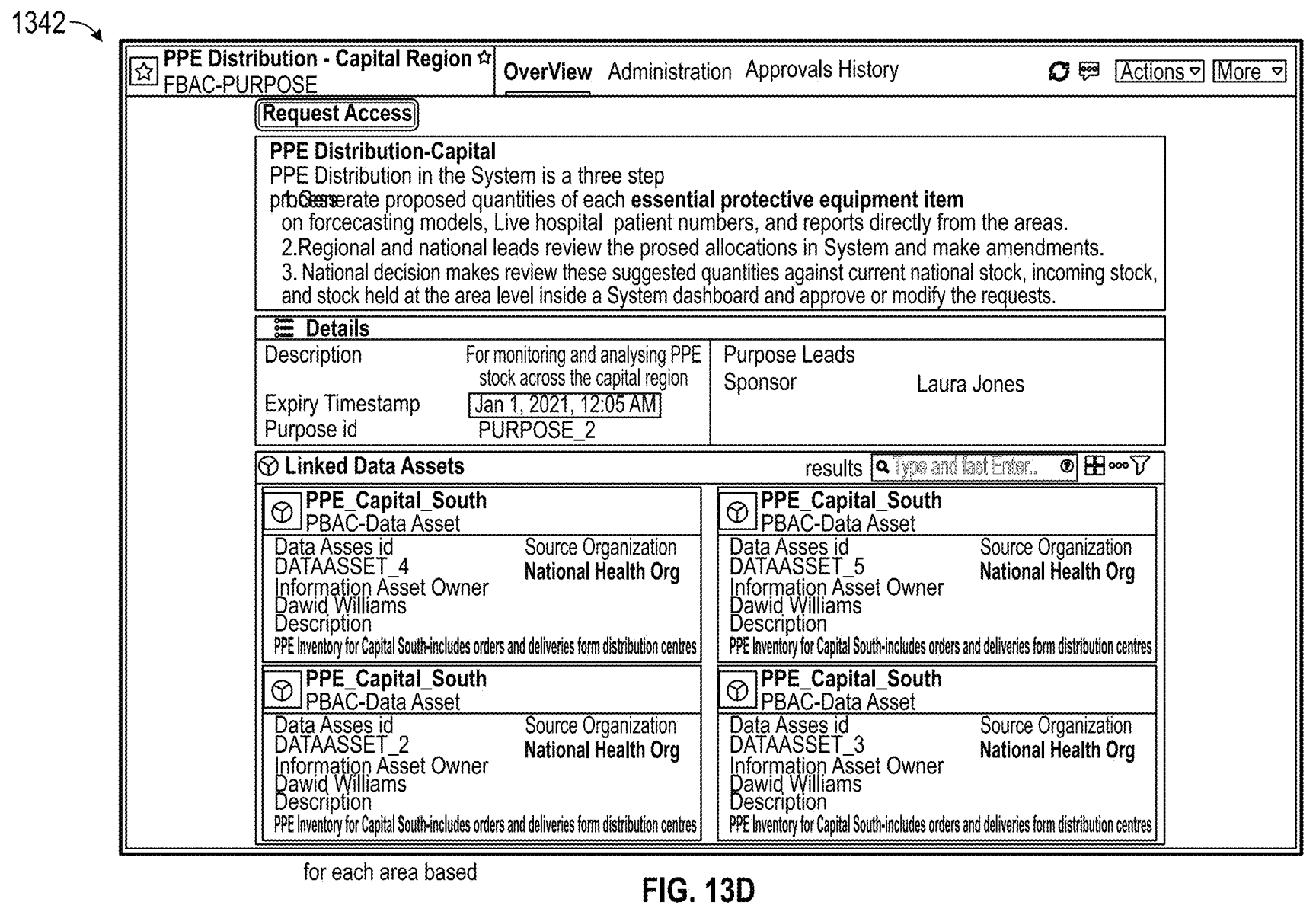

Referring to FIG. 10F, user interface 1062 shows a more detailed view of the section 1022 from the user interface 1012 of FIG. 10B. In the example more detailed view 1062, the user can expand the various linked objects to see further linked objects. For example, the linked analyst user object 1064 has been expanded to show a purpose object linked to the analyst user object (for which the analyst user has been approved), and other purpose access request objects linked to the analyst user object. Advantageously, via this section of the user interface, the purpose sponsor user can investigate linked objects to help make a determination whether or not to approve or deny the request. Additionally, via this section of the user interface the user can select any of the listed objects to view of more detailed view of the select object (e.g., detailed view of a purpose object as shown in FIG. 13D and described below).

Figure 11A:
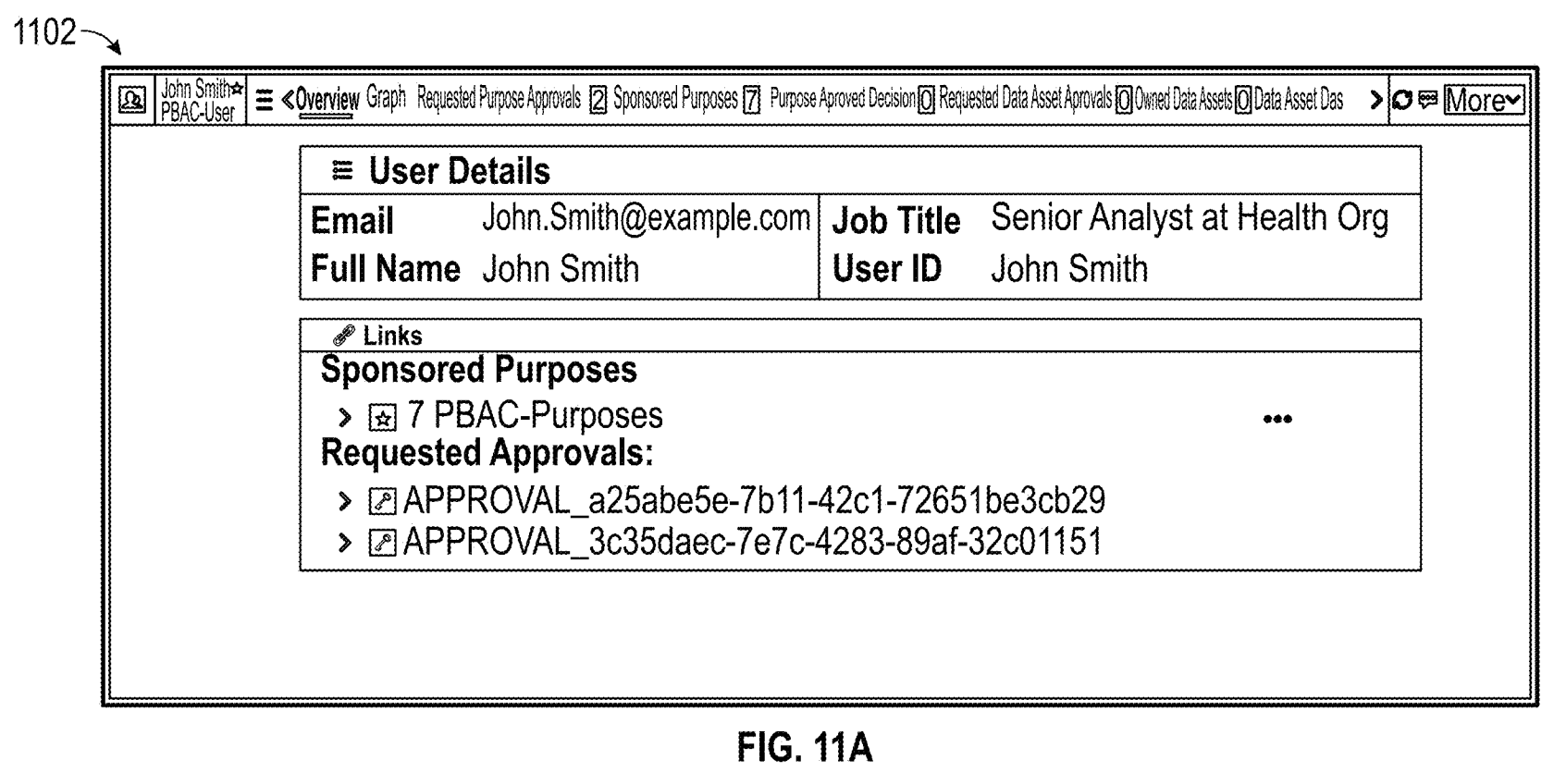
Figure 11B:
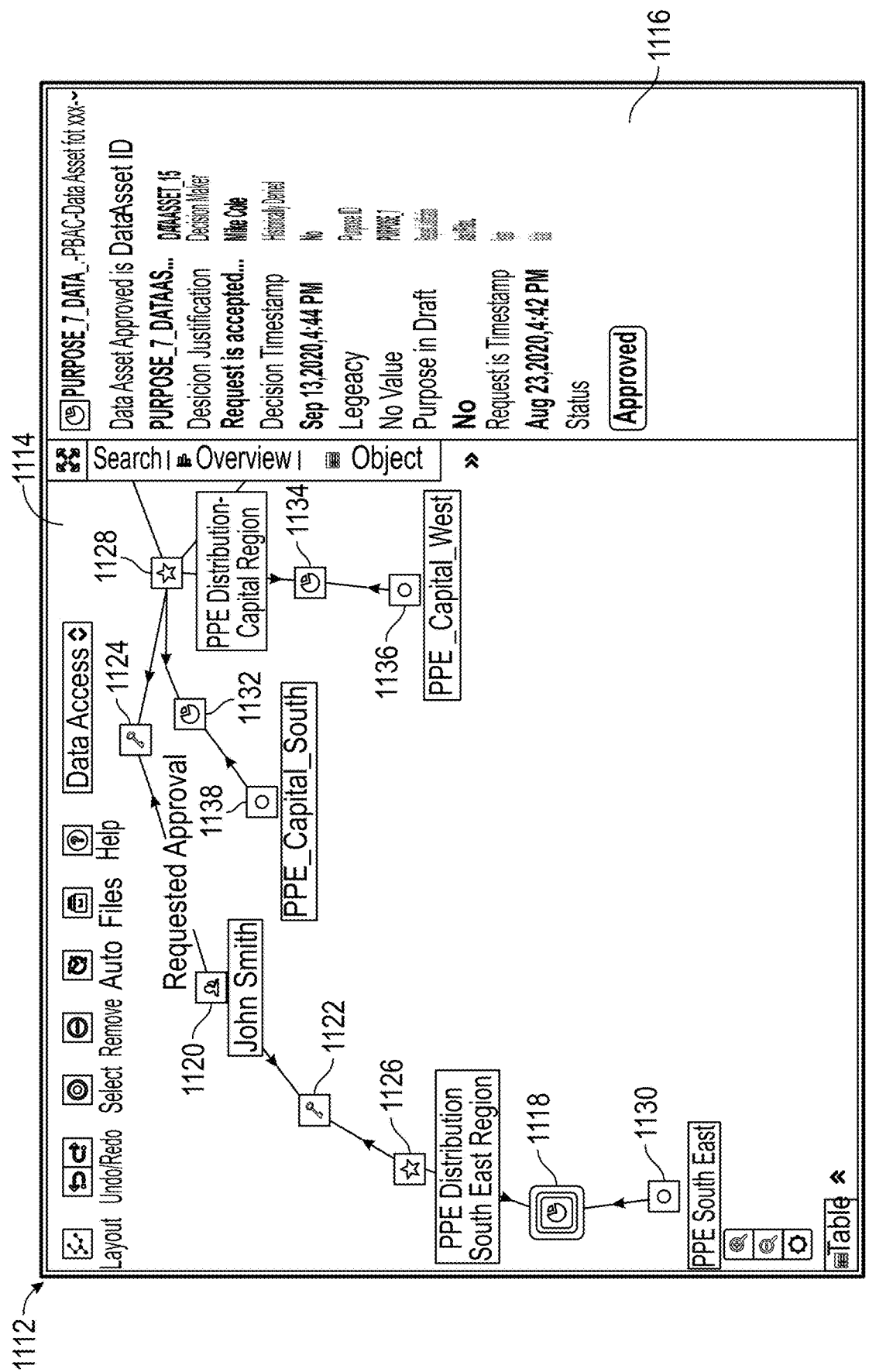

FIGS. 11A-11B illustrate example interactive graphical user interfaces related to a purpose sponsor user and/or a data asset owner user, among other users, according to one or more embodiments. Referring to FIG. 11A, a user interface 1102 includes a detailed view of an analyst user object. The view includes metadata associated with the analyst user object, and indications of any objects linked to the analyst user object (which may be expanded to view further sub-linked objects, as described above). Similar user interfaces may be provided for other types of users of the system. In general, the user interface 1102 may be useful for a purpose sponsor user and/or a data asset owner user to review purpose access requests and/or data access requests and make decisions to approve or deny. The reviewing user can further select to view of a graph view of linked objects, as shown in user interface 1112 of FIG. 11B. As shown in user interface 1112, a graph view section 1114 includes visual indications (e.g., graphical nodes or icons) of the various linked objects, with links represented by graphical connectors. The user may select any of the objects in the graph view to view details (e.g., properties) associated with the selected object in the sidebar 1116. The user may also interact with the graph view and the displayed objects via moving, scrolling, zooming, etc. As shown in the example graph view section 1114, the analyst user object 1120 is linked to two purpose access request objects 1122 and 1124. An indication of status of the request can be indicated on the link. The purpose access request objects 1122 and 1124 are linked to respective purpose objects 1126 and 1128. Each of those is further linked to related objects. For example, purpose object 1126 is linked to data asset object 1118 (in the example, data asset object 1118 is selected and detailed information is shown in the sidebar 1116), which is further linked to a data source 1130. Purpose object 1128 is linked to data asset objects 1132 and 1134, among other objects, and data asset objects 1132 and 1134 are linked to respective data sources 1138 and 1136. Via the graph view of the user interface, a purpose sponsor user and/or a data asset owner user can investigate linked objects to help make a determination whether or not to approve or deny various requests. Additionally, such user interfaces can enable a user to quickly determine all purposes that have access to a certain data asset, and all users that have access to those purposes. Such user interfaces can further indicate all requests associated with those purposes, assets, and users, and the user interface can color code those requests to indicate whether such requests were approved or denied, for example.

FIGS. 12A-12F illustrate example interactive graphical user interfaces related to a purpose sponsor, among others, according to one or more embodiments. Referring to FIG. 12A, a user interface 1202 includes a listing of purposes 1204 that are managed by a currently logged in purpose sponsor user. The user interface shows, for each of the listed purposes, various metadata details (e.g., as may be included in properties of the associated purpose objects) including title, description, sponsor (e.g., associated purpose sponsor user), expiry timestamp, purpose identifier ("Purpose ID"), etc.

Referring to FIG. 12B, a user interface 1212 follows the user interface 1202. In user interface 1212, the purpose sponsor user has selected one of the listed purposes 1204. Details related to the selected purpose are then displayed in the user interface in response to the purpose sponsor user's selection. The user interface 1212 is similar to the purpose details shown in the user interface 912 of FIG. 9B, and the user interface 1212 may be shown in response to the user's selection of button 920 of the user interface 912. The details of the purpose object shown in user interface 1212 (which may be found from the metadata of the related purpose object) include, in section 1214, various details related to the purpose, and in section 1216, a listing of any data assets associated with or linked to the purpose. Using button 1218, the purpose sponsor user may add a purpose lead to the purpose (e.g., add a delegate or administrator to act on the purpose sponsor's behalf for the purpose). Using button 1220, the purpose sponsor user may update an expiry date associated with the purpose. The expiry date may be stored as metadata with the purpose object, and may cause the purpose to expire as of a particular date, and/or after a period of time. Upon or close to expiry of the purpose, the purpose sponsor user is prompted to review the purpose and either extend the expiry date, or allow the purpose to expire. Advantageously, the system may use expiration of purposes to ensure the purposes (and related data) do not become stale or get forgotten or lost in the system. Further, frequent reminders to users regarding the various purposes in the system may avoid duplication of similar purposes, and reconsideration of scope of data granted access in each purpose, or review of analyst users granted access in each purpose.

Referring to FIG. 12C, a user interface 1232 follows the user interface 1212 and in response to the purpose sponsor user selecting the "add data assets" button in the user interface 1212. The purpose sponsor user may use the button to create requests to add additional data assets to the selected purpose. In user interface 1232, the purpose sponsor user may view a listing 1234 of available data assets, and may scroll through the list or filter the list. After selecting one or more data assets, the purpose sponsor user may select the button 1236, which causes the system to generate one or more data access request objects (e.g., depending on the number of data assets selected; in an implementation a separate data access request object is created for each selected data asset). Referring to FIG. 12D, user interface 1242 enables the purpose sponsor to edit and submit a data access request object, including specifying the data asset, the purpose, and a justification. In various implementations, and as mentioned above, justifications may be required of users when creating various kinds of requests, such that a history of data access and associated reasons may be audited.

Referring to FIG. 12E, a user interface 1252 follows the user interface 1202 of FIG. 12A and in response to the purpose sponsor user selecting the "new purpose" button in the user interface 1202. The purpose sponsor user may use the button to create a new purpose. User interface 1252 enables the purpose sponsor user to edit and create a purpose request object, including specifying the purpose name, description, expiry date, purpose sponsor, visibility, etc. In some embodiments, user interface 1252 may also be used by governance administrator users to create new purposes.

Referring to FIG. 12F, a user interface 1262 follows the user interface 1212 and in response to the purpose sponsor user selecting the "manage scope options" button in the user interface 1212 of FIG. 12B. User interface 1262 of FIG. 12F enables the purpose sponsor user to review and edit access scope options for the purpose, including, for example, options based on geography (e.g., "east", "national", "north", "south", "west"), sub-categories within an organization, and/or the like. Such "scope" options may associate a particular data scope with a purpose. Thereafter, when a data asset is associated with the purpose, the associated data scope may automatically be applied to the data asset. When a scope is applied to a data asset, automatic filtering may be applied to the data assets. Such filtering may include, for example, limiting types of data, or limiting to certain columns or rows. In the example of a geographic scope, the data asset may be filtered to only include data items associated with the associated geographic scope. Other types of scoping and/or data filtering may be applied to purposes and/or data assets also. In some embodiments, a purpose sponsor user may by default be authorized to apply any scope options to a purpose. Further, in some embodiments, the system may limit a particular purpose sponsor user to only being authorized to apply certain scope options to a purpose or to approve purpose access requests for purposes of a certain scope.

FIGS. 13A-13E illustrate example interactive graphical user interfaces related to a data asset owner user, among other users, according to one or more embodiments. Referring to FIG. 13A, a user interface 1302 includes a listing of data assets 1304 that are managed by the currently logged in data asset owner user. The user interface shows, for each of the listed data assets, various metadata details (e.g., as may be included in properties of the associated data asset objects) including title, data asset identifier ("Data Asset ID"), data protection considerations, granularity of data, etc.

Referring to FIG. 13B, a user interface 1312 includes a listing of data access requests 1314. The listed data access requests 1314 include requests that have been directed to the logged in data asset owner user due to the data asset owner user being responsible for the data asset associated with the requests. The user interface shows, for each of the listed requests, various metadata details (e.g., as may be included in properties of the associated data access request objects) including purpose, requestor, request justification, status, etc. Via the sidebar, the data asset owner user may filter and search the various requests.

Referring to FIG. 13C, a user interface 1322 follows the user interface 1312. In user interface 1312, the data asset owner user has selected one of the listed data access requests 1314. Details related to the selected request are then displayed in the user interface in response to the data asset owner user's selection. The details (which may be found from the metadata of the related data access request object) include, in a top portion of the user interface, the title of the request (including an indication of the associated purpose), in section 1326 a listing of an event history of the request (e.g., for each event, a user associated with the event and a listing of properties of the request object at the time), in section 1328 an indication of other objects linked to the request (e.g., the associated purpose object, the associated purpose sponsor object, and other related data asset objects), and in section 1330, a listing of current properties of the request (e.g., including a decision maker, a justification, a status, etc.). Using buttons 1324, the data asset owner user may view or add comments related to the request (e.g., in a similar fashion to the addition of comments and/or attachments as described above in reference to FIG. 10C). Using buttons 1332, the data asset owner user may approve the request (e.g., after reviewing the details of the request), or may deny the request. Section 1328 of the user interface 1322 may be expanded similarly to the functionality described above in reference to FIG. 10F.

Referring to FIG. 13E, a user interface 1352 follows the user interface 1312. In user interface 1312, the data asset owner user has selected one of the listed data access requests 1314. Details related to the selected request are then displayed in the user interface 1352 in response to the data asset owner user's selection. The details (which may be found from the metadata of the related data access request object) may include, in a top portion of the user interface, the title of the request, the data asset and purpose associated with the request, the analyst user making the request, the status of the request, a justification for approval or denial of the request, and a justification for the request. The bottom portion 1354 of the user interface includes data minimization or filtering details. Portion 1354 includes a listing of columns 1356 of the data asset associated with the data access request. The data asset owner user may select one or more columns by selecting the checkbox next to each column. If the data access request is approved, any unselected columns may be filtered from the data asset when it is added to the applicable purpose. In some embodiments, some columns may be pre-selected according to a default data minimization or filtering rule, such as a scope (e.g., a scope associated with the purpose related to the data access request). Furthermore, user interface portion 1354 includes further row-based filtering options 1358. The data asset owner user may edit options 1358 to apply data minimization or filtering to the rows of the data asset. As with the column-based data minimization or filtering, the row-based data minimization or filtering may be pre-selected according to a default data minimization or filtering rule, such as a scope (e.g., a scope associated with the purpose related to the data access request). Other types of data minimization or filtering may similarly be applied to data assets associated with data access requests, purposes, and/or the like. If the data asset access request is approved, any unselected rows may be filtered from the data asset when it is added to the applicable purpose. Using button 1360, the data asset owner user may save changes made to the filtering of rows and columns.

User interfaces 1352 (described in FIG. 13E above) and 1322 (described in FIG. 13C above) may be utilized interchangeably. Furthermore, any or all of the elements found in either user interface 1352 or user interface 1322 may be combined or used interchangeably, or any other elements related to properties of the selected data access request may be included. In various implementations, user interfaces similar to those of FIGS. 13C and 13E may be provided for purpose access requests, or other similar data objects of the system.

Advantageously, the data asset owner user may review other data assets associated with the purpose, and may thereby evaluate the effect of joining the current data asset with the existing data assets in the purpose. For example, the data asset owner user may determine that joining the current data asset with the existing data assets may have the effect of de-anonymizing pseudo-anonymized data in one of data assets. Thus, the data asset owner user may decide to deny the request.

Also advantageously, the user interface 1322 can include a history of the request in section 1326, which may be updated as a result of various events (similar to functionality described above in reference to FIG. 10E.

In the user interface 1322, the data asset owner user may select various ones of the listed objects in 1328 to view details related to the object. For example, the data asset owner user may select purpose object 1334 to cause the 1342 of FIG. 13D to be displayed showing details regarding the selected purpose object. User interface 1342 is similar to the user interface 912 of FIG. 9B.

Figure 14A:
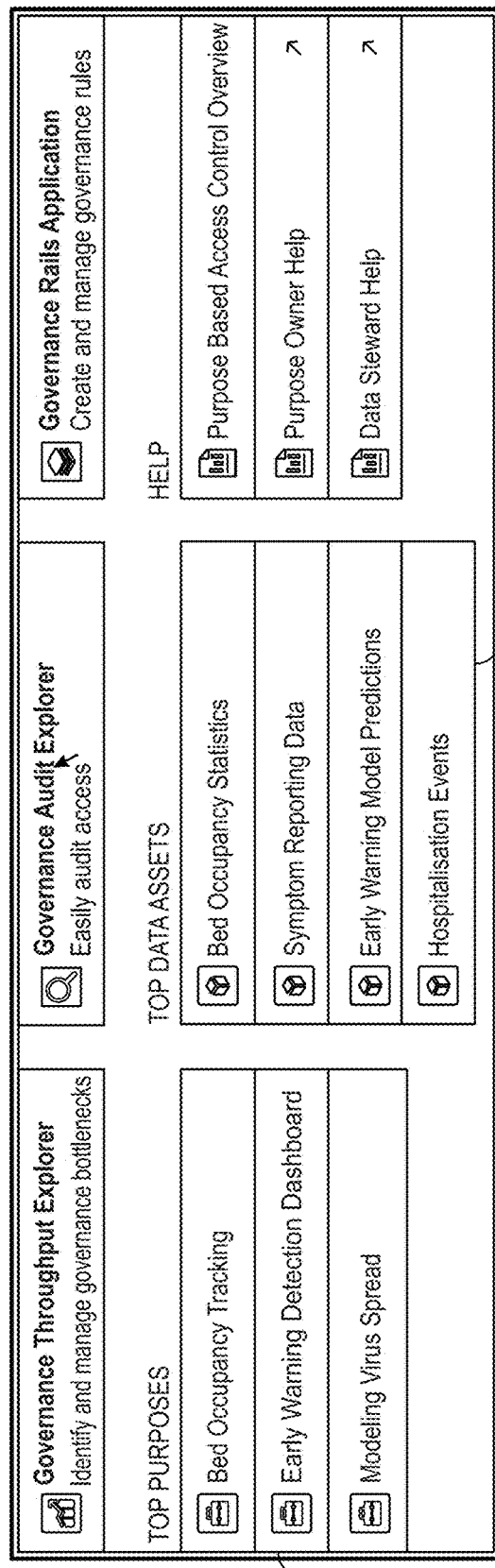

FIGS. 14A-14K illustrate example interactive graphical user interfaces related to a governance administrator user, among other users, according to one or more embodiments. Referring to FIG. 14A, a user interface 1402 includes a listing of purposes 1404 that are the most used purposes within an organization, and a listing of data assets 1406 that are the most used data assets within an organization.

Figure 14B:
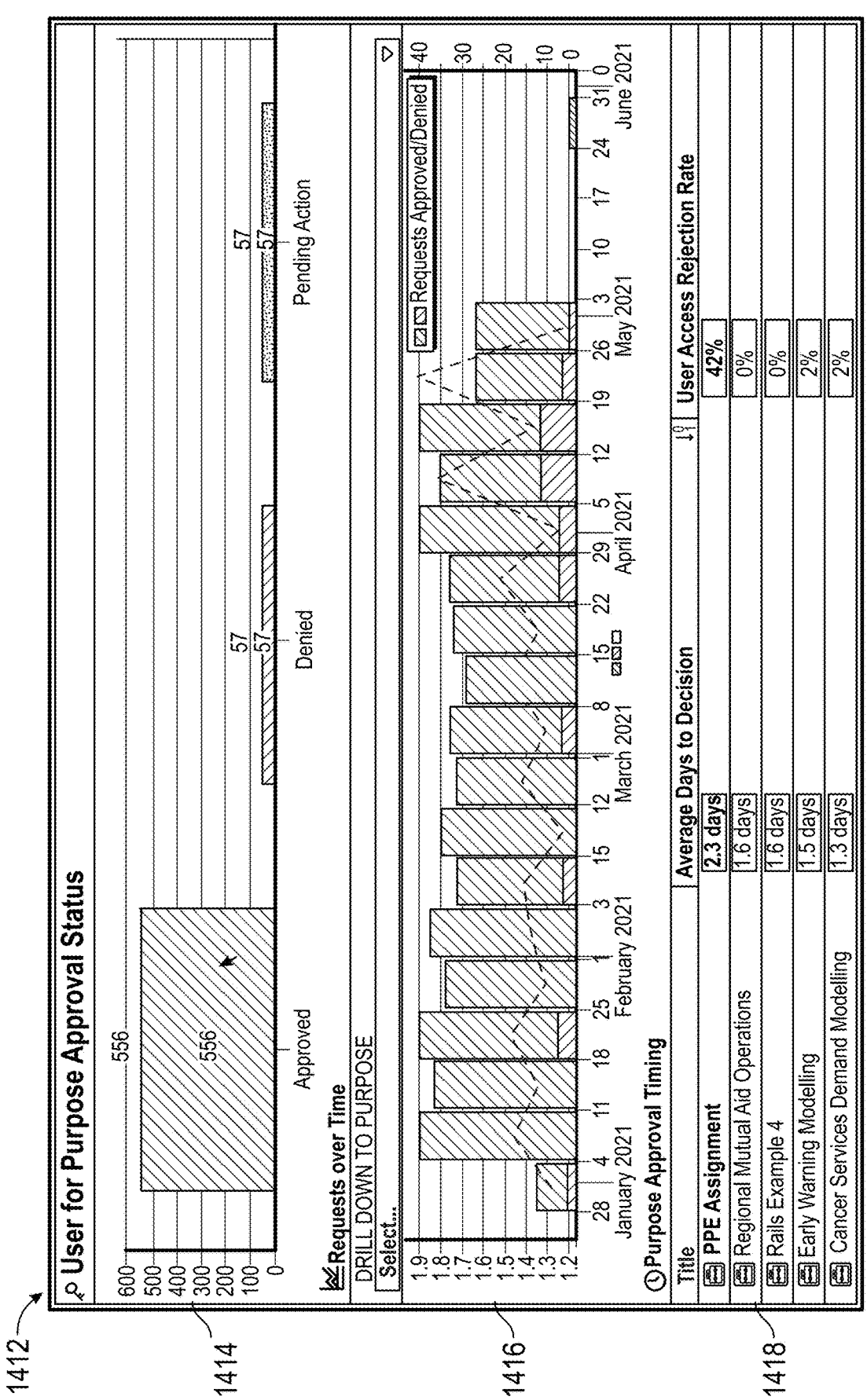

Referring to FIG. 14B, a user interface 1412 follows the user interface 1402 and in response to the governance administrator user selecting the "throughput explorer" button in the user interface 1402. User interface 1412 includes a chart graphic 1414 showing statistics on the approval status of various user requests to access purposes, a chart graphic 1416 showing statistics on the approval rates of purpose requests over time, and a listing of purposes 1418 with additional approval statistics including the average days to decision for approval/denial of purpose access requests and the associated rejection rates. Other statistical information may also be provided by the system in the user interface. The information shown in the user interface may be determined by the system by aggregating data and metadata associated with various purpose access request objects. Similar user interfaces may be provided for data access requests. The user of user interface 1412 may drill down into specific request objects and/or groups or request objects to further analyze the statistical information. Using these interfaces, the system advantageously enables a user to evaluate possible bottlenecks or issues with the approval processes of the system.

Figure 14C:
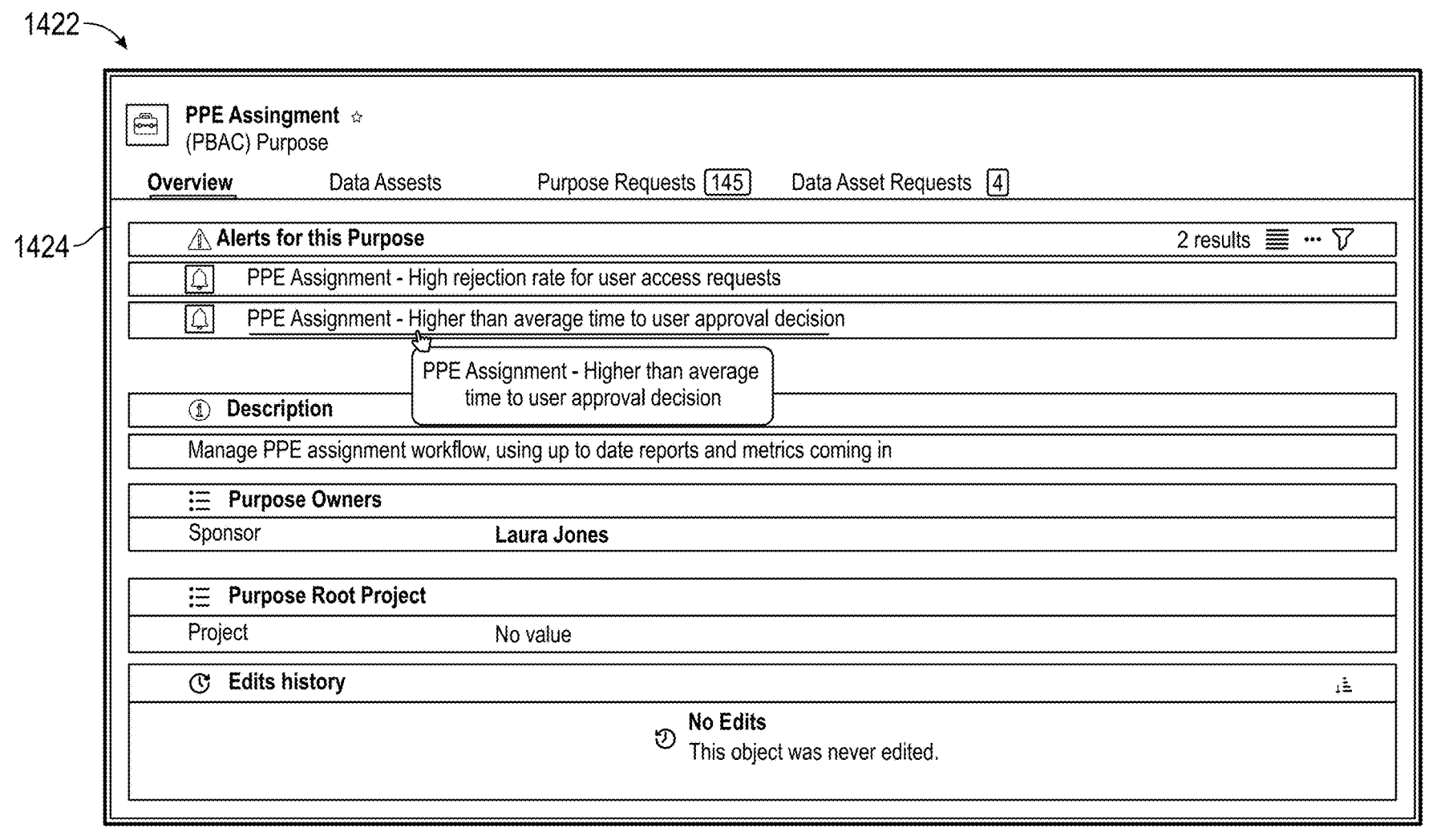

Referring to FIG. 14C, a user interface 1422 follows the user interface 1412 and in response to the governance administrator user selecting a purpose in list 1418 (and/or via other drill downs in the user interface 1412). The user interface 1422 includes details associated with the selected purpose (including, e.g., various information associated with the applicable purpose object), and a listing of alerts 1424 associated with the selected purpose. Alerts may be generated by the system based on various criteria, as further explained herein. Furthermore, alerts may be configured to require some action by a user before performing an action. For example, an alert may be configured to stop an analyst user from accessing a data asset until an alert is acknowledged and/or approved. In some embodiments, the system may automatically generate alerts based on certain criteria; for example, if a certain data asset access request is routinely being denied, the system may automatically generate an alert with a suggestion to create a derived data asset.

Referring to FIG. 14D, a user interface 1432 follows the user interface 1422 and in response to the governance administrator user selecting an alert from list 1424. The user interface 1432 includes a list of suggestions 1434 regarding the purpose with respect to the selected alert, and a list of recent purpose access requests associated with the purpose 1436. The user interface shows, for each of the listed purpose access requests, various metadata details (e.g., as may be included in properties and/or associations of the associated purpose access request objects) including title, approval status, a justification for the request, a justification for the decision made regarding approval or denial of the request, etc. Advantageously, the data provided by the system in connection with the alert enables a user to quickly understand the basis of the alert, and determine ways to resolve or mitigate any negative effects represented by the alert.

Figure 14E:
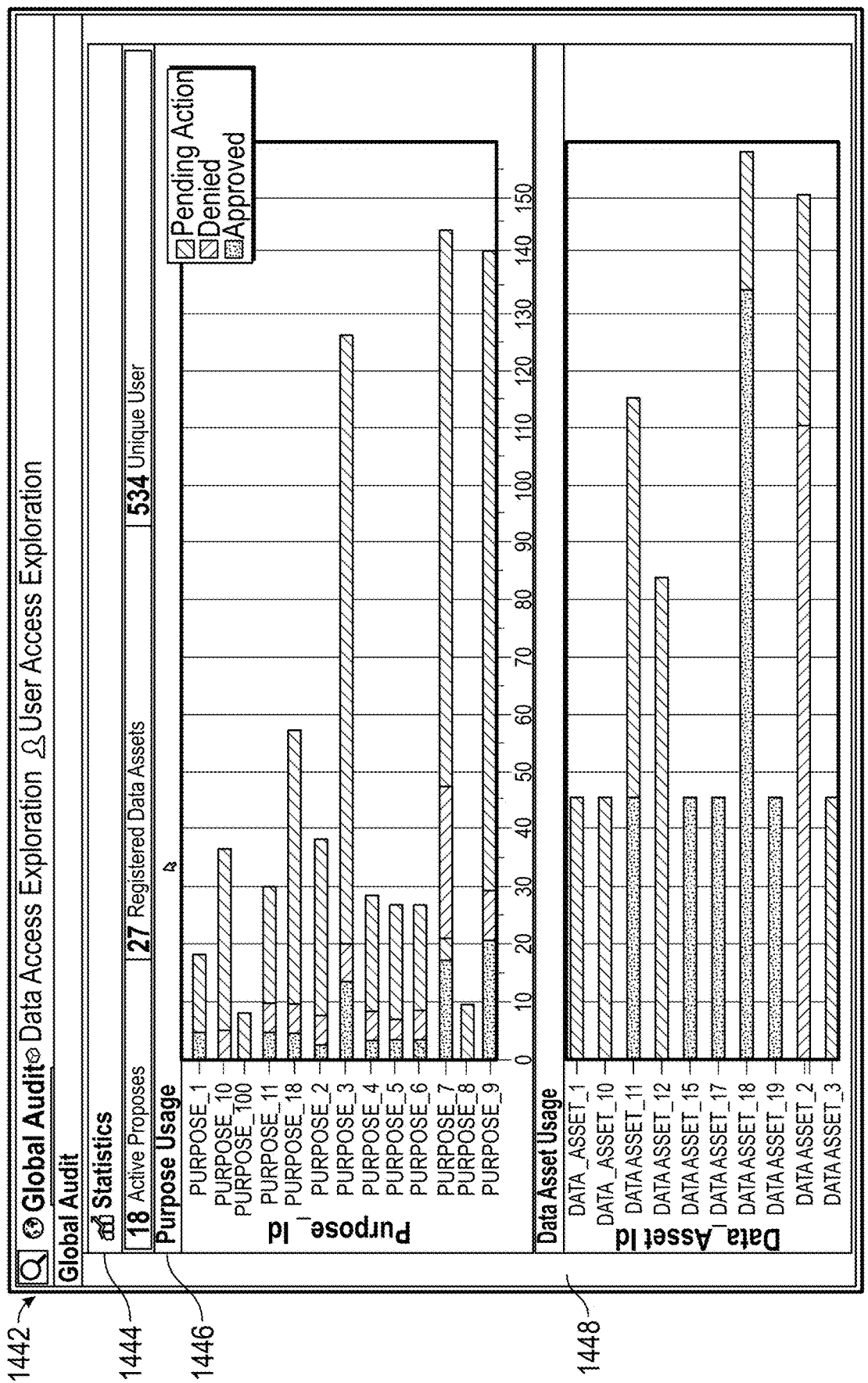

Referring to FIG. 14E, a user interface 1442 follows the user interface 1402 and in response to the governance administrator user selecting the "audit explorer" button in the user interface 1402. User interface 1442 includes statistics on active purposes, data assets, and users 1444, a graphic showing statistics on purpose usage 1446, and a graphic showing statistics on data asset usage 1448. Advantageously, the data provided by the system in connection with these graphics may enable a user to quickly identify notable trends in data asset usage across an organization.

Referring to FIG. 14F, a user interface 1452 follows the user interface 1442 and in response to the governance administrator user selecting the "data access exploration" tab in the user interface 1442. User interface 1452 includes a dropdown menu 1454 that enables the governance administrator user to select a specific data asset, a listing of purposes 1456 approved to use the selected data asset, and a listing of analyst users 1457 approved to access purposes that include the selected data asset. The user interface shows, for each of the listed purposes, various metadata details (e.g., as may be included in properties and/or associations of the associated purpose, data asset, or data access request objects) including title, a justification for the associated data asset access request for the selected data asset, a justification for approval of associated data asset access request for the selected data asset, a timestamp of when the associated data asset access request was approved, etc. The user interface further shows, for each of the listed analyst users, various metadata details (e.g., as may be included in properties and/or associations of the associated purpose, data asset, data access request, or user objects) including name, the associated purpose through which the user has access to the selected data asset, a justification for the associated purpose access request purpose through which the user has access to the selected data asset, a justification for the approval of the associated purpose access request purpose through which the user has access to the selected data asset, a timestamp of when the associated purpose access request was approved, etc. Advantageously, user interface 1452 may enable a user to quickly identify and review recently approved purpose access requests and data asset access requests associated with a specific data asset.

Referring to FIG. 14G, a user interface 1462 follows the user interface 1442 and in response to the governance administrator user selecting the "user access explorer" tab in the user interface 1442. User interface 1462 includes a dropdown menu 1464 that enables the governance administrator user to select or search for a specific analyst user, a listing of purposes 1466 that the selected analyst user is approved to access, and a listing of data assets 1468 that the selected analyst user is approved to access. The user interface shows, for each of the listed purposes, various metadata details (e.g., as may be included in properties and/or associations of the associated objects) including title, a justification for the associated purpose access request for the selected analyst user, a justification for approval of associated purpose access request for the selected analyst user, a timestamp of when the associated purpose was, etc. The user interface further shows, for each of the listed data asset, various metadata details (e.g., as may be included in properties and/or associations of the associated objects) including title, the associated purpose through which the selected analyst user has access to the data asset, a justification for the associated purpose access request purpose through which the selected analyst user has access to the data asset, a justification for the approval of the associated purpose access request purpose through which the selected analyst user has access to the data asset, a timestamp of when the associated purpose access request was approved, etc. Advantageously, user interface 1462 may enable a user to review an analyst user's access to purposes and data assets.

Referring to FIG. 14H, a user interface 1472 follows the user interface 1402 and in response to the governance administrator user selecting the "governance rails application" button in the user interface 1402. User interface 1472 includes a listing of purposes 1474. The user interface shows, for each of the listed purposes, various metadata details (e.g., as may be included in properties of the associated purpose objects) including purpose title, purpose tags, purpose description, purpose sponsor user, etc. User interface 1472 also includes a sidebar 1476 that enables the governance administrator user to filter the list of purposes based on various metadata details, such as purpose tag or purpose type. Advantageously, user interface 1472 may enable a user to quickly search through and identify existing purposes by purpose tag or purpose type.

Referring to FIG. 14I, a user interface 1482 follows the user interface 1472 and in response to the governance administrator user selecting one or more purposes from listing 1474 and selecting the "add tags" button in the user interface 1472. The governance administrator user may use the button to add tags to the selected purpose. For example, in various implementations, a specific purpose may be tagged as "high risk." User interface 1482 enables the governance administrator user to edit a purpose object, including specifying one or more tags to add as properties of the purpose object. Tags added to a purpose may advantageously enable the efficient application of rules to object metadata to generate alerts, as further described herein.

Referring to FIG. 14J, a user interface 1492 follows the user interface 1472 and in response to the governance administrator user selecting the "rules" tab in the user interface 1472. The governance administrator user may use the tab to create and edit rules governing the system and based on which the system may generate alerts. In various implementations, such rules may act as technical safeguards that ensure that an organization is complying with internal policies or legal imperatives. User interface 1492 enables the governance administrator user to create or edit a rule, including specifying one or more conditions 1494 that trigger the rule, and specifying one or more actions 1496 for the system to take if the aforementioned conditions are satisfied. For example, in the example illustrated by FIG. 14J, the governance administrator user is creating a rule for data access requests; however, the governance administrator user may also create rules for any object type described herein. The governance administrator user may specify conditions that trigger the rule; in the example illustrated by FIG. 14J, the governance administrator user has designated two conditions that must both be satisfied: the purpose associated with the data access request has been tagged as high risk and the data asset associated with the data access request has been tagged as an "AI" data asset. Further, the governance administrator user may specify actions for the system to take if the conditions are satisfied. For example, in the example illustrated in FIG. 14J, the governance administrator user has designated that when both conditions are met for a data asset access request, the system will create a data asset request alert. Alerts conditions may be applied as alternatives (e.g., "or") in addition to "and", in any combination. Similar alerts may be specified and applied by the system to purpose access request objects, and the like. The system displays alerts to appropriate users (e.g., data asset owners, purpose sponsors, and/or governance users) so that the users may take action to, e.g., prevent sharing certain types of data, cautiously consider certain types of requests, and/or the like.

Referring to FIG. 14K, a user interface 1498 enables the governance administrator user to view and compare multiple users' access permissions. The user interface shows and compares, for each user, various metadata details (e.g., as may be included in properties of the associated user objects) including name, associated purpose objects that the user has access to, etc. Such information may advantageously allow a user to quickly determine when certain analyst user's access permissions are incorrect, or beyond the scope of their positions. Such information may also advantageously enable onboarding of new users to have the same access permissions as another user. In some embodiments, user interface 1498 may further advantageously enable a governance administrator user to immediately approve, for a first analyst user, access to some or all of the permissions that a second analyst user has access to.

X. Additional Implementation Details and Embodiments

In an implementation the system (e.g., one or more aspects of the access management system 110, the data management system 150, and/or the like) may comprise, or be implemented in, a "virtual computing environment". As used herein, the term "virtual computing environment" should be construed broadly to include, for example, computer readable program instructions executed by one or more processors (e.g., as described in the example of FIG. 8) to implement one or more aspects of the modules and/or functionality described herein. Further, in this implementation, one or more services/modules/engines/etc. of the system may be understood as comprising one or more rules engines of the virtual computing environment that, in response to inputs received by the virtual computing environment, execute rules and/or other program instructions to modify operation of the virtual computing environment. For example, a request received from the user computing device 301 may be understood as modifying operation of the virtual computing environment to cause the request access to a resource from the system. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the system. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system as a virtual computing environment may advantageously enable executing different aspects or modules of the system on different computing devices or processors, which may increase the scalability of the system. Implementing one or more aspects of the system as a virtual computing environment may further advantageously enable sandboxing various aspects, data, or services/modules of the system from one another, which may increase security of the system by preventing, e.g., malicious intrusion into the system from spreading. Implementing one or more aspects of the system as a virtual computing environment may further advantageously enable parallel execution of various aspects or modules of the system, which may increase the scalability of the system. Implementing one or more aspects of the system as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums). Computer readable storage mediums may also be referred to herein as computer readable storage or computer readable storage devices.

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a service, module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
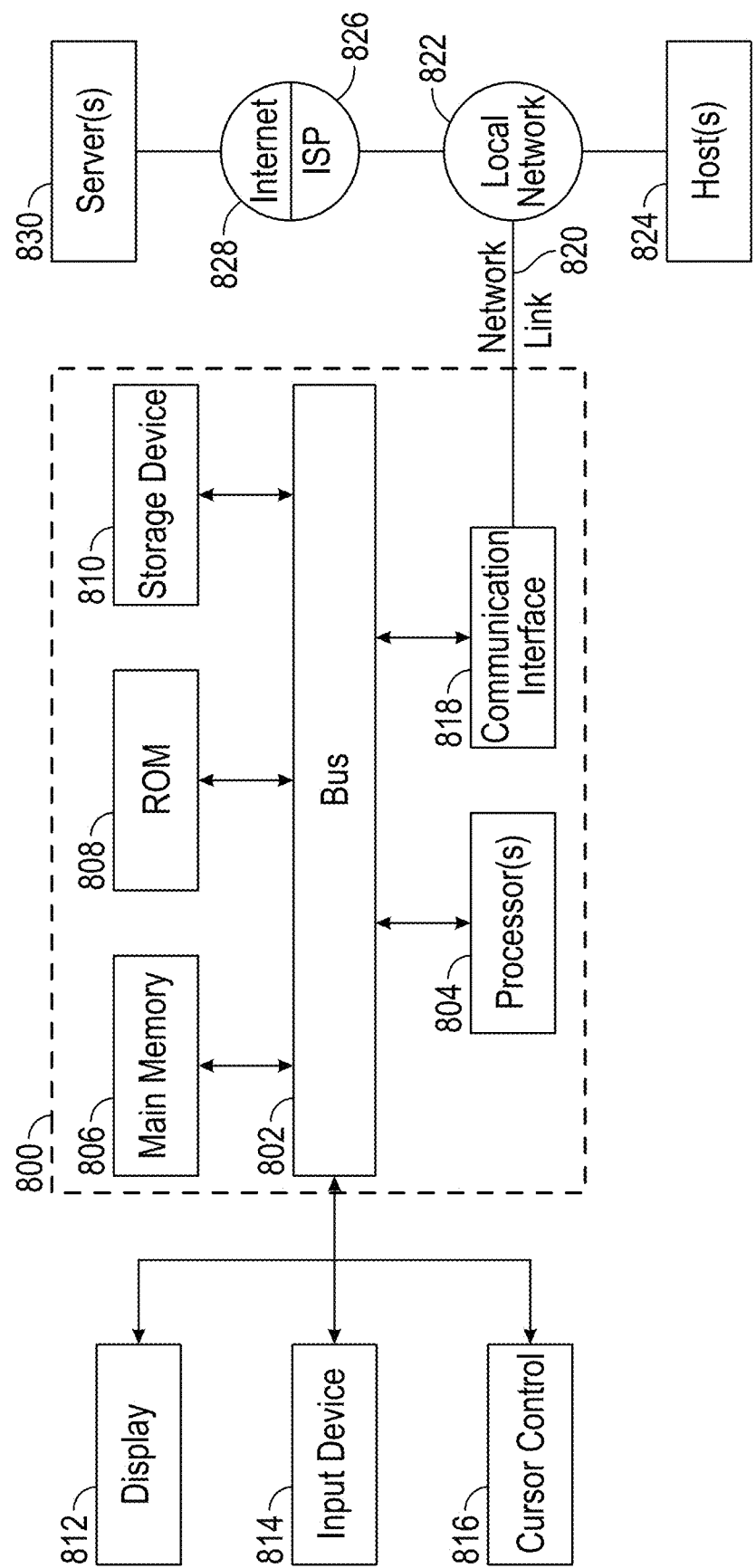
FIG. 8 shows a block diagram illustrating a computer system upon which various embodiments may be implemented.

For example, FIG. 8 shows a block diagram that illustrates a computer system 800 upon which various embodiments may be implemented. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as computer executable program instructions that are executed by the computing device(s). Computer system 800 may further, as described below, implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more computer readable program instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

Various forms of computer readable storage media may be involved in carrying one or more sequences of one or more computer readable program instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

XI. Example Clauses

Examples of the implementations of the present disclosure can be described in view of the following example clauses. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1: A computer-implemented method for granting purpose-based access to electronic data assets, the computer-implemented method comprising, by one or more hardware processors executing program instructions: receiving, from a first user, a request to access data assets associated with a purpose object; in response to receiving the request from the first user: generating a purpose access request object including at least an identification of the first user and an identification of the purpose object; and providing an indication of the purpose access request object to a second user associated with the purpose object; receiving, from the second user, an approval of the request; and in response to receiving the approval of the request from the second user: updating the purpose access request object to include at least an indication of the approval of the request; and granting the first user access to data assets associated with the purpose object.

Clause 2: The computer-implemented method of Clause 1 further comprising, by the one or more hardware processors executing program instructions: receiving, from the second user, a second request to associate a data asset with the purpose object; in response to receiving the second request from the second user: generating a data access request object including at least an identification of the purpose object and an identification of a data asset object associated with the data asset; and providing an indication of the data access request object to a third user associated with the data asset object; receiving, from the third user, an approval of the second request; and in response to receiving the approval of the second request from the third user: updating the data access request object to include at least an indication of the approval of the second request; and associating the data asset object with the purpose object.

Clause 3: The computer-implemented method of any of Clauses 1-2, wherein the data asset is a derived data asset comprising a combination of at least two data assets, and wherein the computer-implemented further comprises, by the one or more hardware processors executing program instructions: further in response to receiving the second request from the second user: providing an indication of the data access request object to a fourth user associated with the derived data asset object and/or the second user, wherein the fourth user is also associated with another data asset object associated with at least one of the two data assets; receiving, from the fourth user and/or the second user, an approval of the second request; and in response to receiving the approval of the second request from both (1) a third user associated with the data asset object and (2) the second user and/or the fourth user: updating the data access request object to include at least an indication of the approval of the second request; and associating the derived data asset object with the purpose object.

Clause 4: The computer-implemented method of any of Clauses 2-3, wherein the data asset object is automatically filtered when associated with the purpose object.

Clause 5: The computer-implemented method of any of Clauses 2-4 further comprising, by the one or more hardware processors executing program instructions: granting the first user access to the data asset as a result of the data asset object being associated with the purpose object.

Clause 6: The computer-implemented method of any of Clauses 2-5 further comprising, by the one or more hardware processors executing program instructions: receiving an input from the second user requesting to view a graph view of objects associated with the first user; and in response to receiving the input: generating a graph view of objects associated with the first user, the graph view including graphical nodes indicative of objects and graphical connectors indicative of links between the objects, wherein the objects associated with the first user include: a user object associated with the first user, any purpose access request objects associated with the user object, any purpose objects associated with any of the purpose access request objects, any data access request objects associated with any of the purpose objects, and any data asset objects associated with any of the data access request objects.

Clause 7: The computer-implemented method of Clause 6, wherein: the purpose request object is linked to the user object, the purpose object is linked to the purpose request object, the data access request object is linked to the purpose object, and the data asset object is linked to the data access request object.

Clause 8: The computer-implemented method of any of Clauses 2-7, wherein: the purpose request object is linked to a user object associated with the first user, the purpose object is linked to the purpose request object, the data access request object is linked to the purpose object, and the data asset object is linked to the data access request object.

Clause 9: The computer-implemented method of Clause 8, wherein the data asset is associated with the purpose object by way of the purpose object being linked to the data access request object, and the data access request object being linked to the data asset object.

Clause 10: The computer-implemented method of any of Clauses 8-9, wherein the first user is associated with the purpose object by way of the purpose object being linked to the purpose access request object, and the purpose access request object being linked to the user object.

Clause 11: The computer-implemented method of any of Clauses 2-10, wherein the second user is required to provide a justification with the second request, and wherein the justification is included in the data access request object.

Clause 12: The computer-implemented method of any of Clauses 1-11, wherein the first user is required to provide a justification with the request, and wherein the justification is included in the purpose access request object.

Clause 13: The computer-implemented method of Clause 12 further comprising, by the one or more hardware processors executing program instructions: generating a report based at least in part on the purpose access request object and the justification provided by the first user.

Clause 14: The computer-implemented method of any of Clauses 12-13, wherein the purpose access request object is further associated with an access type provided by the first user, and wherein the access type affects permissions of the first user with respect to the data assets associated with the purpose object.

Clause 15: The computer-implemented method of any of Clauses 1-14 further comprising, by the one or more hardware processors executing program instructions: storing an ontology defining a plurality of object types and associated properties, and further defining relationships among the object types; wherein the objects types include at least: a user object type, a purpose access request object type, a purpose object type, a data access request object type, and a data asset object type; and wherein the user object type is not related to the data asset object type.

Clause 16: The computer-implemented method of any of Clauses 1-15 further comprising, by the one or more hardware processors executing program instructions: receiving, via a graphical user interface, specification of one or more alert conditions and one or more alert actions; applying the one or more alert conditions to the purpose access request object; and in response to at least one of the one or more alert conditions being satisfied, taking the one or more alert actions, including at least generating an alert, wherein the alert is reviewable along with related information by a user.

Clause 17: The computer-implemented method of any of Clauses 1-16 further comprising, by the one or more hardware processors executing program instructions: providing, via a user interface, a comparison of access permissions associated with the first user, with access permissions associated with another user, wherein the access permissions indicate associations of each of the users with any purpose objects and/or data asset objects.

Clause 18: A system comprising: a computer readable storage medium having program instructions embodied therewith; and one or more processors configured to execute the program instructions to cause the system to perform the computer-implemented method of any of Clauses 1-17.

Clause 19: A computer program product comprising a computer readable storage medium having program instructions embodied therewith, the program instructions executable by one or more processors to cause the one or more processors to perform the computer-implemented method of any of Clauses 1-17.

Clause 20: A computer-implemented method for granting purpose-based access to electronic data assets, the computer-implemented method comprising, by one or more hardware processors executing program instructions: generating a purpose object; associating a data asset object with the purpose object in response to approval of a data access request; associating a user object with the purpose object in response to approval of a purpose access request; and granting a user associated with the user object access to a data asset associated with the data asset object when the user indicates a purpose associated with the purpose object.

Clause 21: The computer-implemented method of Clause 20, wherein the granting is based on: (1) the association between the data asset object and the purpose object, and (2) the association between the user object and the purpose object.

Clause 22: The computer-implemented method of Clause 21, wherein the associating the user object with the purpose object is also in response to the user object being associated with a role approved for access to the purpose associated with the purpose object.

Clause 23: The computer-implemented method of any of Clauses 20-22 further comprising, by the one or more hardware processors executing program instructions: storing information associated with the data access request as a data access request object; and storing information associated with the purpose access request as a purpose access request object.

Clause 24: The computer-implemented method of any of Clauses 20-23, wherein: a basis of the user's access to the data asset is auditable via the purpose access request.

Clause 25: The computer-implemented method of any of Clauses 20-24, wherein: the data access request is approved by a second user associated with the data asset object, the purpose access request is approved by a third user associated with the purpose object, and the user, the second user, and the third user are different persons.

Clause 26: A system comprising: a computer readable storage medium having program instructions embodied therewith; and one or more processors configured to execute the program instructions to cause the system to perform the computer-implemented method of any of Clauses 20-25.

Clause 27: A computer program product comprising a computer readable storage medium having program instructions embodied therewith, the program instructions executable by one or more processors to cause the one or more processors to perform the computer-implemented method of any of Clauses 20-25.

What is claimed is:

1. A computer-implemented method for granting purpose-based access to electronic data assets, the computer-implemented method comprising, by one or more hardware processors executing program instructions:
   receiving, from a first user, a request to access data assets associated with a purpose object;
   in response to receiving the request from the first user:
      generating a purpose access request object including at least an identification of the first user and an identification of the purpose object; and
      providing an indication of the purpose access request object to a second user associated with the purpose object;
   receiving, from the second user, an approval of the request;
   in response to receiving the approval of the request from the second user:
      updating the purpose access request object to include at least an indication of the approval of the request; and
      granting the first user access to data assets associated with the purpose object;
   receiving, from the second user, a second request to associate a data asset with the purpose object;
   in response to receiving the second request from the second user:
      generating a data access request object including at least an identification of the purpose object and an identification of a data asset object associated with the data asset; and
      providing an indication of the data access request object to a third user associated with the data asset object;
   receiving, from the third user, an approval of the second request; and
   in response to receiving the approval of the second request from the third user:
      updating the data access request object to include at least an indication of the approval of the second request; and
      associating the data asset object with the purpose object.

2. The computer-implemented method of claim 1, wherein the data asset is a derived data asset comprising a combination of at least two data assets, and wherein the computer-implemented further comprises, by the one or more hardware processors executing program instructions:
   further in response to receiving the second request from the second user:
      providing an indication of the data access request object to a fourth user associated with the derived data asset object and/or the second user, wherein the fourth user is also associated with another data asset object associated with at least one of the two data assets;
   receiving, from the fourth user and/or the second user, an approval of the second request; and
   in response to receiving the approval of the second request from both (1) the third user and (2) the second user and/or the fourth user:
      updating the data access request object to include at least an indication of the approval of the second request; and
      associating the derived data asset object with the purpose object.

3. The computer-implemented method of claim 1, wherein the data asset object is automatically filtered when associated with the purpose object.

4. The computer-implemented method of claim 1 further comprising, by the one or more hardware processors executing program instructions:
   granting the first user access to the data asset as a result of the data asset object being associated with the purpose object.

5. The computer-implemented method of claim 1 further comprising, by the one or more hardware processors executing program instructions:
   receiving an input from the second user requesting to view a graph view of objects associated with the first user; and
   in response to receiving the input:
      generating a graph view of objects associated with the first user, the graph view including graphical nodes indicative of objects and graphical connectors indicative of links between the objects, wherein the objects associated with the first user include: a user object associated with the first user, any purpose access request objects associated with the user object, any purpose objects associated with any of the purpose access request objects, any data access request objects associated with any of the purpose objects, and any data asset objects associated with any of the data access request objects.

6. The computer-implemented method of claim 5, wherein:
   the purpose access request object is linked to the user object,
   the purpose object is linked to the purpose access request object,
   the data access request object is linked to the purpose object, and
   the data asset object is linked to the data access request object.

7. The computer-implemented method of claim 1, wherein:
   the purpose access request object is linked to a user object associated with the first user,
   the purpose object is linked to the purpose access request object,
   the data access request object is linked to the purpose object, and
   the data asset object is linked to the data access request object.

8. The computer-implemented method of claim 7, wherein the data asset is associated with the purpose object by way of the purpose object being linked to the data access request object, and the data access request object being linked to the data asset object.

9. The computer-implemented method of claim 7, wherein the first user is associated with the purpose object by way of the purpose object being linked to the purpose access request object, and the purpose access request object being linked to the user object.

10. The computer-implemented method of claim 1, wherein the second user is required to provide a justification with the second request, and wherein the justification is included in the data access request object.

11. The computer-implemented method of claim 1, wherein the first user is required to provide a justification with the request, and wherein the justification is included in the purpose access request object.

12. The computer-implemented method of claim 11 further comprising, by the one or more hardware processors executing program instructions:
   generating a report based at least in part on the purpose access request object and the justification provided by the first user.

13. The computer-implemented method of claim 11, wherein the purpose access request object is further associated with an access type provided by the first user, and wherein the access type affects permissions of the first user with respect to the data assets associated with the purpose object.

14. The computer-implemented method of claim 1 further comprising, by the one or more hardware processors executing program instructions:
   storing an ontology defining a plurality of object types and associated properties, and further defining relationships among the object types; wherein the objects types include at least: a user object type, a purpose access request object type, a purpose object type, a data access request object type, and a data asset object type; and wherein the user object type is not related to the data asset object type.

15. The computer-implemented method of claim 1 further comprising, by the one or more hardware processors executing program instructions:
   receiving, via a graphical user interface, specification of one or more alert conditions and one or more alert actions;
   applying the one or more alert conditions to the purpose access request object; and
   in response to at least one of the one or more alert conditions being satisfied, taking the one or more alert actions, including at least generating an alert, wherein the alert is reviewable along with related information by a user.

16. The computer-implemented method of claim 1 further comprising, by the one or more hardware processors executing program instructions:
   providing, via a user interface, a comparison of access permissions associated with the first user, with access permissions associated with another user, wherein the access permissions indicate associations of each of the users with any purpose objects and/or data asset objects.

17. A system comprising:
   a computer readable storage medium having program instructions embodied therewith; and
   one or more processors configured to execute the program instructions to cause the system to perform the computer-implemented method of claim 1.

18. A computer-implemented method for granting purpose-based access to electronic data assets, the computer-implemented method comprising, by one or more hardware processors executing program instructions:
   generating a purpose object;
   associating a data asset object with the purpose object in response to approval, by a third user associated with the data asset object, of a data access request initiated by a second user associated with the purpose object;
   associating a user object, associated with a first user, with the purpose object in response to approval, by the second user, of a purpose access request initiated by the first user; and
   granting the first user associated with the user object access to a data asset associated with the data asset object when the first user indicates a purpose associated with the purpose object.

19. The computer-implemented method of claim 18, wherein the granting is based on: (1) the association between the data asset object and the purpose object, and (2) the association between the user object and the purpose object.

20. The computer-implemented method of claim 19, wherein the associating the user object with the purpose object is also in response to the user object being associated with a role approved for access to the purpose associated with the purpose object.

21. The computer-implemented method of claim 18 further comprising, by the one or more hardware processors executing program instructions:
   storing information associated with the data access request as a data access request object; and
   storing information associated with the purpose access request as a purpose access request object.

22. The computer-implemented method of claim 18, wherein:
   a basis of the user's access to the data asset is auditable via the purpose access request.

23. The computer-implemented method of claim 18, wherein the user, the second user, and the third user are different persons.

* * * * *